United States Patent
Tanabe et al.

(10) Patent No.: US 8,527,266 B2
(45) Date of Patent: Sep. 3, 2013

(54) NOISE SUPPRESSION DEVICE AND NOISE SUPPRESSION METHOD

(75) Inventors: Nari Tanabe, Tokyo (JP); Toshihiro Furukawa, Tokyo (JP)

(73) Assignee: Tokyo University of Science Educational Foundation Administrative Organization, Tokyo (JP)

( * ) Notice: Subject to any disclaimer, the term of this patent is extended or adjusted under 35 U.S.C. 154(b) by 607 days.

(21) Appl. No.: 12/746,416

(22) PCT Filed: Mar. 18, 2009

(86) PCT No.: PCT/JP2009/001224
§ 371 (c)(1),
(2), (4) Date: Jun. 4, 2010

(87) PCT Pub. No.: WO2009/116291
PCT Pub. Date: Sep. 24, 2009

(65) Prior Publication Data
US 2010/0262425 A1 Oct. 14, 2010

(30) Foreign Application Priority Data

Mar. 21, 2008 (JP) .................................. 2008-074691
Jun. 27, 2008 (JP) .................................. 2008-168835

(51) Int. Cl.
*G10L 21/02* (2013.01)

(52) U.S. Cl.
USPC ........................................................ 704/226

(58) Field of Classification Search
USPC ................. 704/216–218, 226, 233; 382/278
See application file for complete search history.

(56) References Cited

U.S. PATENT DOCUMENTS 4,630,305 A * 12/1986 Borth et al. .................. 381/94.3
6,167,373 A * 12/2000 Morii ........................... 704/219

(Continued)

FOREIGN PATENT DOCUMENTS

JP 2008-236270 A 10/2008

OTHER PUBLICATIONS

Deller, Jr., John R. et al., "Discrete-Time Processing of Speech Signals", 2000, pp. 516-553, The Institute of Electrical and Electronics Engineers, Inc., New York, NY.

(Continued)

*Primary Examiner* — Abul Azad
(74) *Attorney, Agent, or Firm* — Nath, Goldberg & Meyer; Jerald L. Meyer; Scott C. Langford

(57) ABSTRACT

Disclosed is a noise suppression device capable of better noise suppression by means of a simpler structure and with a lighter computational load. A noise suppression device (100) has a noise suppression processor (150) to estimate the required information only from the observed information, which is the required information corrupted by noise. A correlator (154) calculates the correlation of the estimation error when the state quantity, which contains the required information, of the system at time n+1 was estimated from the information until time n or time n+1 for the observed information at only time n. A weighting coefficient calculator (156) uses the correlation calculated by the correlator (154) for the observed information at only time n to calculate the weighting coefficients for specifying the relationships of the optimum estimate of the state quantity at that time based on the information until time n+1, the optimum estimate of the state quantity at time n+1 based on the information until time n, and the estimation error of the observed quantity including the observed information. An optimum estimate calculator (158) uses the weighting coefficients calculated by the weighting coefficient calculator (156) for the observed information only at time n to calculate the optimum estimate of the state quantity at that time based on the information until time n or time n+1.

17 Claims, 47 Drawing Sheets

(56) References Cited

U.S. PATENT DOCUMENTS 7,103,541 B2* 9/2006 Attias et al. .................. 704/226
2002/0059065 A1* 5/2002 Rajan .......................... 704/226

OTHER PUBLICATIONS

Kawamura, Arata et al., "A Noise Reduction Method Based on Linear Prediction Analysis", IEICE Transactions on Fundamentals of Electronics, Communications and Computer Sciences, 2002, pp. 415-423, vol. J85-A, No. 4.

Kim, Wooil et al., "Noise Variance Estimation for Kalman Filtering of Noisy Speech", IEICE Trans. Inf. & Syst., 2001, pp. 155-160, vol. E84-D, No. 1.

Tanabe, Nan et al., "Robust noise suppression algorithm using Kalman filter theory with colored driving source", IEICE Technical Report, 2008, pp. 79-84, EA2007-125, The Institute of Electronics, Information and Communication Engineers.

Tanabe, et al., "A Kalman Filter based Fast Noise Suppression Algorithm," Digital Signal Processing Workshop and 5th IEEE Signal Processing Education Workshop, (2009), pp. 5-9.

Tanabe, et al., "Noise Suppression with High Speech Quality Based on Kalman Filter," International Symposium on Intelligent Signal Processing and Communication Systems (ISPACS2006), IEEE, (2006), pp. 315-318.

Tanabe, et al., "Robust Noise Suppression Algorithm with the Kalman Filter Theory for White and Colored Disturbance," IEICE Trans. Fundamentals, (2008), vol. E91A, No. 3, pp. 818-829.

Extended European Search Report, Application No. EP 09 72 2185, dated Feb. 28, 2012, seven (7) pages.

* cited by examiner

[INITIALIZATION]

$$\hat{x}_{cl}(0|0) = 0, \quad P_{cl}(0|0) = I, \quad r_{\epsilon cl}(n) = E\left[\epsilon_{cl}(n)\epsilon_{cl}(n)^T\right] = \sigma_v^2$$

$$R_{\delta cl}(n)[i,j] = \begin{cases} E\left[\left\{r(n) - \sum_{\ell=1}^{L_{cl}} a_\ell(n)r(n-\ell)\right\}^2\right] - \sigma_v^2 & (i,j=1) \\ 0 & (\text{other}) \end{cases}$$

[ITERATION]

STEP.1

AR PARAMETERS {$\alpha_i$(n)} ESTIMATION FOR THE CLEAN SPEECH SIGNAL d(n) USING THE LINEAR PREDICTION ALGORITHM

STEP.2

1. $P_{cl}(n+1|n) = \Phi_{cl} P_{cl}(n|n)\Phi_{cl}^T + R_{\delta cl}(n+1)$
2. $k_{cl}(n+1) = \{P_{cl}(n+1|n)m_{cl}\}\{m_{cl}^T P_{cl}(n+1|n)m_{cl} + r_{\epsilon_{cl}}(n+1)\}^{-1}$
3. $\hat{x}_{cl}(n+1|n) = \Phi_{cl}\hat{x}(n|n)$
4. $\hat{x}_{cl}(n+1|n+1) = \hat{x}_{cl}(n+1|n) + k_{cl}(n+1)\{y_{cl}(n+1) - m_{cl}^T \hat{x}_{cl}(n+1|n)\}$
5. $P_{cl}(n+1|n+1) = \{I - k_{cl}(n+1)m_{cl}^T\}P_{cl}(n+1|n)$

FIG.5 (prior art)

[INITIALIZATION]

$$\hat{x}_{c3}(0|0) = 0, \quad P_{c3}(0|0) = I$$

$$R_{\epsilon c3}(n)[i,j] = \begin{cases} 1 & (i,j=1) \\ \sigma_v^2 & (i=j \text{ and } i,j \neq 1) \\ 0 & (other) \end{cases}$$

$$R_{\delta c3}(n)[i,j] = \begin{cases} \dfrac{1}{L_{c3}-1} \sum_{\ell=1}^{L_{c3}-1} r^2(n-\ell) - \sigma_v^2 & (i,j=1) \\ 0 & (other) \end{cases}$$

[ITERATION]

1. $P_{c3}(n+1|n) = \Phi_{c3} P_{c3}(n|n)\Phi_{c3}^T + R_{\delta c3}(n+1)$
2. $K_{c3}(n+1) = \{P_{c3}(n+1|n)M_{c3}^T\}\{M_{c3}P_{c3}(n+1|n)M_{c3}^T + R_{\epsilon c3}(n+1)\}^{-1}$
3. $\hat{x}_{c3}(n+1|n) = \Phi_{c3}\hat{x}_{c3}(n|n)$
4. $\hat{x}_{c3}(n+1|n+1) = \hat{x}_{c3}(n+1|n) + K_{c3}(n+1)\{y_{c3}(n+1) - M_{c3}\hat{x}_{c3}(n+1|n)\}$
5. $P_{c3}(n+1|n+1) = \{I - K_{c3}(n+1)M_{c3}\}P_{c3}(n+1|n)$ FIG.10 (prior art)

NOISE (ERROR PRESENT)

⇩

NOT CORRECT

[INITIALIZATION]

$$\hat{x}_{c3}(0|0) = 0, \quad P_{c3}(0|0) = I$$

$$R_{e_{c3}}(n)[i,j] = \begin{cases} 1 & (i,j=1) \\ \sigma_v^2 & (i=j \text{ and } i,j \neq 1) \\ 0 & (other) \end{cases}$$

$$R_{\delta_{c3}}(n)[i,j] = \begin{cases} \frac{1}{L-1}\sum_{l=1}^{L_{c3}-1} r^2(n-l) - \sigma_v^2 & (i,j=1) \\ 0 & (other) \end{cases}$$

[ITERATION]

1. $P_{c3}(n+1|n) = \Phi_{c3} P_{c3}(n|n) \Phi_{c3}^T + R_{\delta_{c3}}(n+1)$

2. $K_{c3}(n+1) = \{P_{c3}(n+1|n) M_{c3}\} \{M_{c3}^T P_{c3}(n+1|n) M_{c3} + R_{e_{c3}}(n+1)\}^{-1}$ ← MATRIX

3. $\hat{x}_{c3}(n+1|n) = \Phi_{c3} \hat{x}_{c3}(n|n)$

4. $\hat{x}_{c3}(n+1|n+1) = \hat{x}_{c3}(n+1|n) + K_{c3}(n+1)\{y_{c3}(n+1) - M_{c3}^T \hat{x}_{c3}(n+1|n)\}$ 5. $P_{c3}(n+1|n+1) = \{I - K_{c3}(n+1) M_{c3}^T\} P_{c3}(n+1|n)$ FIG.15 (prior art)

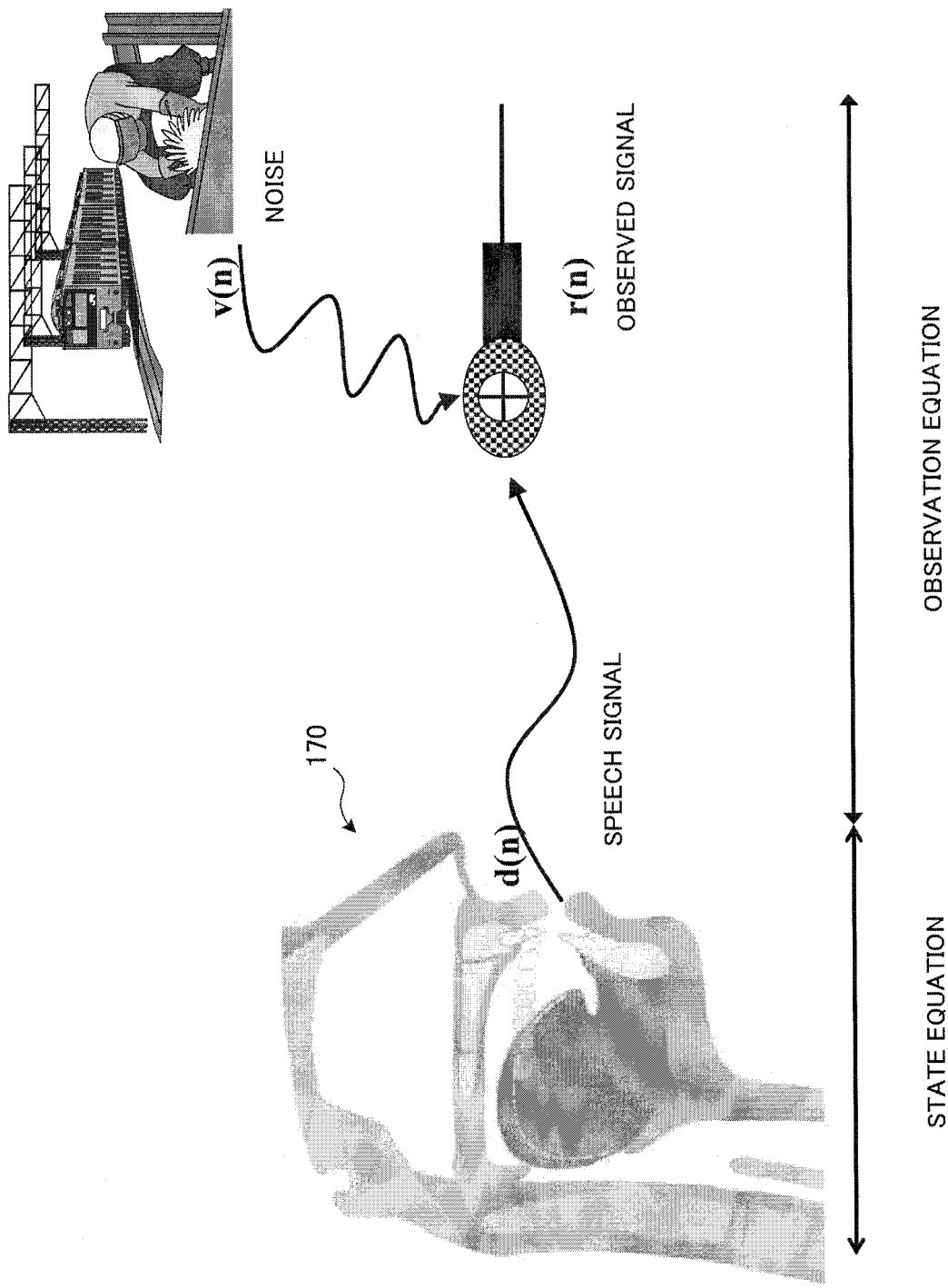

[INITIALIZATION]

$$\hat{x}_{p1}(0|0) = 0, \quad P_{p1}(0|0) = I, \quad r_{\epsilon_{p1}}(n) = \sigma_v^2$$

$$R_{\delta_{p1}}(n)[i,j] = \begin{cases} \frac{1}{L_{p1}-1} \sum_{l=1}^{L_{p1}-1} r^2(n-l) - \sigma_v^2 & (i,j=1) \\ 0 & (other) \end{cases}$$

[ITERATION]

1. $P_{p1}(n+1|n) = \Phi_{p1} P_{p1}(n|n) \Phi_{p1}^T + R_{\delta_{p1}}(n+1)$
2. $k_{p1}(n+1) = \{P_{p1}(n+1|n)m_{p1}\} \{m_{p1}^T P_{p1}(n+1|n)m_{p1} + r_{\epsilon_{p1}}(n+1)\}^{-1}$
3. $\hat{x}_{p1}(n+1|n) = \Phi_{p1} \hat{x}_{p1}(n|n)$
4. $\hat{x}_{p1}(n+1|n+1) = \hat{x}_{p1}(n+1|n) + k_{p1}(n+1) \{y_{p1}(n+1) - m_{p1}^T \hat{x}_{p1}(n+1|n)\}$
5. $P_{p1}(n+1|n+1) = \{I - k_{p1}(n+1) m_{p1}^T\} P_{p1}(n+1|n)$

FIG.21

$P_{p1}(n+1|n)[1,1]$ NECESSARY $$P_{p1}(n+1|n) = \Phi_{p1} P_{p1}(n|n) \Phi_{p1}^T + R_{\delta_{p1}}(n+1)$$

$$\begin{bmatrix} P_{p1}(n+1|n)[1,1] \\ P_{p1}(n+1|n)[2,1] \\ \vdots \\ P_{p1}(n+1|n)[L_{p1},1] \end{bmatrix} =$$

$$\begin{bmatrix} P_{p1}(n+1|n)[1,1] & P_{p1}(n+1|n)[1,2] & \cdots & P_{p1}(n+1|n)[1,L_{p1}] \\ \vdots & \ddots & \ddots & \vdots \\ P_{p1}(n+1|n)[1,2] & \ddots & \ddots & \vdots \\ \vdots & \ddots & \ddots & \vdots \\ P_{p1}(n+1|n)[1,L_{p1}] & \cdots & \cdots & P_{p1}(n+1|n)[L_{p1},L_{p1}] \end{bmatrix}$$

$$\begin{bmatrix} 0 & 1 & 0 & \cdots & 0 \\ 0 & 0 & 1 & \cdots & 0 \\ \vdots & \vdots & \ddots & \ddots & \vdots \\ 0 & 0 & \cdots & \cdots & 1 \end{bmatrix} \begin{bmatrix} P_{p1}(n|n)[1,1] \\ P_{p1}(n|n)[2,1] \\ \vdots \\ P_{p1}(n|n)[L_{p1},1] \end{bmatrix}$$

$$\begin{bmatrix} 0 & 1 & 0 & \cdots & 0 \\ 0 & 0 & 1 & \cdots & 0 \\ \vdots & \vdots & \ddots & \ddots & \vdots \\ 0 & 0 & \cdots & \cdots & 1 \end{bmatrix} + \begin{bmatrix} R_{\delta_{p1}}(n+1)[1,1] & 0 & \cdots & 0 \\ 0 & 0 & \cdots & 0 \\ \vdots & \vdots & \ddots & \vdots \\ 0 & 0 & \cdots & 0 \end{bmatrix}$$

$$\underline{P_{p1}(n+1|n)[1,1] = R_{\delta_{p1}}(n+1)[1,1]}$$

SCALAR

AMOUNT OF COMPUTATION REDUCED

FIG.26

[INITIALIZATION]

$$r_{c_{p2}}(n) = \sigma_v^2$$

$$r_{\delta_{p2}}(n) = \frac{1}{L_{p2}-1} \sum_{l=1}^{L_{p2}-1} r^2(n-l) - \sigma_v^2$$

[ITERATION]

1. $P_{p2}(n+1|n)[1,1] = r_{\delta_{p2}}(n+1)$
2. $k_{p2}(n+1)[1,1] = P_{p2}(n+1|n)[1,1]\{P_{p2}(n+1|n)[1,1] + r_{c_{p2}}(n+1)\}^{-1}$
3. $\hat{x}_{p2}(n+1|n+1) = k_{p2}(n+1)[1,1]y_{p2}(n+1)$

FIG.27

[INITIALIZATION]
$$r_{\varepsilon_{p2}}(n) = \sigma_v^2$$
$$r_{\delta_{p2}} = \frac{1}{L_{p2}-1} \sum_{l=1}^{L_{p2}-1} r^2(n-l) - \sigma_v^2$$
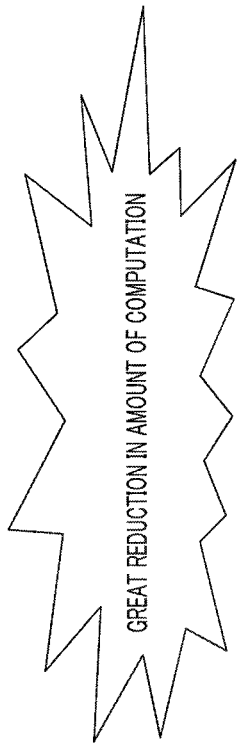
GREAT REDUCTION IN AMOUNT OF COMPUTATION
[ITERATION]
1. $P_{p2}(n+1|n)[1,1] = r_{\delta_{p2}}(n+1)$
2. $\mathbf{k}_{p2}(n+1)[1,1] = P_{p2}(n+1|n)[1,1]\{P_{p2}(n+1|n)[1,1] + r_{\varepsilon_{p2}}(n+1)\}^{-1}$
3. $\hat{\mathbf{x}}_{p2}(n+1|n+1)[1,1] = \mathbf{k}_{p2}(n+1)[1,1]y_{p2}(n+1)$
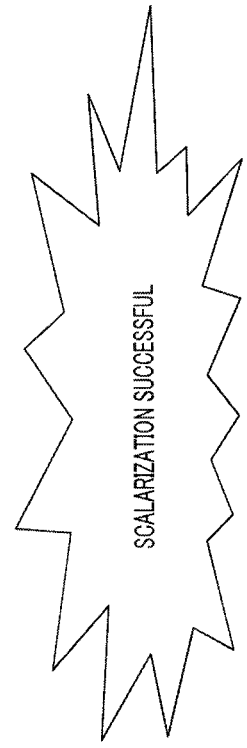
SCALARIZATION SUCCESSFUL
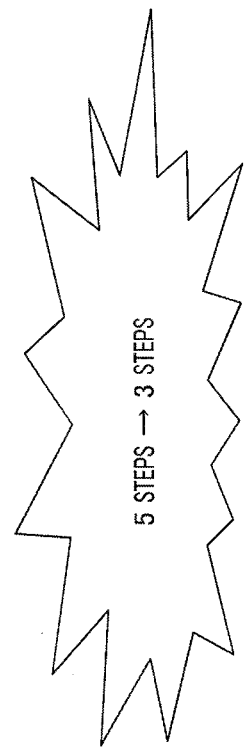
5 STEPS → 3 STEPS
FIG.28

| | |
|---|---|
| 1. $P_{cl}(n+1\|n) = \Phi_{cl}(n+1)P_{cl}(n\|n)\Phi_{cl}(n+1)^T + R_{\delta_{cl}}(n+1)$ | $2L_{cl}^2$ |
| 2. $k_{cl}(n+1) = \{P_{cl}(n+1\|n)m_{cl}\}\{m_{cl}^T P_{cl}(n+1\|n)m_{cl} + R_{c_{cl}}(n+1)\}^{-1}$ | $L_{cl}$ |
| 3. $\hat{x}_{cl}(n+1\|n) = \Phi_{cl}(n+1)\hat{x}_{cl}(n\|n)$ | $L_{cl}$ |
| 4. $\hat{x}_{cl}(n+1\|n+1) = \hat{x}_{cl}(n+1\|n) + k_{cl}(n+1)\{y_{cl}(n+1) - m_{cl}^T \hat{x}_{cl}(n+1\|n)\}$ | $L_{cl}$ |
| 5. $P_{cl}(n+1\|n+1) = \{I - k_{cl}(n+1)m_{cl}^T\}P_{cl}(n+1\|n)$ | $L_{cl}^2$ |
| TOTAL | $3L_{cl}^2 + 3L_{cl}$ |

FIG.30A (prior art)

| | |
|---|---|
| 1. $P_{c3}(n+1\|n) = \Phi_{c3} P_{c3}(n\|n)\Phi_{c3}^T + R_{\delta c3}(n+1)$ | 0 |
| 2. $K_{c3}(n+1) = \{P_{c3}(n+1\|n)M_{c3}^T\}\{M_{c3} P_{c3}(n+1\|n)M_{c3}^T + R_{cc3}(n+1)\}^{-1}$ | $L_{c3} - 1$ |
| 3. $\hat{x}_{c3}(n+1\|n) = \Phi_{c3} \hat{x}_{c3}(n\|n)$ | 0 |
| 4. $\hat{x}_{c3}(n+1\|n+1) = \hat{x}_{c3}(n+1\|n) + K_{c3}(n+1)\{y_{c3}(n+1) - M_{c3}\hat{x}_{c3}(n+1\|n)\}$ | $L_{c3} - 1$ |
| 5. $P_{c3}(n+1\|n+1) = \{I - K_{c3}(n+1)M_{c3}\}P_{c3}(n+1\|n)$ | $L_{c3} - 1$ |
| TOTAL | $3L_{c3} - 3$ |

FIG.30B (prior art)

| | |
|---|---|
| 1. $P_{p1}(n+1\|n) = \Phi_{p1} P_{p1}(n\|n)\Phi_{p1}^T + R_{\delta p1}(n+1)$ | 0 |
| 2. $k_{p1}(n+1) = \{P_{p1}(n+1\|n)m_{p1}\}\{m_{p1}^T P_{p1}(n+1\|n)m_{p1} + r_{cp1}(n+1)\}^{-1}$ | 1 |
| 3. $\hat{x}_{p1}(n+1\|n) = \Phi_{p1}\hat{x}_{p1}(n\|n)$ | 0 |
| 4. $\hat{x}_{p1}(n+1\|n+1) = \hat{x}_{p1}(n+1\|n) + k_{p1}(n+1)\{y_{p1}(n+1) - m_{p1}^T \hat{x}_{p1}(n+1\|n)\}$ | 1 |
| 5. $P_{p1}(n+1\|n+1) = \{I - k_{p1}(n+1)m_{p1}^T\}P_{p1}(n+1\|n)$ | 1 |
| TOTAL | 3 |

FIG.30C (prior art)

| | |
|---|---|
| 1. $P_{p2}(n+1\|n)[1,1] = r_{\delta p2}(n+1)$ | 0 |
| 2. $k_{p2}(n+1)[1,1] = P_{p2}(n+1\|n)[1,1]\{P_{p2}(n+1\|n)[1,1] + r_{cp2}(n+1)\}^{-1}$ | 1 |
| 3. $\hat{x}_{p2}(n+1\|n+1) = k_{p2}(n+1)[1,1]y_{p2}(n+1)$ | 1 |
| TOTAL | 2 |

FIG.30D (prior art)

NOISE SUPPRESSION AMOUNT SNRout UNDER CONDITIONS OF SPEECH (A-1) AND NOISE (B-1)

| SNRin[dB] | L | CONVENTIONAL METHOD 1 | CONVENTIONAL METHOD 2 | CONVENTIONAL METHOD 3 | INVENTION METHODS 1&2 |
|---|---|---|---|---|---|
| 0 | 20 | 1.14 | 1.48 | 4.28 | 5.00 |
|   | 30 | 0.17 | 2.81 | 4.68 | 5.13 |
|   | 40 | 0.02 | 2.97 | 4.76 | 5.12 |
|   | 50 | 0.00 | 2.97 | 4.82 | 5.06 |
| 5 | 20 | 4.09 | 7.12 | 8.06 | 8.57 |
|   | 30 | 2.48 | 7.13 | 8.29 | 8.63 |
|   | 40 | 0.87 | 6.70 | 8.32 | 5.12 |
|   | 50 | 0.15 | 7.03 | 8.25 | 8.53 |
| 10 | 20 | 8.67 | 11.73 | 12.20 | 12.59 |
|    | 30 | 7.90 | 11.73 | 12.33 | 12.62 |
|    | 40 | 6.12 | 11.72 | 12.34 | 12.59 |
|    | 50 | 4.51 | 11.73 | 12.30 | 12.53 |

FIG.37

NOISE SUPPRESSION AMOUNT SNRout UNDER CONDITIONS OF SPEECH (A-2) AND NOISE (B-1)

| SNRin[dB] | L | CONVENTIONAL METHOD 1 | CONVENTIONAL METHOD 2 | CONVENTIONAL METHOD 3 | INVENTION METHODS 1&2 |
|---|---|---|---|---|---|
| 0 | 20 | 0.56 | 2.02 | 4.57 | 5.15 |
|   | 30 | 0.03 | 2.02 | 5.16 | 5.38 |
|   | 40 | −0.00 | 2.03 | 5.40 | 5.56 |
|   | 50 | −0.01 | 2.04 | 5.57 | 5.66 |
| 5 | 20 | 1.85 | 6.35 | 8.76 | 9.11 |
|   | 30 | 0.18 | 6.34 | 9.12 | 9.25 |
|   | 40 | 0.07 | 6.34 | 9.28 | 9.39 |
|   | 50 | 0.01 | 6.34 | 9.38 | 9.45 |
| 10 | 20 | 6.15 | 11.37 | 13.17 | 13.43 |
|    | 30 | 0.43 | 11.28 | 13.45 | 13.55 |
|    | 40 | 0.19 | 11.60 | 13.57 | 13.62 |
|    | 50 | 0.07 | 11.34 | 13.62 | 13.67 |

FIG.38

NOISE SUPPRESSION AMOUNT SNRout UNDER CONDITIONS OF SPEECH (A-1) AND NOISE (B-2)

| SNRin[dB] | L | CONVENTIONAL METHOD 1 | CONVENTIONAL METHOD 2 | CONVENTIONAL METHOD 3 | INVENTION METHODS 1&2 |
|---|---|---|---|---|---|
| 0 | 20 | −0.02 | 1.45 | 1.76 | 2.81 |
|   | 30 | −0.02 | 1.44 | 2.80 | 3.51 |
|   | 40 | −0.01 | 1.43 | 3.21 | 3.89 |
|   | 50 | −0.01 | 1.43 | 3.61 | 4.09 |
| 5 | 20 | −0.02 | 5.47 | 6.10 | 7.17 |
|   | 30 | −0.01 | 5.46 | 7.06 | 7.70 |
|   | 40 | −0.00 | 5.46 | 7.47 | 7.90 |
|   | 50 | −0.01 | 5.45 | 7.73 | 8.04 |
| 10 | 20 | 0.03 | 10.96 | 11.01 | 11.84 |
|   | 30 | 0.18 | 10.96 | 11.82 | 12.19 |
|   | 40 | 0.34 | 10.95 | 12.04 | 12.30 |
|   | 50 | −0.00 | 10.95 | 12.19 | 12.36 |

FIG.39

NOISE SUPPRESSION AMOUNT SNRout UNDER CONDITIONS OF SPEECH (A-2) AND NOISE (B-2)

| SNRin[dB] | L | CONVENTIONAL METHOD 1 | CONVENTIONAL METHOD 2 | CONVENTIONAL METHOD 3 | INVENTION METHODS 1&2 |
|---|---|---|---|---|---|
| 0 | 20 | −0.03 | 0.60 | 1.31 | 2.70 |
|   | 30 | −0.01 | 1.60 | 2.71 | 3.31 |
|   | 40 | −0.01 | 1.61 | 3.36 | 3.78 |
|   | 50 | −0.01 | 1.61 | 4.07 | 4.32 |
| 5 | 20 | −0.01 | 5.12 | 6.11 | 6.88 |
|   | 30 | −0.02 | 6.12 | 7.20 | 7.71 |
|   | 40 | −0.00 | 6.13 | 7.93 | 8.23 |
|   | 50 | −0.02 | 6.14 | 8.43 | 8.59 |
| 10 | 20 | −0.00 | 10.65 | 11.07 | 11.96 |
|   | 30 | −0.00 | 10.65 | 12.20 | 12.60 |
|   | 40 | 0.02 | 10.66 | 12.71 | 12.94 |
|   | 50 | −0.01 | 10.66 | 13.08 | 13.20 |

FIG.40

NOISE SUPPRESSION DEVICE AND NOISE SUPPRESSION METHOD

TECHNICAL FIELD

The present invention relates to a noise suppression apparatus and noise suppression method.

BACKGROUND ART

Removing unnecessary information (noise) from observed information (information corrupted by noise and so forth) in which unnecessary information (noise) is mixed in with desired information (a desired signal), and extracting only desired information, is an important technology in the fields of speech and radio communications, imaging, attitude control, recognition, industrial/welfare/medical robotics, and the like, and has been the subject of considerable research and development in recent years.

For example, a method whereby a single microphone is used and a method whereby a microphone array comprising a plurality of microphones is used have been proposed as heretofore known noise suppression methods in the speech field.

However, with a method that uses a microphone array, microphones at least equal in number to the number of noise sources are necessary, and therefore the number of microphones inevitably increases in proportion to an increase in the number of sound sources, and the cost increases. There are also cases in which practical application is difficult, such as when there is a limit to the number of microphones that can be installed in communication products that are continually becoming smaller in size, such as mobile phones, or when controlling differences in the characteristics of the microphones. Consequently, the development of a noise suppression method that uses a single microphone currently represents the mainstream.

The following are known as conventional noise suppression method algorithms using only a single microphone.

An ANC (adaptive noise canceller) algorithm described in Non-Patent Document 1 reduces a noise signal by employing the periodicity of a speech signal.

A noise suppression algorithm based on linear prediction is described in Non-Patent Document 2. This, algorithm does not require the pitch estimation required by ANC described in Non-Patent Document 1, or prior knowledge concerning a noise power spectrum or noise average direction.

Separately from the above algorithms, a noise suppression algorithm based on a Kalman filter is proposed in Non-Patent Document 3. This algorithm models a speech signal autoregressive (AR) system from an observed signal. Furthermore, this algorithm estimates an AR system parameter (hereinafter "AR coefficient"), and executes noise suppression based on a Kalman filter using the estimated AR coefficient.

Most Kalman filter-based algorithms normally operate in two stages. That is to say, this kind of algorithm first estimates an AR coefficient, and then performs noise suppression based on a Kalman filter using the estimated AR coefficient.

Non-Patent Document 1: J. R. Deller, J. G. Proakis, J. H. L. Hansen, "Discrete-Time Processing of Speech signals," Macmillan Press, 1993

Non-Patent Document 2: A. Kawamura, K. Fujii, Y. Itoh and Y. Fukui, "A Noise Reduction Method Based on Linear Prediction Analysis," IEICE Trans. Fundamentals, vol. J85-A, no. 4, pp. 415-423, May 2002

Non-Patent Document 3: W. Kim and H. Ko, "Noise Variance Estimation for Kalman Filtering of Noise Speech," IEICE Trans. Inf. & syst., vol. E84-D, no. 1, pp. 155-160, January 2001

Non-Patent Document 4: N. Tanabe, T. Inoue, K. Sueyoshi, T. Furukawa, H. Kubota, H. Matsue, and S. Tsujii, "Robust Noise Suppression Algorithm using Kalman Filter Theory with Colored Driving Source," IEICE Technical Report, EA2007-125, pp. 79-84, March 2008

DISCLOSURE OF INVENTION

Problems to be Solved by the Invention

However, the heretofore known algorithm described in Non-Patent Document 1 requires accurate estimation of the pitch periodicity of a speech signal. Consequently, a problem with this algorithm is that its noise suppression capability is degraded by noise.

In this regard, the algorithm described in Non-Patent Document 2 enables noise suppression without requiring accurate estimation of the pitch periodicity of a speech signal. Furthermore, this algorithm is based on a simple principle and has the advantage of enabling the amount of computation to be reduced. However, the noise suppression capability of this algorithm depends on the periodicity and linearity of an input speech signal. In other words, there are certain limits to the practical application of this algorithm because it contains parameters that depend on a speech signal.

The algorithm described in Non-Patent Document 3 has high noise suppression capability, and is suitable for application to acoustic fields in which the achievement of particularly high sound quality is desired.

On the other hand, however, a problem with this algorithm is that it requires an AR coefficient, and therefore noise suppression capability (that is, the performance of the Kalman filter algorithm) largely depends on the accuracy of AR coefficient estimation. That is to say, if an AR coefficient is not estimated accurately, not only can noise not be suppressed, but in some cases there is also a possibility of noise being added and a speech signal itself being suppressed. These factors may cause degradation of the sound quality of a speech signal for which noise has been suppressed.

In this regard, accurate estimation of an AR coefficient is generally difficult. This is because accurate AR coefficient estimation, in the case of noise suppression, for example, depends on a clear signal—that is, a desired signal (for example, a speech signal). This means that a speech signal must be known, making real-time processing difficult. Also, even if it were possible to estimate an AR coefficient accurately in real time by some means or other, the problem of the amount of computation could not be avoided due to an increase in processing. Moreover, in the first place, although AR coefficient estimation is performed after the degree of an AR coefficient is decided, deciding the degree of an AR coefficient is extremely difficult, and in this regard, also, accurate AR coefficient estimation can be said to be difficult.

Thus, the present inventors proposed the noise suppression method described in Non-Patent Document 4 in order to solve the problems of a conventional noise suppression method based on a Kalman filter (see Non-Patent Document 3). To be more specific, whereas with a conventional noise suppression method based on a Kalman filter an AR coefficient is estimated using linear prediction and then noise suppression is implemented by executing. Kalman filtering using that result, with the method of this proposal, noise suppression is implemented by means of a new prediction method comprising a state equation and an observation equation. Consequently, with the method of this proposal, a new state space model (comprising a state equation and observation equation) is configured. To be more specific, a state equation is configured using only a clear signal from an information source—that is, a desired signal (for example, a speech signal)—and an observation'equation is configured using that clear signal and noise.

However, with a state space model of the method of this proposal, noise suppression is executed using a large amount of past information by vectorizing an observed signal. But, since noise is also mixed in with a past observed signal (that is, error is present), an observed signal vector using a large amount of past information includes noise (error). That is to say, the proposition that many past observed signals are necessary in order to improve the estimation accuracy of a prediction is not necessarily correct. Therefore, with the method of this proposal, there is a certain limit to improvement of the estimation accuracy for a desired signal (that is, noise suppression capability). Also, since an algorithm of the method of this proposal requires inverse matrix computation, there is a certain limit to the effect of reducing the amount of computation as compared with a conventional noise suppression method based on a Kalman filter. The point regarding the use of a large amount of past information also applies to other conventional noise suppression methods (see Non-Patent Documents 1 through 3).

It is therefore an object of the present invention to provide a noise suppression apparatus and noise suppression method that enable higher noise suppression capability to be achieved by means of a simpler configuration and with a smaller amount of computation, without degrading the quality of desired information.

Means for Solving the Problem

A noise suppression apparatus of the present invention estimates desired information from only observed information in which noise is mixed in with the desired information, and employs a configuration having: a correlation computation section that calculates a correlation value of estimation error when a system state quantity of time n+1 that includes the desired information is estimated based on information up to time n or time n+1 for observed information of only time n; a weighting coefficient calculation section that uses a correlation value calculated by the correlation computation section for observed information of only time n to calculate a weighting coefficient for specifying relationships of an optimum estimate of the state quantity at that time based on information up to time n+1, an optimum estimate of the state quantity at time n+1 based on information up to time n, and estimation error of an observed quantity including the observed information; and an optimum estimate calculation section that uses a weighting coefficient calculated by the weighting coefficient calculation section for observed information of only time n to calculate an optimum estimate of the state quantity at that time based on information up to time n or time n+1.

A noise suppression apparatus of the present invention preferably estimates desired information from only observed information in which noise is mixed in with the desired information, and employs a configuration having: a correlation computation section that calculates as a scalar quantity a correlation value of estimation error when a system state quantity of time n+1 that includes the desired information is estimated based on information up to time n for observed information of only time n; a weighting coefficient calculation section that uses the scalar quantity of the correlation value of estimation error calculated by the correlation computation section for observed information of only time n to calculate as a scalar quantity a weighting coefficient for specifying relationships of an optimum estimate of the state quantity at that time based on information up to time n+1, an optimum estimate of the state quantity at time n+1 based on information up to time n, and estimation error of an observed quantity including the observed information; and an optimum estimate calculation section that uses the scalar quantity of the weighting coefficient calculated by the weighting coefficient calculation section for observed information of only time n to calculate as a scalar quantity an optimum estimate of the state quantity at that time based on information up to time n+1.

A noise suppression apparatus of the present invention preferably estimates desired information from only observed information in which noise is mixed in with the desired information, and employs a configuration having: a first correlation computation section that calculates as a matrix a correlation value of estimation error when a system state quantity of time n+1 that includes the desired information is estimated based on information up to time n for observed information of only time n; a weighting coefficient calculation section that uses the matrix of the correlation value of estimation error calculated by the first correlation computation section for observed information of only time n to calculate as a vector quantity a weighting coefficient for specifying relationships of an optimum estimate of the state quantity at that time based on information up to time n+1, an optimum estimate of the state quantity at time n+1 based on information up to time n, and estimation error of an observed quantity including the observed information; a first optimum estimate calculation section that calculates as a vector quantity an optimum estimate of the state quantity at time n+1 based on information up to time n for observed information of only time n; a second optimum estimate calculation section that uses the vector quantity of the weighting coefficient calculated by the weighting coefficient calculation section for observed information of only time n to calculate as a vector quantity an optimum estimate of the state quantity at that time based on information up to time n+1; and a second correlation computation section that calculates as a matrix a correlation value of estimation error when a state quantity of that time is estimated based on information up to time n+1 for observed information of only time n.

A noise suppression method of the present invention estimates desired information from only observed information in which noise is mixed in with the desired information, and has: a correlation computation step of calculating a correlation value of estimation error when a system state quantity of time n+1 that includes the desired information is estimated based on information up to time n or time n+1 for observed information of only time n; a weighting coefficient calculation step of using a correlation value calculated by the correlation computation step for observed information of only time n to calculate a weighting coefficient for specifying relationships of an optimum estimate of the state quantity at that time based on information up to time n+1, an optimum estimate of the state quantity at time n+1 based on information up to time n, and estimation error of an observed quantity including the observed information; and an optimum estimate calculation step of using a weighting coefficient calculated by the weighting coefficient calculation step for observed information of only time n to calculate an optimum estimate of the state quantity at that time based on information up to time n or time n+1.

A noise suppression method of the present invention preferably estimates desired information from only observed information in which noise is mixed in with the desired information, and has: a correlation computation step of calculating as a scalar quantity a correlation value of estimation error when a system state quantity of time n+1 that includes the desired information is estimated based on information up to time n for observed information of only time n; a weighting coefficient calculation step of using the scalar quantity of the correlation value of estimation error calculated by the correlation computation step for observed information of only time n to calculate as a scalar quantity a weighting coefficient for specifying relationships of an optimum estimate of the state quantity at that time based on information up to time n+1, an optimum estimate of the state quantity at time n+1 based on information up to time n, and estimation error of an observed quantity including the observed information; and an optimum estimate calculation step of using the scalar quantity of the weighting coefficient calculated by the weighting coefficient calculation step for observed information of only time n to calculate as a scalar quantity an optimum estimate of the state quantity at that time based on information up to time n+1.

A noise suppression method of the present invention preferably estimates desired information from only observed information in which noise is mixed in with the desired information, and has: a first correlation computation step of calculating as a matrix a correlation value of estimation error when a system state quantity of time n+1 that includes the desired information is estimated based on information up to time n for observed information of only time n; a weighting coefficient calculation step of using the matrix of the correlation value of estimation error calculated by the first correlation computation step for observed information of only time n to calculate as a vector quantity a weighting coefficient for specifying relationships of an optimum estimate of the state quantity at that time based on information up to time n+1, an optimum estimate of the state quantity at time n+1 based on information up to time n, and estimation error of an observed quantity including the observed information; a first optimum estimate calculation step of calculating as a vector quantity an optimum estimate of the state quantity at time n+1 based on information up to time n for observed information of only time n; a second optimum estimate calculation step of using the vector quantity of the weighting coefficient calculated by the weighting coefficient calculation step for observed information of only time n to calculate as a vector quantity an optimum estimate of the state quantity at that time based on information up to time n+1; and a second correlation computation step of calculating as a matrix a correlation value of estimation error when a state quantity of that time is estimated based on information up to time n+1 for observed information of only time n.

Advantageous Effects of Invention

The present invention enables higher noise suppression capability to be achieved by means of a simpler configuration and with a smaller amount of computation, without degrading the quality of desired information

BRIEF DESCRIPTION OF DRAWINGS

FIG. 5 is a drawing showing an algorithm of conventional method 1;

FIG. 10 is a drawing showing an algorithm of conventional method 3;

FIG. 15 is an explanatory drawing visually summarizing another problem with conventional method 3;

FIG. 16 is a schematic diagram for visually explaining a state space model of invention method 1 of this embodiment;

FIG. 21 is a drawing showing an algorithm of invention method 1;

FIG. 26 is a step-by-step explanatory drawing following on from FIG. 25;

FIG. 27 is a drawing showing an algorithm of invention method 2;

FIG. 28 is an explanatory drawing visually summarizing the advantages of an algorithm of invention method 2;

FIG. 30A is a drawing for explaining the amount of computation of conventional method 1, FIG. 30B is a drawing for explaining the amount of computation of conventional method 3, FIG. 30C is a drawing for explaining the amount of computation of invention method 1, and FIG. 30D is a drawing for explaining the amount of computation of conventional method 2;

FIG. 37 is a drawing showing the results of a first example of numerical simulation of the noise suppression capability of each method;

FIG. 38 is a drawing showing the results of a second example of numerical simulation of the noise suppression capability of each method;

FIG. 39 is a drawing showing the results of a third example of numerical simulation of the noise suppression capability of each method;

FIG. 40 is a drawing showing the results of a fourth example of numerical simulation of the noise suppression capability of each method;

BEST MODE FOR CARRYING OUT THE INVENTION

Now, embodiments of the present invention will be described in detail with reference to the accompanying drawings.

For convenience, in the following descriptions, a conventional noise suppression method based on a Kalman filter described in Non-Patent Document 3 is referred to as "conventional method 1", a non-Kalman-filter conventional noise suppression method based on linear prediction described in Non-Patent Document 2 is referred to as "conventional method 2", and a noise suppression method described in Non-Patent Document 4 according to a proposal of the present inventors is referred to as "conventional method 3".

In this specification, "noise" is normally used in a broad sense that includes all unnecessary information apart from desired information, but in the case of images, in particular, "noise" is used in a narrow sense that excludes "blurring" in order to differentiate it from "blurring", which is one cause of image degradation. Also, "speech" is not limited to the human voice and is used in a broad sense that includes sounds in general, including the human voice.

(Embodiment 1)

Figure 1:
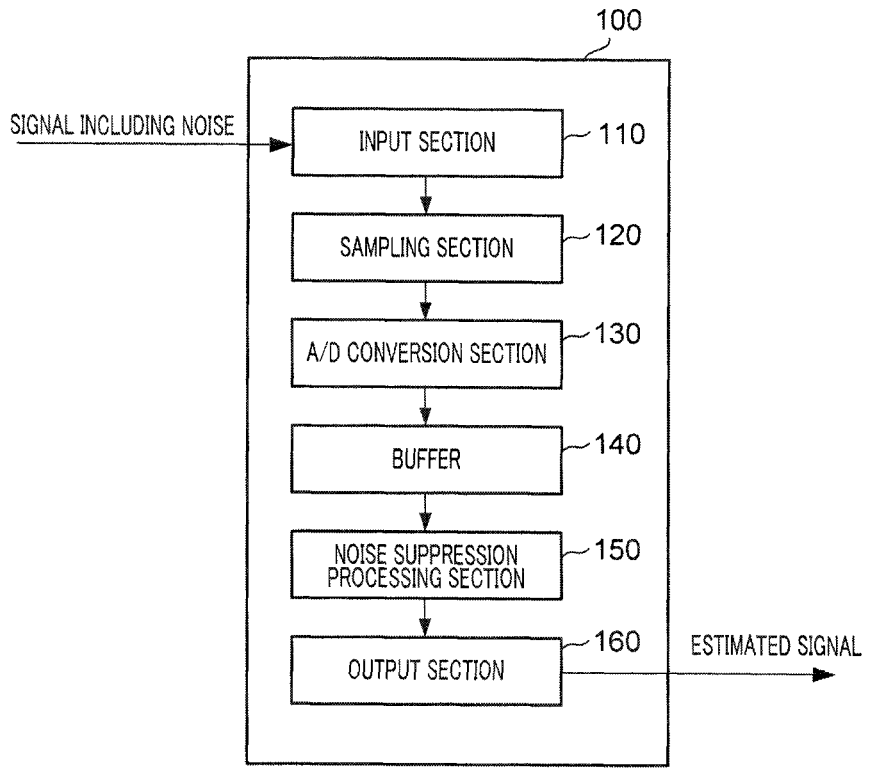
FIG. 1 is a block diagram showing a configuration of a noise suppression apparatus according to embodiment 1 of the present invention.

FIG. 1 is a block diagram showing a configuration of a noise suppression apparatus according to embodiment 1 of the present invention.

Noise suppression apparatus 100 shown in FIG. 1 has input section 110, sampling section 120, A/D conversion section 130, buffer 140, noise suppression processing section 150, and output section 160.

Input section 110 has observed information or an observed signal as input. An observed signal is a signal in which a clear signal from an information source (a desired signal) and noise are combined (mixed together). Input section 110 performs input processing on an input analog observed signal, for example, and outputs the signal to sampling section 120. Input processing is, for example, band-limiting processing, automatic gain control processing, and so forth.

Sampling section 120 performs sampling processing on the input analog observed signal at a predetermined sampling frequency (for example, 16 kHz), and outputs the result to A/D conversion section 130. The sampling frequency can be changed according to the detection target (information source).

A/D conversion section 130 performs A/D conversion processing on an amplitude value of the sampled observed signal at a predetermined resolution (for example, 8 bits), and sends the result to buffer 140. Buffer 140 outputs a signal frame (block) of predetermined number of samples N to noise suppression processing section 150.

Noise suppression processing section 150 is a characteristic component of the present invention that incorporates a noise suppression algorithm described later herein. For example, whereas with conventional method 1 based on a Kalman filter an AR coefficient is estimated using linear prediction and then noise suppression is implemented by executing Kalman filtering using that result, with a noise suppression method of the present invention (hereinafter "invention method") noise suppression is implemented by means of a new prediction method comprising a state equation and an observation equation, in a similar way to conventional method 3 as regards the general basic framework. That is to say, with an invention method, a new state space model (comprising a state equation and observation equation) not requiring AR coefficient estimation is configured. To be more specific, a state equation is configured using only a clear signal from an information source (a desired signal), and an observation equation is configured using that clear signal and noise. However, in relation to the actual configuration for implementing the basic framework of an invention method, with regard to observed information or an observed signal, noise suppression is not executed using a large amount of past information as in the case of conventional method 3. Instead, high-performance noise suppression is executed using only information from one particular time (instantaneous information). Noise suppression processing section 150 estimates a desired signal (a clear signal from an information source) from only an observed signal of one particular time using an internal noise suppression algorithm. An estimated signal estimated by noise suppression processing section 150 is temporarily stored in noise suppression processing section 150, and then output to output section 160.

Thus, in this specification, "noise suppression" refers to estimating a desired signal (for example, a speech signal) from only an observed signal, and is a totally different concept from "noise cancellation" whereby a desired signal is estimated by estimating and subtracting noise, in that subtraction is not performed. Also, in this specification, as stated above, "noise" normally means all unnecessary information separate from desired information—in other words, all signals other than a desired signal among all signals included in an observed signal.

Output section 160 outputs externally, in a predetermined form, an estimated signal input from noise suppression processing section 150. Output section 160 comprises, for example, a speaker and/or display, communication means, storage apparatus, and so forth.

Figure 2:
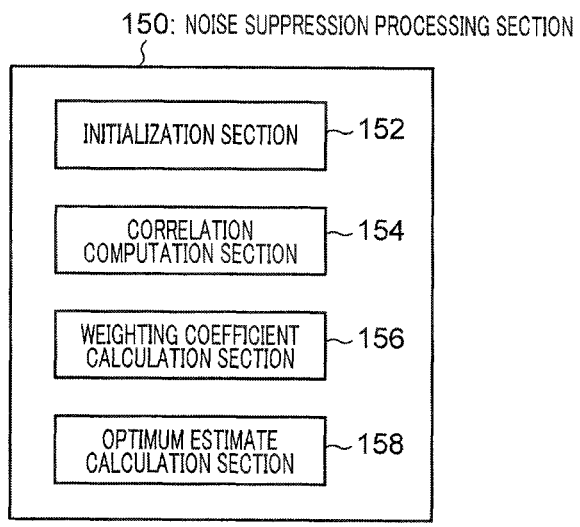
FIG. 2 is a block diagram showing the configuration of the noise suppression processing section in FIG. 1.

FIG. 2 is a block diagram showing the configuration of noise suppression processing section 150 in FIG. 1.

As shown in FIG. 2, noise suppression processing section 150 has initialization section 152, correlation computation section 154, weighting coefficient calculation section 156, and optimum estimate calculation section 158. Noise suppression processing section 150 estimates a desired signal (a clear signal from an information source) from only an observed signal of one particular time, by executing an internal noise suppression algorithm (invention method) through the collaborative operation of sections 152 through 158. At this time, initialization section 152 initializes an algorithm of the invention method, correlation computation section 154 performs desired signal estimation error correlation computation, weighting coefficient calculation section 156 calculates a weighting coefficient necessary for calculation of an optimum estimate of a desired signal, and optimum estimate calculation section 158 calculates an optimum estimate of a desired signal. Details of the actual processing performed by sections 152 through 158 will be given later herein.

Noise suppression processing operations performed by noise suppression processing section 150 are described in detail below. To further clarify the characteristics of an invention method, conventional methods (specifically, conventional method 1 and conventional method 3) are first described, and an invention method is described in detail in contrast to these conventional methods. A case is described here by way of example in which a clear signal from an information source (a desired signal) is a speech signal.

Figure 3:
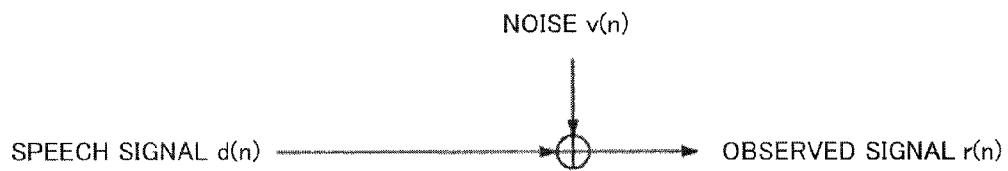
FIG. 3 is a drawing showing a model presupposed by the present invention.

FIG. 3 is a drawing showing a model presupposed by the present invention. Observed signal r(n) input to noise suppression processing section 150 includes clear signal from an, information source (desired signal) (for example, speech signal) d(n) and noise v(n), and satisfies equation 1 below.

[1]
$$r(n) = d(n) + v(n) \quad \text{(Equation 1)}$$

That is to say, taking a speech signal as an example, observed signal r(n) audible to the human ear is generally represented by the model in FIG. 3 in which noise v(n) has been added to speech signal d(n), and as a numeric expression is written as shown in equation 1 above. Here, variance $\sigma_v^2$ is assumed for noise v(n). Also, "n" is apparatus time n. Assuming the processing start time to be time 0 in a discrete time series generated by sampling section 120, time n means the n-th time therefrom. As stated above, it is an object of the present invention to restore (estimate) high-sound-quality speech signal d(n) of one particular time from only observed signal r(n) of that time.

[Conventional Method 1]

First, conventional method 1 will be described.

With a conventional noise suppression method using a Kalman filter, speech signal d(n) is extracted from observed signal r(n) by first estimating an AR coefficient of speech signal d(n) in a first step (step 1), and then executing a Kalman filter algorithm using the AR coefficient estimated in step 1 in a second step (step 2). That is to say, with conventional method 1, in step 1 an AR system parameter (AR coefficient) for a speech signal is estimated by means of linear prediction (AR coefficient estimation), and in step 2 noise suppression is performed by means of a Kalman filter using the AR coefficient estimated in step 1 (speech signal restoration).

In step 1 (AR coefficient estimation), assuming that speech signal d(n) is represented by an AR process, speech signal d(n) given by equation 1 is expressed as shown in equation 2 below.

(Equation 2)
$$d(n) = \sum_{l=1}^{L_{c1}} \alpha_l d(n-l) + e(n) \quad [2]$$

Here, $\alpha_1(n)$ is an AR coefficient at time n, $L_{c1}$ is the degree of the AR coefficient, and e(n) is prediction error (modeling error) when the driving source—that is, speech signal d(n)—is modeled by the AR system of $L_{c1}$-th order shown in equation 2. The driving source is assumed to be a zero-mean white Gaussian process. Subscript "c1" indicates that this item relates to conventional method 1.

As is common knowledge, with conventional method 1 preconditions are that noise v(n) is zero-mean and is white noise. In other words, with conventional method 1, it is assumed that speech signal d(n) and noise v(n) are uncorrelated.

Figure 4:
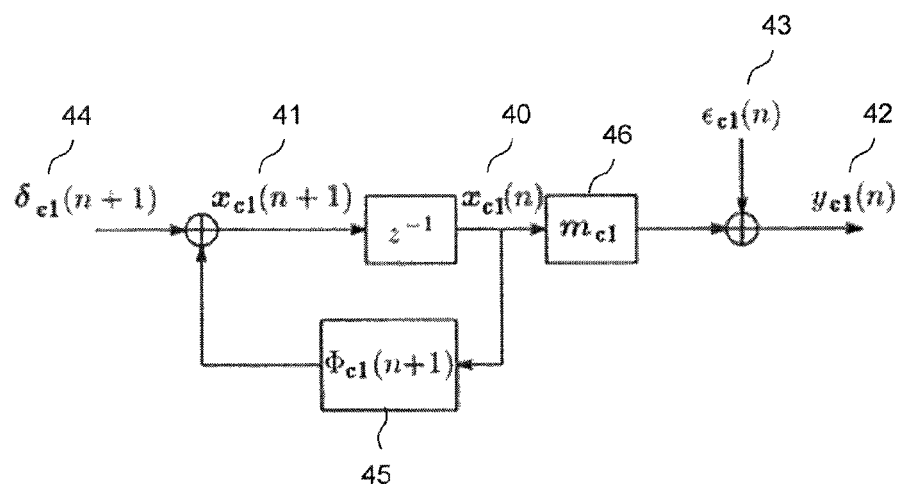
FIG. 4 is a block diagram representing a system configuration of a state space model of conventional method 1.

That is to say, in step 2 (speech signal restoration), in order to configure a state space model (comprising a state equation and observation equation) based on Kalman filter theory, driving source $\delta_{c1}(n)$ must be a white signal, and state quantity $x_{c1}(n)$ and noise v(n) must be uncorrelated. On this basis, a state space model (comprising a state equation and observation equation) using AR coefficient $\alpha_1(n)$ found in step 1 is written as equations 3 below. Vectors $x_{c1}$, $\delta_{c1}$, and $m_{c1}$, scalars $y_{c1}$ and $\epsilon_{c1}$, and matrix $\Phi_{c1}$ in equations 3 are defined by equations 4 below. Vector $x_{c1}$ is a state vector of $L_{c1} \times 1$-th order comprising a speech signal, vector $\delta_{c1}$ is a driving source vector of $L_{c1} \times 1$-th order, scalar $y_{c1}$ is an observed signal, scalar $\epsilon_{c1}$ is noise, matrix $\Phi_{c1}$ is a state transition matrix of $L_{c1} \times L_{c1}$-th order, and vector $m_{c1}$ is an observation transition vector of $L_{c1} \times 1$-th order. FIG. 4 represents a system configuration diagram according to this state space model by means of a block diagram.

(Equation 3)

$$\left.\begin{array}{l}[\text{STATE EQUATION}]\\ x_{c1}(n+1) = \Phi_{c1}(n+1)x_{c1}(n) + \delta_{c1}(n+1)\\ [\text{OBSERVATION EQUATION}]\\ y_{c1}(n+1) = m_{c1}^T x_{c1}(n+1) + \epsilon_{c1}(n+1)\end{array}\right\} \quad [3]$$

(Equation 4)

$$\left.\begin{array}{l}x_{c1}(n+1) = [d(n+1), d(n), \ldots, d(n-L_{c1}+2)]^T\\ \delta_{c1}(n+1) = [e(n+1), 0, \ldots, 0]^T\\ y_{c1}(n+1) = r(n+1), \epsilon_{c1}(n+1) = v(n+1)\\ \Phi_{c1}(n+1) = \begin{bmatrix} \alpha_1(n+1) & \alpha_2(n+1) & \ldots & \ldots & \alpha_{L_{c1}}(n+1) \\ 1 & 0 & \ldots & \ldots & 0 \\ 0 & \ddots & \ddots & & \vdots \\ \vdots & & \ddots & \ddots & \vdots \\ 0 & \ldots & & 0 & 1 & 0 \end{bmatrix}\\ m_{c1} = [1, 0, \ldots, 0]^T\end{array}\right\} \quad [4]$$

In FIG. 4, "40" is state vector $x_{c1}(n)$ at time n, "41" is state vector $x_{c1}(n+1)$ at time n+1, "42" is observed signal $y_{c1}(n)$ at time n, "43" is noise $\epsilon_{c1}(n)$ at time n, "44" is driving source vector $\delta_{c1}(n+1)$ at time n+1, "45" is state transition matrix $\Phi_{c1}$, and "46" is observation transition vector $m_{c1}$. The state equation in equations 3 describes an estimation target (for example, speech) system as a state space model, and represents time change of an internal state—that is, a state variable (here, state vector $x_{c1}(n)$). Also, the observation equation in equations 3 describes a process observed via an observation apparatus of some kind, and shows how an observation result (here, observed signal $y_{c1}(n)$) evolves over time depending on an observed quantity—that is, input (here, state vector $x_{c1}(n)$). "State vector $x_{c1}(n)$ at time n" means a state vector comprising a speech signal (desired signal) up to time n.

FIG. 5 is a drawing showing an algorithm of conventional method 1. As shown in FIG. 5, an algorithm of conventional method 1 is broadly divided into an initialization process and an iteration process, and the iteration process is divided into step 1 and step 2. In step 1, an AR coefficient $\{\alpha_1(n)\}$ for clear signal (speech signal) d(n) is calculated using a linear prediction algorithm. In step 2, procedures 1 through 5 are repeated sequentially.

Figure 6:
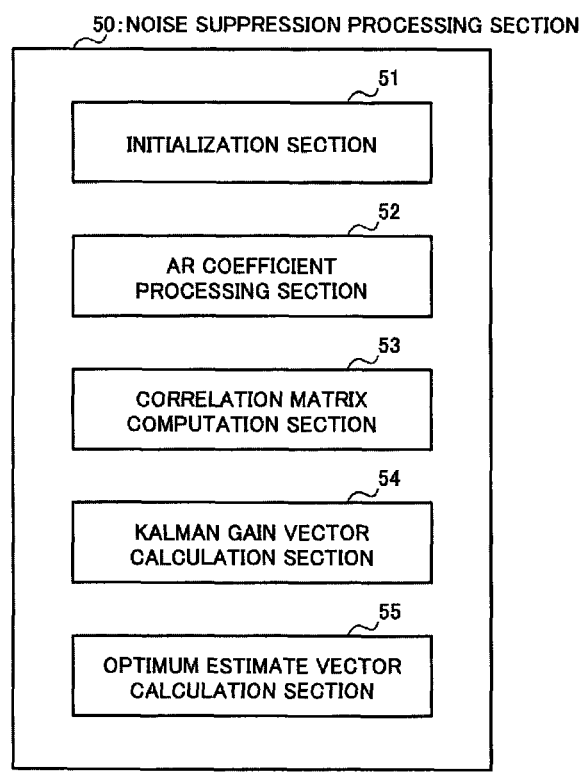
FIG. 6 is a block diagram showing a configuration of a noise suppression processing section that executes the algorithm in FIG. 5.

This conventional method 1 algorithm is executed by noise suppression processing section 50 shown in FIG. 6. This noise suppression processing section 50 corresponds to noise suppression processing section 150 according to this embodiment shown in FIG. 2, and has initialization section 51, AR coefficient processing section 52, correlation matrix computation section 53, Kalman gain vector calculation section 54, and optimum estimate vector calculation section 55. The actual processing performed by sections 51 through 55 will be described later herein.

Figure 7:
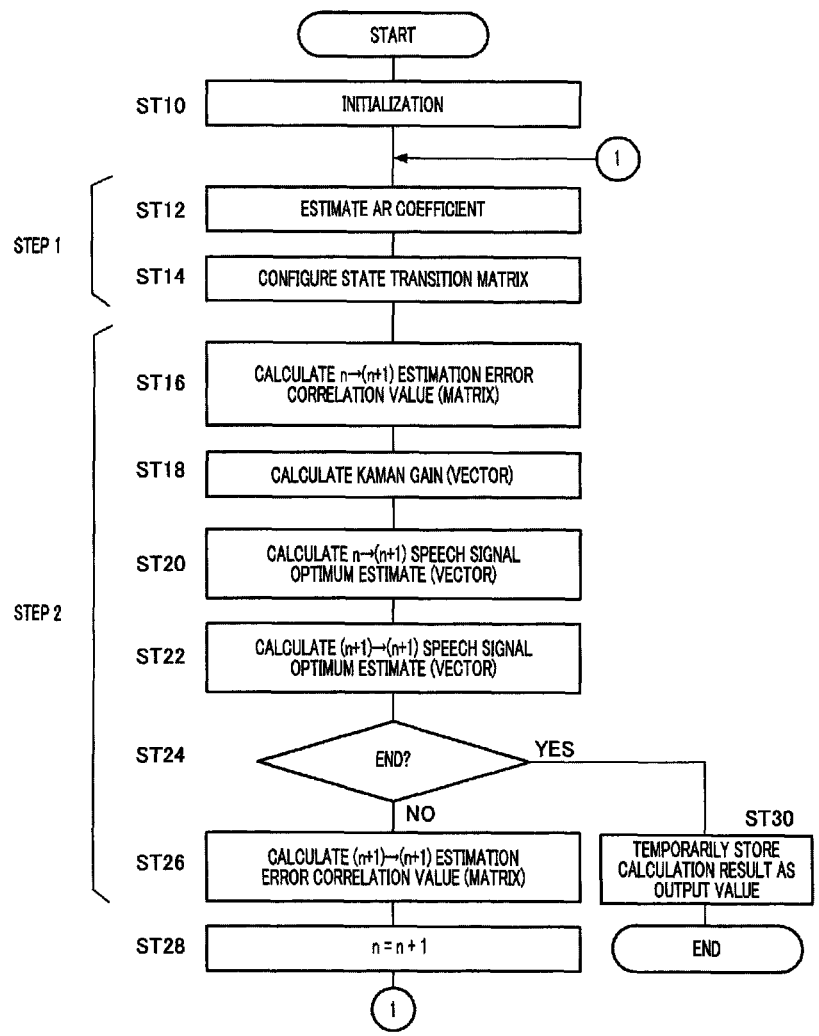
FIG. 7 is a flowchart showing a processing procedure to execute the algorithm in FIG. 5.

FIG. 7 is a flowchart showing a processing procedure to execute the algorithm in FIG. 5.

First, initialization section 51 performs initialization (ST 10). To be more specific, initial value $x_{c1}(0|0)$ of the optimum estimate of a state vector comprising a speech signal (hereinafter "speech signal optimum estimate vector"), initial value $P_{c1}(0|0)$ of a correlation matrix of state vector estimation error (hereinafter "speech signal estimation error vector"), the value of noise (scalar) covariance $r_{\epsilon c1}(n)$, the initial value of observation transition vector $m_{c1}$, the initial value of a counter at time n, and the value of driving source vector covariance $R_{\delta c1}(n+1)[i,j]$, are set as shown in equations 5 below.

(Equation 5)

$$\hat{x}_{c1}(0|0) = 0, P_{c1}(0|0) = I, \quad [5]$$

$$r_{\epsilon_{c1}}(n) = E[\epsilon_{c1}(n)\epsilon_{c1}(n)^T] = \sigma_v^2$$

$$R_{\delta_{c1}}(n)[i,j] = \begin{cases} E\left[\left\{r(n) - \sum_{l=1}^{L_{c1}} \alpha_l(n)r(n-l)\right\}^2\right] - \sigma_v^2 & (i,j=1) \\ 0 & (\text{other}) \end{cases}$$

Here, matrix I is a unitary matrix. Also, $\sigma_v^2$ is noise variance of noise $\epsilon_{c1}(n)$ (=v(n)), and is assumed to be known. "Known" here means found and given by another arbitrary method (algorithm). If noise $\epsilon_{c1}(n)$ is white noise and is zero-mean, $\sigma_v^2$ is given by equation 6 below, where "N" is a predetermined number of samples.

(Equation 6)

$$\sigma_v^2 = \frac{1}{N}\sum_{n=1}^{N} v(n) \quad [6]$$

Next, AR coefficient processing section 52 performs AR coefficient estimation (ST 12). To be more specific, AR coefficient $\{\alpha_1(n+1)\}$ for clear signal (speech signal) d(n+1) is estimated using a linear prediction algorithm.

Next, AR coefficient processing section 52 performs state transition matrix configuration (ST 14). To be more specific, state transition matrix $\Phi_{c1}(n+1)$ is configured as shown in equation 7 below using AR coefficient $\{\alpha_1(n+1)\}$ estimated in step ST 12. Step ST 12 and step ST 14 correspond to step 1 of conventional method 1.

(Equation 7)

$$\Phi_{c1}(n+1) = \begin{bmatrix} \alpha_1(n+1) & \alpha_2(n+1) & \ldots & \ldots & \alpha_{L_{c1}}(n+1) \\ 1 & 0 & \ldots & \ldots & 0 \\ 0 & \ddots & \ddots & & \vdots \\ \vdots & & \ddots & \ddots & \vdots \\ 0 & \ldots & & 0 & 1 & 0 \end{bmatrix} \quad [7]$$

Next, correlation matrix computation section 53 calculates an n→(n+1) estimation error correlation value (matrix) (ST 16). To be more specific, correlation matrix computation section 53 calculates $P_{c1}(n+1|n)$ of error (a speech signal estimation error vector) when a state vector of time n+1 is estimated based on information up to time n. This calculation is performed by means of equation 8 below using the value of driving source vector covariance $R_{\delta c1}(n+1)[ij]$ set in step ST 10, state transition matrix $\Phi_{c1}(n+1)$ configured in step ST 14, and speech signal estimation error vector correlation matrix $P_{c1}(n|n)$ set in step ST 10 (when n=0) or calculated in previous step ST 26 (when n≧1). This step ST 16 corresponds to procedure 1 of step 2 of conventional method 1.

[8]

$$P_{c1}(n+1|n) = \Phi_{c1}(n+1)P_{c1}(n|n)\Phi_{c1}^T(n+1) + R_{\delta c1}(n+1) \quad (\text{Equation 8})$$

Next, Kalman gain vector calculation section 54 performs Kalman gain (vector) calculation (ST 18). To be more specific, Kalman gain vector calculation section 54 calculates Kalman gain $k_{c1}(n+1)$ such that a result of multiplying observed signal estimation error by the Kalman gain (vector)

and adding optimum estimate vector $x_{c1}(n+1|n)$ of a speech signal at time n+1 based on information up to time n is optimum estimate vector $x_{c1}(n+1|n+1)$ of a speech signal at that time based on information up to time n+1. This calculation is performed by means of equation 9 below using speech signal estimation error vector correlation matrix $P_{c1}(n+1|n)$ calculated in step ST 10, and observation transition vector $m_{c1}$ and noise covariance $r_{\epsilon c1}(n)$ set in step ST 10. This step ST 18 corresponds to procedure 2 of step 2 of conventional method 1.

[9]

$$k_{c1}(n+1) = \{P_{c1}(n+1|n)m_{c1}\}\{m_{c1}^T P_{c1}(n+1|n)m_{c1} + r_{\epsilon c1}(n+1)\}^{-1} \quad \text{(Equation 9)}$$

Next, optimum estimate vector calculation section 55 calculates an n→(n+1) speech signal optimum estimate (vector) (ST 20). To be more specific, optimum estimate vector calculation section 55 calculates speech signal optimum estimate vector $x_{c1}(n+1|n)$ at time n+1 based an information up to time n. This calculation is performed by means of equation 10 below using state transition matrix $\Phi_{c1}(n)$ configured in previous step ST 14, and speech signal optimum estimate vector $x_{c1}(n|n)$ calculated in previous step ST 22. This step ST 20 corresponds to procedure 3 of step 2 of conventional method 1.

[10]

$$\hat{x}_{c1}(n+1|n) = \Phi_{c1}\hat{x}_{c1}(n|n) \quad \text{(Equation 10)}$$

Next, optimum estimate vector calculation section 55 calculates an (n+1)→(n+1) speech signal optimum estimate (vector) (ST 22). To be more specific, optimum estimate vector calculation section 55 calculates speech signal optimum estimate vector $x_{c1}(n+1|n+1)$ at that time based on information up to time n+1. This calculation is performed by means of equation 11 below using speech signal optimum estimate vector $x_{c1}(n+1|n)$ calculated in step ST 20, Kalman gain (vector) $k_{c1}(n+1)$ calculated in step ST 18, observation transition vector $m_{c1}$ set in step ST 10, and observed signal $y_{c1}(n+1)$ at time n+1. This step ST 22 corresponds to procedure 4 of step 2 of conventional method 1.

[11]

$$\hat{x}_{c1}(n+1|n+1) = \hat{x}_{c1}(n+1|n) + k_{c1}(n+1)\{y_{c1}(n+1) - m_{c1}^T \hat{x}_{c1}(n+1|n)\} \quad \text{(Equation 11)}$$

Next, whether or not processing is to be terminated is determined (ST 24). This determination is made, for example, by determining whether or not time n has reached predetermined number of samples N. If the result of this determination is that time n has not reached predetermined number of samples N (ST 24: NO), the processing flow proceeds to step ST 26, whereas, if the result of this determination is that time n has reached predetermined number of samples N (ST 24: YES), the processing flow proceeds to step ST 30. The criterion for this determination is not limited to the above example. For example, when processing is performed in real time, provision may be made for processing to be terminated when there are no more samples, even if time n has not reached predetermined number of samples N.

In step ST 26, correlation matrix computation section 53 calculates an (n+1)→(n+1) estimation error correlation value (matrix). To be more specific, correlation matrix computation section 53 calculates $P_{c1}(n+1|n+1)$ of error (a speech signal estimation error vector) when a state vector of that time is estimated based on information up to time n+1. This calculation is performed by means of equation 12 below using Kalman gain (vector) $k_{c1}(n+1)$ calculated in step ST 18, observation transition vector $m_{c1}$ set in step ST 10, and speech signal estimation error vector correlation matrix $P_{c1}(n+1|n)$ calculated in step ST 16. This step ST 26 corresponds to procedure 5 of step 2 of conventional method 1.

[12]

$$P_{c1}(n+1|n+1) = \{I - k_{c1}(n+1)m_{c1}^T\}P_{c1}(n+1|n) \quad \text{(Equation 12)}$$

Next, in step ST 28, the counter at time n is incremented by 1 (n=n+1), and the processing flow returns to step ST 12.

On the other hand, in step ST 30, a calculation result of this algorithm is temporarily stored as an output value. To be more specific, speech signal optimum estimate vector $x_{c1}(n+1|n+1)$ calculated in step ST 22 is temporarily stored in noise suppression processing section 50 as an output value of this algorithm.

Figure 8:
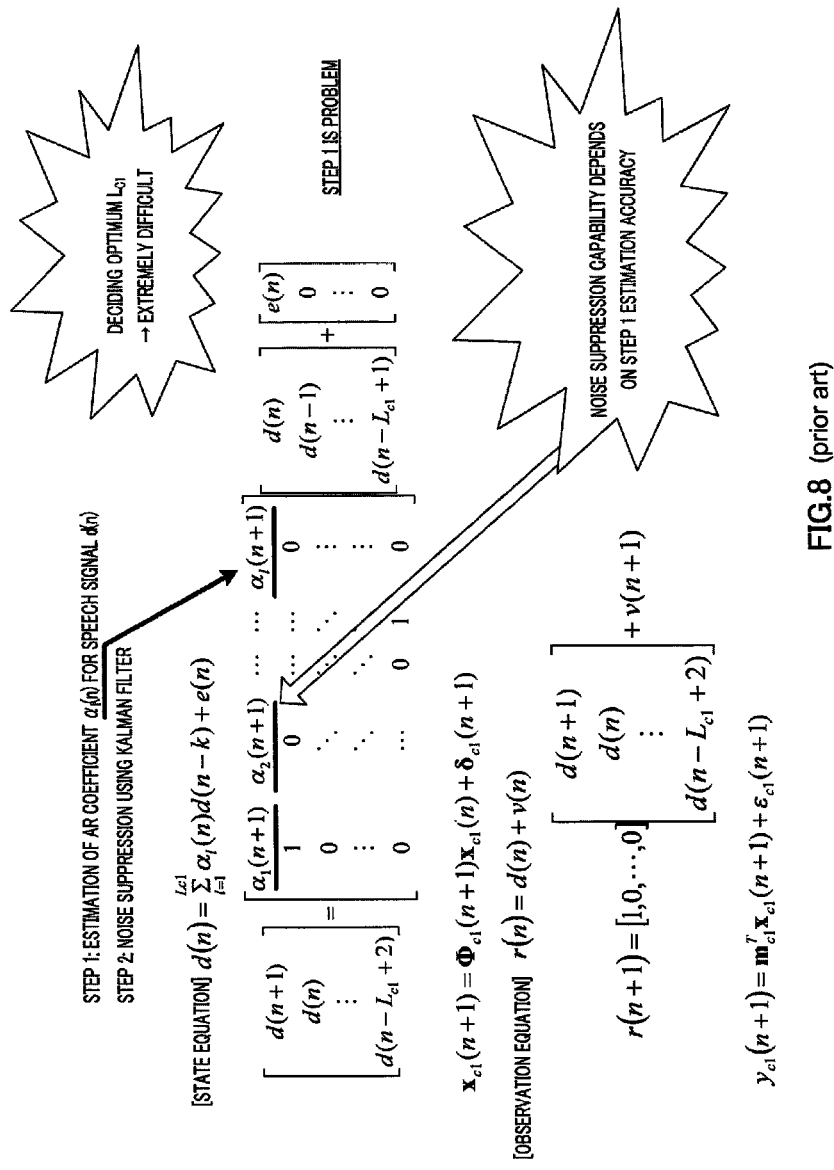
FIG. 8 is an explanatory drawing visually summarizing conventional method 1 and associated problems.

FIG. 8 is an explanatory drawing visually summarizing conventional method 1 and associated problems. Thus, conventional method 1 implements noise suppression by estimating an AR coefficient in step 1, and in step 2 configuring a state space model using the AR coefficient estimated in step 1. However, generally, in an actual environment, deciding degree $L_{c1}$ of an AR coefficient in AR coefficient estimation in step 1 is extremely difficult, and therefore a Kalman filter algorithm must be executed using an AR coefficient that is an inadequate estimation result. It can readily be imagined that this causes a decrease in noise suppression capability. This means that the noise suppression capability of a Kalman filter is greatly dependent upon the accuracy of AR coefficient estimation. That is to say, the most important point in regard to conventional method 1 is that accurate AR coefficient estimation is necessary in order to achieve high-performance noise suppression using a Kalman filter. From this point, also, it can readily be imagined that the noise suppression capability of a Kalman filter greatly depends upon the accuracy of AR coefficient estimation, and that noise suppression capability degrades significantly if the accuracy of AR coefficient estimation is inadequate. Furthermore, the degradation of speech signal sound quality can also be readily understood.

[Conventional Method 3]

Next, conventional method 3 will be described.

Figure 9:
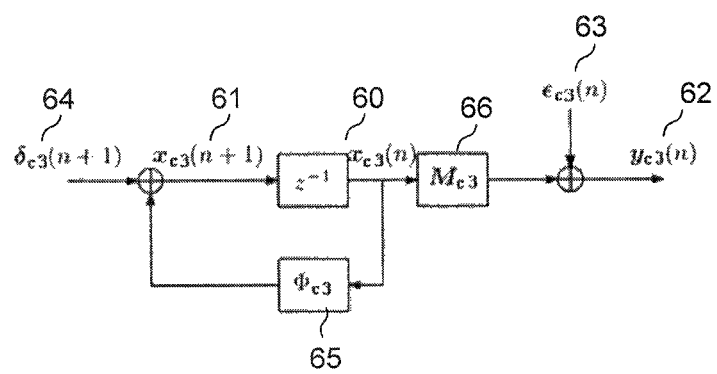
FIG. 9 is a block diagram representing a system configuration of a state space model of conventional method 3.

With conventional method 3, a new state space model is configured so that AR coefficient estimation is not performed. That is to say, a state equation is configured using only a clear signal from an information source (a desired signal), and an observation equation is configured using that clear signal (desired signal) and noise. To be more specific, with conventional method 3, a new state space model (comprising a state equation and observation equation) is configured, and this new state space model is written as equations 13 below. Vectors $x_{c3}$, $\delta_{c3}$, $y_{c3}$, and $\epsilon_{c3}$, and matrices $\Phi_{c3}$ and $M_{c3}$ in equations 13 are defined by equations 14 below. Vector $x_{c3}$ is a state vector of $L_{c3} \times 1$-th order, vector $\delta_{c3}$ is a driving source vector of $L_{c3} \times 1$-th order, vector $y_{c3}$ is an observed signal vector of $L_{c3} \times 1$-th order, vector $\epsilon_{c3}$ is a noise vector of $L_{c3} \times 1$-th order, matrix $\Phi_{c1}$ is a state transition matrix of $L_{c3} \times L_{c3}$-th order, and matrix $M_{c3}$ is an observation transition matrix of $L_{c3} \times L_{c3}$-th order. FIG. 9 represents a system configuration diagram according to this state space model by means of a block diagram. Subscript "c3" indicates that this item relates to conventional method 3. "$L_{c3}$" is the size of a state transition matrix.

(Equation 13)

$$\left.\begin{array}{l}[\text{STATE EQUATION}]\\x_{c3}(n+1)=\Phi_{c3}x_{c3}(n)+\delta_{c3}(n+1)\\[\text{OBSERVATION EQUATION}]\\y_{c3}(n+1)=M_{c3}x_{c3}(n+1)+\epsilon_{c3}(n+1)\end{array}\right\} \quad [13]$$

(Equation 14)

$$\left.\begin{array}{l}x_{c3}(n+1)=[d(n+1),d(n),\ldots,d(n-L_{c3}+2)]^T\\\delta_{c3}(n+1)=[d(n+1),0,\ldots,0]^T\\y_{c3}(n+1)=[1,r(n+1),\ldots,r(n-N+3)]^T\\\epsilon_{c3}(n+1)=[1,v(n+1),\ldots,v(n-N+3)]^T\\\Phi_{c3}=M_{c3}=\begin{bmatrix}0 & 0 & \cdots & \cdots & 0\\1 & 0 & \cdots & \cdots & 0\\0 & \ddots & \ddots & & \vdots\\\vdots & & \ddots & \ddots & \vdots\\0 & \cdots & & 1 & 0\end{bmatrix}\end{array}\right\} \quad [14]$$

In FIG. 9, "60" is state vector $x_{c3}(n)$ at time n, "61" is state vector $x_{c3}(n+1)$ at time n+1, "62" is observed signal vector $y_{c3}(n)$ at time n, "63" is noise vector $\epsilon_{c3}(n)$ at time n, "64" is driving source vector $\delta_{c3}(n+1)$ at time n+1, "65" is state transition matrix $\Phi_{c3}$, and "66" is observation transition matrix $M_{c3}$. The state equation in equations 13 describes an estimation target (for example, speech) system as a state space model, and represents time change of an internal state—that is, a state variable (here, state vector $x_{c3}(n)$). Also, the observation equation in equations 13 describes a process observed via an observation apparatus of some kind, and shows how an observation result (here, observed signal vector $y_{c3}(n)$) evolves over time depending on an observed quantity—that is, input (here, state vector $x_{c3}(n)$). "State vector $x_{c3}(n)$ at time n" means a state vector comprising a desired signal (for example, a speech signal) up to time n.

FIG. 10 is a drawing showing an algorithm of conventional method 3. As shown in FIG. 10, an algorithm of conventional method 3 is broadly divided into an initialization process and an iteration process, and the iteration process, unlike the case of conventional method 1 (see FIG. 5), configures a new state space model (comprising a state equation and observation equation). In the iteration process, procedures 1 through 5 are repeated sequentially.

Figure 11:
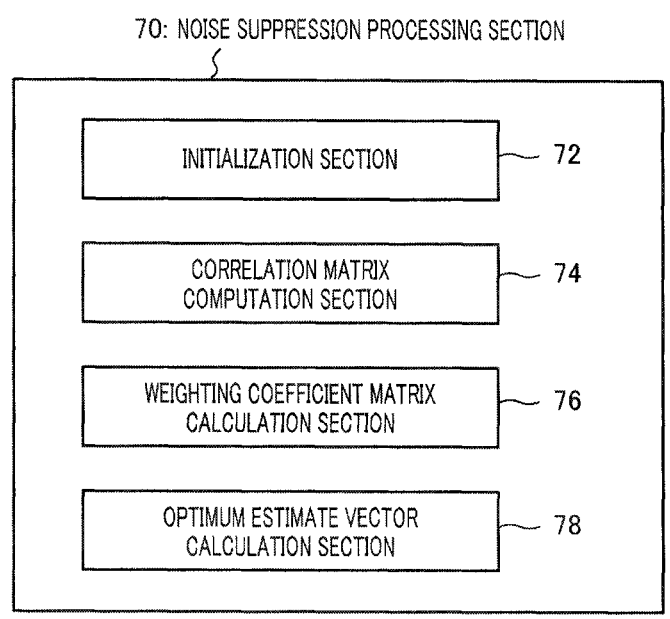
FIG. 11 is a block diagram showing a configuration of a noise suppression processing section that executes the algorithm in FIG. 10.

This conventional method 3 algorithm is executed by noise suppression processing section 70 shown in FIG. 11. This noise suppression processing section 70 corresponds to noise suppression processing section 150 according to this embodiment shown in FIG. 2, and has initialization section 72, correlation matrix computation section 74, weighting coefficient matrix calculation section 76, and optimum estimate vector calculation section 78. The actual processing performed by sections 72 through 78 will be described later herein.

Figure 12:
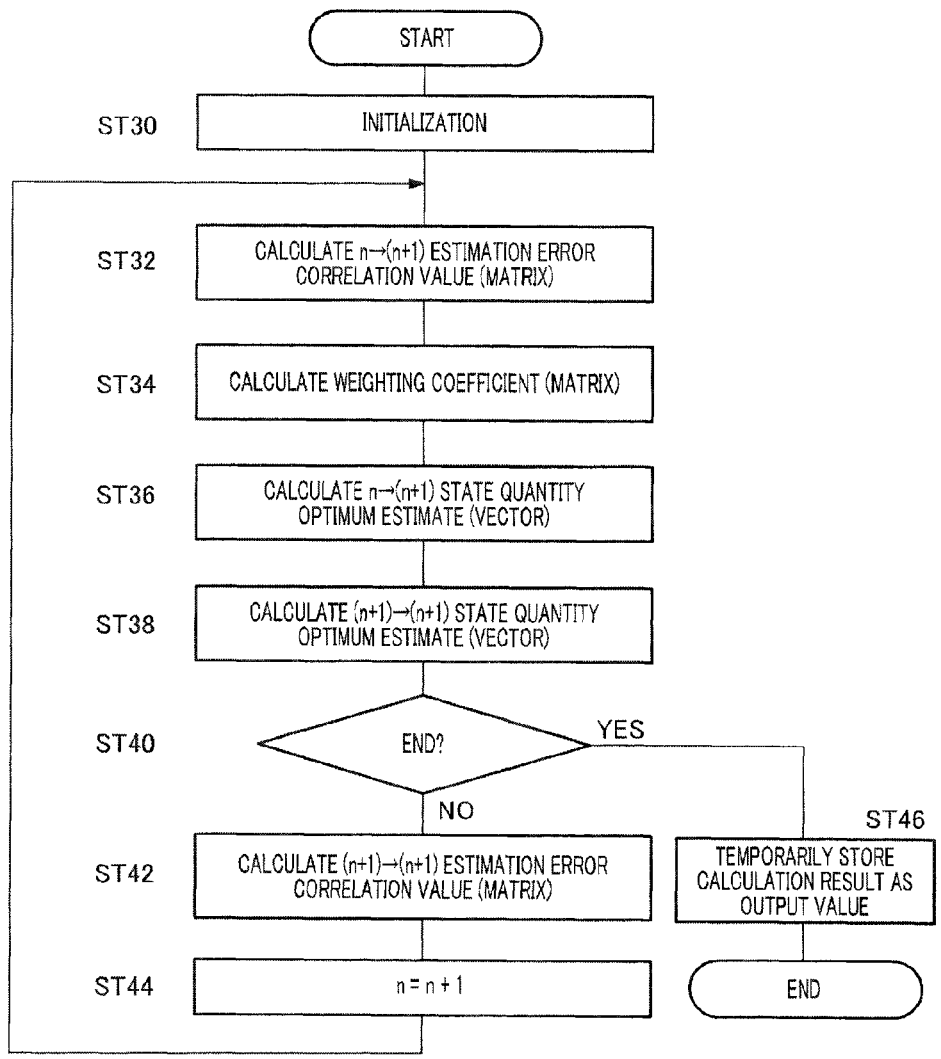
FIG. 12 is a flowchart showing a processing procedure to execute the algorithm in FIG. 10.

FIG. 12 is a flowchart showing a processing procedure to execute the algorithm in FIG. 10.

First, initialization section 72 performs initialization (ST 30). To be more specific, in initialization section 72, initial value $x_{c3}(0|0)$ of the optimum estimate of a state vector comprising a desired signal (for example, a speech signal) (hereinafter "desired signal optimum estimate vector"), initial value $P_{c3}(0|0)$ of a correlation matrix of state vector estimation error (hereinafter "desired signal estimation error vector"), the initial value of a counter at time n, and the values of state transition matrix $\Phi_{c3}$, observation transition matrix $M_{c3}$, noise vector covariance $R_{\epsilon c3}(n+1)[i,j]$, and driving source vector covariance $R_{\delta c3}(n+1)[i,j]$, are set as shown in equations 15 below.

(Equation 15)

$$\hat{x}_{c3}(0|0)=0,\ P_{c3}(0|0)=I,\ n=0 \quad [15]$$

$$\Phi_{c3}=M_{c3}=\begin{bmatrix}1 & 0 & \cdots & \cdots & 0\\1 & 0 & \cdots & \cdots & 0\\0 & \ddots & \ddots & & \vdots\\\vdots & & \ddots & \ddots & \vdots\\0 & \cdots & & 1 & 0\end{bmatrix}$$

$$R_{\epsilon_{c3}}(n)[i,j]=\begin{cases}1 & (i,j=1)\\\sigma_v^2 & (i=j\ \text{and}\ i,j\neq 1)\\0 & (\text{other})\end{cases}$$

$$R_{\delta_{c3}}(n)[i,j]=\begin{cases}\dfrac{1}{L_{c3}-1}\sum_{l=1}^{L_{c3}-1}r^2(n-l)-\sigma_v^2 & (i,j=1)\\0 & (\text{other})\end{cases}$$

Here, matrix I is a unitary matrix. Also, $\sigma_v^2$ is noise variance of noise $\epsilon_{c3}(n)(=v(n))$, and is assumed to be known. "Known" here means found and given by another arbitrary method (algorithm). If noise $\epsilon_{c3}(n)$ is white noise and is zero-mean, $\sigma_v^2$ is given by equation 6 above.

Next, correlation matrix computation section 74 calculates an n→(n+1) estimation error correlation value (matrix) (ST 32). To be more specific, correlation matrix computation section 74 calculates correlation matrix $P_{c3}(n+1|n)$ of error (a desired signal estimation error vector) when a state vector of time n+1 is estimated based on information up to time n. This calculation is performed by means of equation 16 below using the values of state transition matrix $\Phi_{c3}$ and driving source vector covariance $R_{\delta c3}(n+1)[i,j]$ set in step ST 30, and desired signal estimation error vector correlation matrix $P_{c3}(n|n)$ set in step ST 30 (when n=0) or calculated in previous step ST 42 (when n≧1). This step ST 32 corresponds to procedure 1 of the iteration process in FIG. 10.

[16]

$$P_{c3}(n+1|n)=\Phi_{c3}P_{c3}(n|n)\Phi_{c3}^T+R_{\delta_{c3}}(n+1) \quad \text{(Equation 16)}$$

Next, weighting coefficient matrix calculation section 76 performs weighting coefficient (matrix) calculation (ST 34). To be more specific, weighting coefficient matrix calculation section 76 calculates weighting coefficient matrix $K_{c3}(n+1)$ such that a result of multiplying estimation error of an observed signal vector that is an observed quantity (hereinafter "observed signal estimation error vector") by the weighting coefficient (matrix) and adding optimum estimate vector $x_{c3}(n+1|n)$ of a desired signal at time n+1 based on information up to time n is optimum estimate vector $x_{c3}(n+1|n+1)$ of a desired signal at that time based on information up to time n+1. This calculation is performed by means of equation 17 below using desired signal estimation error vector correlation matrix $P_{c3}(n+1|n)$ calculated in step ST 32, and observation transition matrix $M_{c3}$ and noise vector covariance $R_{\epsilon c3}(n+1)[i,j]$ set in step ST 30. This step ST 34 corresponds to procedure 2 of the iteration process in FIG. 10.

[17]

$$K_{c3}(n+1) = \{P_{c3}(n+1|n)M_{c3}^T\}\{M_{c3}P_{c3}(n+1|n)M_{c3}^T + R_{\epsilon_{c3}}(n+1)\}^{-1}$$ (Equation 17)

Next, optimum estimate vector calculation section 78 calculates an n→(n+1) state quantity (desired signal) optimum estimate (vector) (ST 36). To be more specific, optimum estimate vector calculation section 78 calculates desired signal optimum estimate vector $x_{c3}(n+1|n)$ at time n+1 based on information up to time n. This calculation is performed by means of equation 18 below using state transition matrix $\Phi_{c3}$ set in step ST 30 and desired signal optimum estimate vector $x_{c3}(n|n)$ calculated in previous step ST 38. This step ST 36 corresponds to procedure 3 of the iteration process in FIG. 10.

[18]

$$\hat{x}_{c3}(n+1|n) = \Phi_{c3}\hat{x}_{c3}(n|n)$$ (Equation 18)

Next, optimum estimate vector calculation section 78 calculates an (n+1)→(n+1) state quantity (desired signal) optimum estimate (vector) (ST 38). To be more specific, optimum estimate vector calculation section 78 calculates desired signal optimum estimate vector $x_{c3}(n+1|n+1)$ at that time based on information up to time n+1. This calculation is performed by means of equation 19 below using desired signal optimum estimate vector $x_{c3}(n+1|n)$ calculated in step ST 36, weighting coefficient matrix $K_{c3}(n+1)$ calculated in step ST 34, observation transition matrix $M_{c3}$ set in step ST 30, and observed signal $y_{c3}(n+1)$ at time n+1. This step ST 38 corresponds to procedure 4 of the iteration process in FIG. 10.

[19]

$$\hat{x}_{c3}(n+1|n+1) = \hat{x}_{c3}(n+1|n) + K_{c3}(n+1)\{y_{c3}(n+1) - M_{c3}\hat{x}_{c3}(n+1|n)\}$$ (Equation 19)

Next, whether or not processing is to be terminated is determined (ST 40). This determination is made, for example, by determining whether or not time n has reached predetermined number of samples N. If the result of this determination is that time n has not reached predetermined number of samples N (ST 40: NO), the processing flow proceeds to step ST 42, whereas, if the result of this determination is that time n has reached predetermined number of samples N (ST 40: YES), the processing flow proceeds to step ST 46. The criterion for this determination is not limited to the above example. For example, when processing is performed in real time, provision may be made for processing to be terminated when there are no more samples, even if time n has not reached predetermined number of samples N.

In step ST 42, correlation matrix computation section 74 calculates an (n+1)→(n+1) estimation error correlation value (matrix). To be more specific, correlation matrix computation section 74 calculates correlation matrix $P_{c3}(n+1|n+1)$ of error (a desired signal estimation error vector) when a state vector of that time is estimated based on information up to time n+1. This calculation is performed by means of equation 20 below using weighting coefficient matrix $K_{c3}(n+1)$ calculated in step ST 34, observation transition matrix $M_{c3}$ set in step ST 30, and desired signal estimation error vector correlation matrix $P_{c3}(n+1|n)$ calculated in step ST 32. This step ST 42 corresponds to procedure 5 of the iteration process in FIG. 10.

[20]

$$P_{c3}(n+1|n+1) = \{I - K_{c3}(n+1)M_{c3}\}P_{c3}(n+1|n)$$ (Equation 20)

Next, in step ST 44, the counter at time n is incremented by 1 (n=n+1), and the processing flow returns to step ST 32.

On the other hand, in step ST 46, a calculation result of this algorithm is temporarily stored as an output value. To be more specific, desired signal optimum estimate vector $x_{c3}(n+1|n+1)$ calculated in step ST 38 is temporarily stored in noise suppression processing section 70 as an output value of this algorithm.

Figure 13:
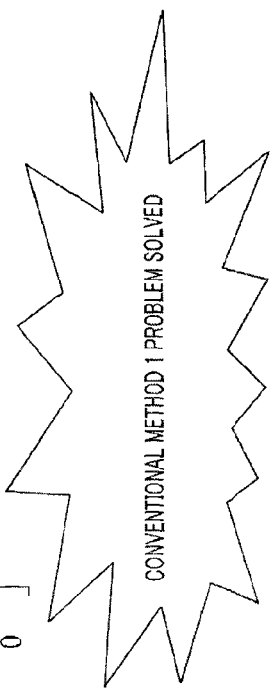
FIG. 13 is an explanatory drawing visually summarizing conventional method 3.

FIG. 13 is an explanatory drawing visually summarizing conventional method 3. Thus, with conventional method 3, a new state space model is configured, making noise suppression possible with one-step processing. With regard only to the basic framework of the noise suppression method, this point is similar for invention method 1 and invention method 2 described later herein.

Unlike in the case of conventional method 1, the conventional method 3 algorithm can be executed even if a driving source is colored. That is to say, as stated in the description of conventional method 1, in order to use the Kalman filter theory, driving source vector $\delta_{c3}(n+1)$ must be white, and state quantity $x_{c3}(n+1)$ and noise v(n) comprising a speech signal must be uncorrelated. However, as shown in equations 14 above, driving source vector $\delta_{c3}(n+1)$ of a state equation in a conventional method 3 state space model includes speech signal d(n+1), which is a colored signal. Therefore, although the Kalman filter theory cannot generally be applied, the conventional method 3 algorithm can be executed even if the driving source is colored.

The reason for the effectiveness of conventional method 3 in which the driving source is colored—that is, the reason the conventional method 3 algorithm can be executed even if the driving source is colored—is explained below. This reason also applies, of course, to invention method 1 and invention method 2 described later herein. In the following notational representations, a part shaded gray in a matrix indicates a part influenced by a driving source, and an unshaded part indicates a part not influenced by a driving source.

Under the condition of driving source $\delta_{c3}$ being a colored signal, correlation matrix $P_{c3}(n+1|n)$ of error (an estimation error vector of a desired signal) when state vector $x_{c3}(n+1|n)$ of time n+1 is estimated based on information up to time n, is written as equation 21 below.

(Equation 21)

$$\begin{aligned}P_{c3}(n+1|n) &= E[\tilde{x}_{c3}(n+1|n)\tilde{x}_{c3}^T(n+1|n)] \\ &= E[\{\Phi_{c3}\tilde{x}_{c3}(n|n) + \delta_{c3}(n+1)\} \\ &\quad \{\Phi_{c3}\tilde{x}_{c3}(n|n) + \delta_{c3}(n+1)\}^T] \\ &= \Phi_{c3}E[\tilde{x}_{c3}(n|n)\tilde{x}_{c3}^T(n|n)]\Phi_{c3}^T + E[\delta_{c3}(n+1)\delta_{c3}^T(n+1)] + \Phi_{c3}E[\tilde{x}_{c3}(n|n)\delta_{c3}^T(n+1)] + E[\delta_{c3}(n+1)\tilde{x}_{c3}^T(n|n)]\Phi_{c3}^T \\ &= \Phi_{c3}P(n|n)\Phi_{c3}^T + R_{\delta_{c3}}(n+1) + Q_{c3}(n+1) + Q_{c3}^T(n+1)\end{aligned}$$ [21]

Matrix $R_{\delta c3}(n+1)$ of $L_{c3} \times L_{c3}$-th order and matrix $Q_{c3}(n+1)$ of $L_{c3} \times L_{c3}$-th order are set as shown in equations 22 below.

(Equation 22)

$$\left.\begin{aligned}R_{\delta_{c3}}(n+1) &= E[\delta_{c3}(n+1)\delta_{c3}^T(n+1)] \\ Q_{c3}(n+1) &= \Phi_{c3}E[\tilde{x}_{c3}(n|n)\delta_{c3}^T(n+1)]\end{aligned}\right\}$$ [22]

Here, if the driving source is a white signal, desired signal estimation error vector correlation matrix $P_{c3}(n+1|n)$ is as follows: $P_{c3}(n+1|n) = \Phi_{c3}P(n|n)\Phi_{c3}^T + R_{\delta c3}(n+1)$. This means that driving source vector $\delta_{c3}(n+1)$ and state quantity $x_{c3}(n|n)$ are uncorrelated. That is to say, $Q_{c3}^T(n+1) = O$ (where O is a zero matrix). On the other hand, if the driving source is a colored signal, driving source vector $\delta_{c3}(n+1)$ has correlation with a desired signal estimation error vector. That is to say, $Q_{c3}{}^T(n+1) \neq O$.

From the above, analysis is performed for each element of matrix $Q_{c3}{}^T(n+1)$ using the relationships in equations 23 below.

(Equation 23)

$$\left. \begin{array}{l} \delta_{c3}(n+1) = \Gamma x_{c3}(n+1) \\ \Phi_{c3}\tilde{x}_{c3}(n\,|\,n) = x_{c3}(n+1) - \hat{x}_{c3}(n+1\,|\,n) - \delta_{c3}(n+1) \\ x_{c3}(n+1) = \hat{x}_{c3}(n+1\,|\,n+1) + \tilde{x}_{c3}(n+1\,|\,n+1) \\ E[\hat{x}_{c3}(n+1\,|\,n)\tilde{x}_{c3}^T(n+1\,|\,n+1)] = O \end{array} \right\} \quad [23]$$

Matrix $\Gamma$ of $L_{c3} \times L_{c3}$-th order is as shown in equation 24 below.

(Equation 24)

$$\Gamma = \begin{bmatrix} 1 & 0 & \cdots & 0 \\ 0 & 0 & \ddots & \vdots \\ \vdots & \ddots & \ddots & 0 \\ 0 & \cdots & 0 & 0 \end{bmatrix} \quad [24]$$

If matrix $Q_{c3}(n+1)$ is modified using above equations 23, it is written as shown in equation 25 below.

(Equation 25)

$$\begin{aligned} Q_{c3}(n+1) &= E[\Phi_{c3}\tilde{x}_{c3}(n\,|\,n)x_{c3}^T(n+1)]\Gamma^T \quad [25]\\ &= E[\{x_{c3}(n+1) - \hat{x}_{c3}(n+1\,|\,n) - \delta_{c3}(n+1)\}x_{c3}^T(n+1)]\Gamma^T \\ &= E[x_{c3}(n+1)x_{c3}^T(n+1)]\Gamma^T - \\ &\quad E[\hat{x}_{c3}(n+1\,|\,n)x_{c3}^T(n+1)]\Gamma^T - \\ &\quad \Gamma E[x_{c3}(n+1)x_{c3}^T(n+1)]\Gamma^T \\ &= E[x_{c3}(n+1)x_{c3}^T(n+1)]\Gamma^T - \\ &\quad E[\hat{x}_{c3}(n+1\,|\,n)\{\hat{x}_{c3}(n+1\,|\,n+1) + \\ &\quad \tilde{x}_{c3}(n+1\,|\,n+1)^T\}]\Gamma^T - \Gamma E[x_{c3}(n+1)x_{c3}^T(n+1)]\Gamma^T \\ &= E[x_{c3}(n+1)x_{c3}^T(n+1)]\Gamma^T - \\ &\quad E[\hat{x}_{c3}(n+1\,|\,n)\hat{x}_{c3}^T(n+1\,|\,n+1)]\Gamma^T - E[\hat{x}_{c3}(n+1\,|\,n)\tilde{x}_{c3}^T(n+1\,|\,n+1)]\Gamma^T - \Gamma E[x_{c3}(n+1)x_{c3}^T(n+1)]\Gamma^T \\ &= E[x_{c3}(n+1)x_{c3}^T(n+1)]\Gamma^T - \\ &\quad E[\hat{x}_{c3}(n+1\,|\,n)\hat{x}_{c3}^T(n+1\,|\,n+1)]\Gamma^T - \\ &\quad \Gamma E[x_{c3}(n+1)x_{c3}^T(n+1)]\Gamma^T \\ &= E[x_{c3}(n+1)x_{c3}^T(n+1)]\Gamma^T - \\ &\quad \Phi_{c3} E[\hat{x}_{c3}(n\,|\,n)\hat{x}_{c3}^T(n+1\,|\,n+1)]\Gamma^T - \\ &\quad \Gamma E[x_{c3}(n+1)x_{c3}^T(n+1)]\Gamma^T \end{aligned}$$

If equation 26 below is defined in order to clarify the elements of matrix $Q_{c3}(n+1)$, the elements of matrix $Q_{c3}(n+1)$ are as shown in equation 27 and equation 28 below.

(Equation 26)

$$\hat{x}_{c3}(n+1\,|\,n) = \left[\hat{d}(n+1\,|\,n), \hat{d}(n\,|\,n), \ldots, \hat{d}(n-L_{c3}-2\,|\,n)\right]^T \quad [26]$$

(Equation 27)

$$Q_{c3}(n+1) = \begin{bmatrix} E[d(n+1)d(n+1)] \\ E[d(n)d(n+1)] \\ \vdots \\ \vdots \\ E[d(n-L_{c3}+2)d(n+1)] \end{bmatrix} \middle| O \middle] - \quad [27]$$

$$\begin{bmatrix} 0 \\ E[\hat{d}(n\,|\,n)\hat{d}(n+1\,|\,n+1)] \\ E[\hat{d}(n-1\,|\,n)\hat{d}(n+1\,|\,n+1)] \\ \vdots \\ E[\hat{d}(n-L_{c3}+2\,|\,n)\hat{d}(n+1\,|\,n+1)] \end{bmatrix} \middle| O \middle] -$$

$$\begin{bmatrix} E[d(n+1)d(n+1)] \\ 0 \\ \vdots \\ \vdots \\ 0 \end{bmatrix} \middle| O \middle]$$

(Equation 28)

$$Q_{c3}(n+1) = \begin{bmatrix} 0 \\ e_2(n) \\ e_3(n) \\ \vdots \\ e_{L_{c3}}(n) \end{bmatrix} \middle| O \middle] \quad [28]$$

Elements $\{e_i(n)\}$ of the first row of matrix $Q_{c3}(n+1)$ are as shown in equation 29 below.

[29]

$$e_i(n) = [d(n-i+2)d(n+1)] - E[\hat{d}(n-i+2\,|\,n)\hat{d}(n+1\,|\,n+1)], \\ (2 \leq i \leq L_{c3}) \quad \text{(Equation 29)}$$

Here, if the elements of the first row of matrix $Q_{c3}(n+1)$ are all zero—that is, $\{e_i(n)\}=0$—there is no influence from the driving source. However, since the elements of the first row of matrix $Q_{c3}(n+1)$ of above equation 28 are not zero—that is, $\{e_i(n)\} \neq 0$—there is influence from the driving source.

On the other hand, if elements $\{e_i(n)\}$ of the first row of matrix $Q_{c3}(n+1)$ of above equation 28 can be obtained by some method, since the positions of $\{e_i(n)\}$ are always fixed irrespective of updating, it is possible to eliminate the influence of the driving source by deducting $\{e_i(n)\}$ obtained by some method. This is equivalent to setting matrix $Q_{c3}(n+1)$ as a zero matrix. Therefore, in the case of a conventional method 3 state space model, execution can be said to be possible even if the driving source is colored. That is to say, the conventional method 3 algorithm can be executed even if the driving source is colored.

[Invention Methods]

Next, invention methods will be described.

With an invention method, a newer state space model is configured based on a conventional method 3 state space model in order to achieve a further decrease in the amount of computation and a further improvement in noise suppression capability. That is to say, with an invention method, a state equation is configured using only a clear signal (desired signal) from an information source, and an observation equation is configured using that clear signal (desired signal) and noise. Below, two actual methods are presented as invention methods. For convenience, the first invention method and second invention method are here designated invention method 1 and invention method 2 respectively, and are described consecutively.

<Invention Method 1>

FIG. 14 and FIG. 15 are explanatory drawings visually summarizing problems with conventional method 3.

Figure 14A:
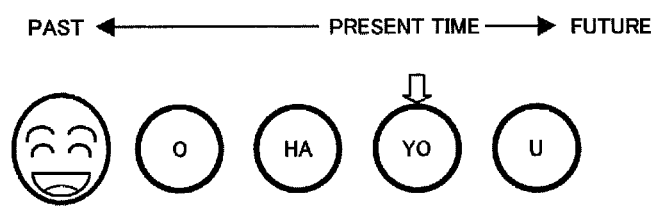
FIG. 14A through FIG. 14B are explanatory drawings visually summarizing a problem with conventional method 3.

First, as described above, with the conventional method 3 state space model, noise suppression is executed using a large amount of past information by vectorizing (as $\{y_{c3}(n)\}$) observed signal r(n). For example, as shown in FIG. 14A, with conventional method 3, a large amount of observed signal r(n) data is used from the standpoint of the estimation accuracy of a prediction, such as when estimating future "u" in the word "ohayou". To be more specific, as shown in FIG. 14A, when estimating future "u" in "ohayou", future "u" cannot be guessed even if "yo" from one moment before is known. Also, estimation of future "u" is difficult from "hay" even if "ha" and "yo" until two moments before are known. On the other hand, if "o" and "ha" and "yo" until three moments before are known, future "u" can be guessed from "ohayo". Thus, from the standpoint of the estimation accuracy of a prediction, the amount of observed signal r(n) data increases. That is to say, the greater the amount of past data that is used, the easier it is to estimate the future.

Figure 14B:
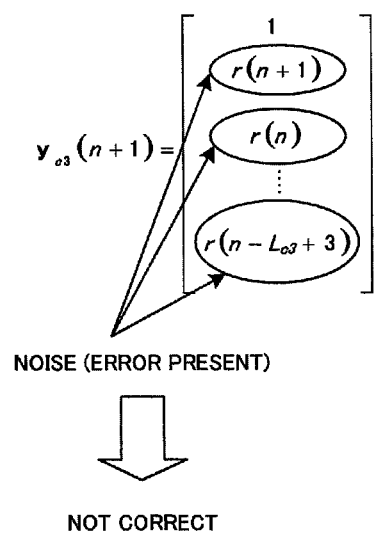

However, as shown in FIG. 14B, since noise is also mixed in with past observed signal r(n) (that is, error is present), an observed signal vector using a large amount of past information includes noise (error). In this case, the proposition that many past observed signals r(n) are necessary in order to improve the estimation accuracy of a prediction, is not necessarily correct. Therefore, in conventional method 3, there is a certain limit to improvement of the estimation accuracy for a desired signal (that is, noise suppression capability).

Also, since a conventional method 3 algorithm requires inverse matrix computation (see procedure 2 of the iteration process in FIG. 10—that is, equation 17 above), as shown emphatically in FIG. 15, there is also a certain limit to the effect of reducing the amount of computation as compared with conventional method 1.

Thus, with invention method 2, a newer state space model (comprising a state equation and observation equation) is configured as shown in equations 30 below in order to achieve a further decrease in the amount of computation and a further improvement in noise suppression capability as compared with conventional method 3. Vectors $x_{p1}$, $\delta_{p1}$, and $m_{p1}$, scalars $y_{p1}$ and $\epsilon_{p1}$, and matrix $\Phi_{p1}$ in equations 30 are defined by equations 31 below. Vector $x_{p1}$ is a state vector of $L_{p1} \times 1$-th order comprising a speech signal, vector $\delta_{p1}$ is a driving source vector of $L_{p1} \times 1$-th order, scalar $y_{p1}$ is an observed signal, scalar $\epsilon_{p1}$ is noise, matrix $\Phi_{p1}$ is a state transition matrix of an $L_{p1} \times L_{p1}$-th order, and vector $m_{p1}$ is an observation transition vector of $L_{p1} \times 1$-th order. Subscript "p1" indicates that this item relates to invention method 1. "$L_{p1}$" is the size of a state transition matrix.

(Equation 30)

$$\begin{aligned} &\text{[STATE EQUATION]} \\ &x_{p1}(n+1) = \Phi_{p1} x_{p1}(n) + \delta_{p1}(n+1) \\ &\text{[OBSERVATION EQUATION]} \\ &y_{p1}(n+1) = m_{p1}^T x_{p1}(n+1) + \epsilon_{p1}(n+1) \end{aligned}$$ [30]

(Equation 31)

$$\begin{aligned} &x_{p1}(n+1) = [d(n+1), d(n), \ldots, d(n-L_{p1}+2)]^T \\ &\delta_{p1}(n+1) = [d(n+1), 0, \ldots, 0]^T \\ &y_{p1}(n+1) = r(n+1) \\ &\epsilon_{p1}(n+1) = v(n+1) \\ &\Phi_{p1} = \begin{bmatrix} 0 & 0 & \cdots & \cdots & 0 \\ 1 & 0 & \cdots & \cdots & 0 \\ 0 & \ddots & \ddots & & \vdots \\ \vdots & \ddots & \ddots & \ddots & \vdots \\ 0 & \cdots & 0 & 1 & 0 \end{bmatrix} \\ &m_{p1} = [1, 0, \ldots, 0]^T \end{aligned}$$ [31]

FIG. 16 is a schematic diagram for visually explaining this newer state space model. As shown in FIG. 16, in the case of a speech signal, for example, observed signal r(n) at one particular time n is a signal in which speech signal d(n) and noise v(n) at that time n have been added (see FIG. 3 and equation 1). In the case of a speech signal, a state equation describes the structure of respiratory tract 170 (that is, the structure of speech), and an observation equation describes a process whereby speech signal d(n) produced from respiratory tract 170 and noise v(n) separate from speech signal d(n) are mixed together and observed via an arbitrary observation apparatus at one particular time n. In the case of a speech signal, a state equation is referred to as a "speech structure equation", and an observation equation as a "speech observation equation".

Figure 17:
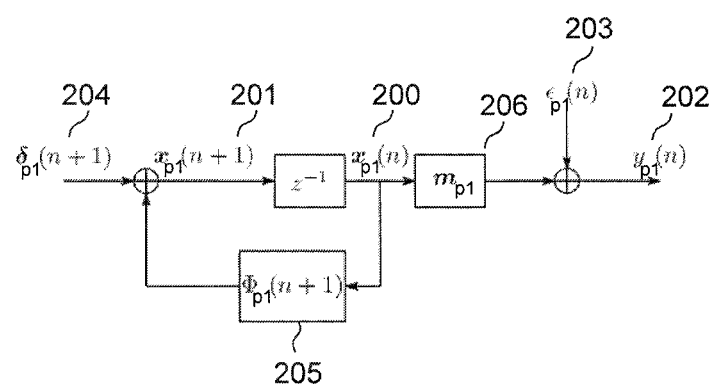
FIG. 17 is a block diagram representing a system configuration of a state space model of invention method 1.

FIG. 17 represents a system configuration diagram according to this state space model by means of a block diagram. In FIG. 17, "200" is state vector $x_{p1}(n)$ at time n, "201" is state vector $x_{p1}(n+1)$ at time n+1, "202" is observed signal $y_{p1}(n)$ at time n, "203" is noise $\epsilon_{p1}(n)$ at time n, "204" is driving source vector $\delta_{p1}(n+1)$ at time n+1, "205" is state transition matrix $\Phi_{p1}$, and "206" is observation transition vector $m_{p1}$. The state equation in equations 30 describes an estimation target (for example, speech) system as a state space model, and represents time change of an internal state—that is, a state variable (here, state vector $x_{p1}(n)$). Also, the observation equation in equations 30 describes a process observed via an observation apparatus of some kind, and shows how an observation result (here, observed signal $y_{p1}(n)$) evolves over time depending on an observed quantity—that is, input (here, state vector $x_{p1}(n)$). "State vector $x_{p1}(n)$ at time n" means a state vector comprising a desired signal (for example, a speech signal) up to time n.

Figure 18:
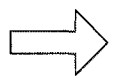
FIG. 18 is an explanatory drawing visually showing a state equation of invention method 1.
Figure 19:
FIG. 19 is an explanatory drawing visually showing a configuration of a new observation equation in invention method 1.
Figure 20:
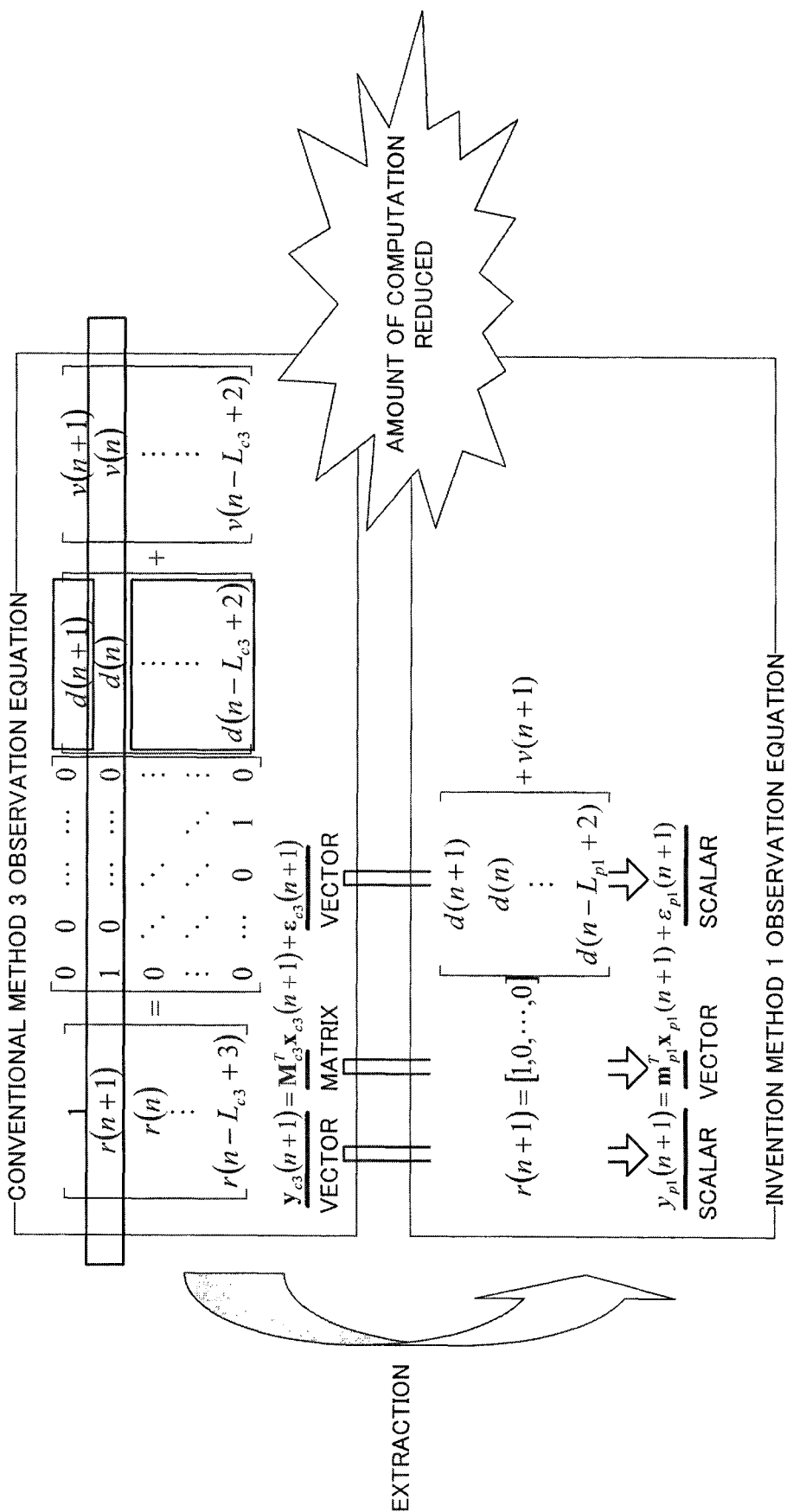
FIG. 20 is another explanatory drawing visually showing a configuration of a new observation equation in invention method 1.

FIG. 18 is an explanatory drawing visually showing a state equation of invention method 1. FIG. 19 and FIG. 20 are explanatory drawings visually showing a configuration of a new observation equation in invention method 1. That is to say, as compared with conventional method 3, invention method 1, as shown in FIG. 18, has the same state equation, except for the number of state quantities (see FIG. 13), but, as shown in FIG. 19 and FIG. 20, achieves a reduction in the amount of computation by newly configuring an observation equation. To be more specific, with invention method 1, a new observation equation different from that of conventional method 3 is configured (see FIG. 19 in particular) by extracting only a part of an arbitrary time from a conventional method 3 observation equation so that there is no influence of a state equation driving source. By this means, with invention method 1, for example, observed signal vector $y_{c3}(n+1)$, observation transition matrix $M_{c3}$, and noise vector $\epsilon_{c3}(n+1)$ in a conventional method 3 observation equation are scalarized, vectorized, and scalarized, respectively, and become observed signal $y_{p1}(n+1)$, observation transition vector $m_{p1}$, and noise $\epsilon_{p1}(n+1)$ (see FIG. 20 in particular). As a result, the amount of computation is greatly reduced in invention method 1 as compared with conventional method 3. The effect of reducing the amount of computation will be described in detail later herein.

With regard to a state equation, with invention method 1 the number of state quantities—that is, the size of a state transition matrix—is larger than in the case of conventional method 3. That is to say, state transition matrix size $L_{p1}$ of invention method 1 is larger than state transition matrix size $L_{c3}$ of conventional method 3 ($L_{p1} > L_{c3}$). This is because, in the case of a speech signal, for example, the more data there is about respiratory tract 170 data, the better it is in order to clarify the structure of respiratory tract 170 (see FIG. 16). On the other hand, with regard to an observation equation, with invention method 1, as stated above, a new observation equation different from that of conventional method 3 is configured by extracting only a part of an arbitrary time from a conventional method 3 observation equation. That is to say, with invention method 1, only current data (instantaneous data) is used as an observed signal, for example, unlike the case of conventional method 3 in which past data is used. In this respect, invention method 1 essentially employs a different configuration from conventional method 3.

FIG. 21 is a drawing showing an algorithm of invention method 1. As shown in FIG. 21, an algorithm of invention method 1 is broadly divided into an initialization process and an iteration process, and the iteration process configures a newer state space model (comprising a state equation and observation equation) so that the amount of computation is reduced as compared with conventional method 3 (see FIG. 10). In the iteration process, procedures 1 through 5 are repeated sequentially.

Figure 22:
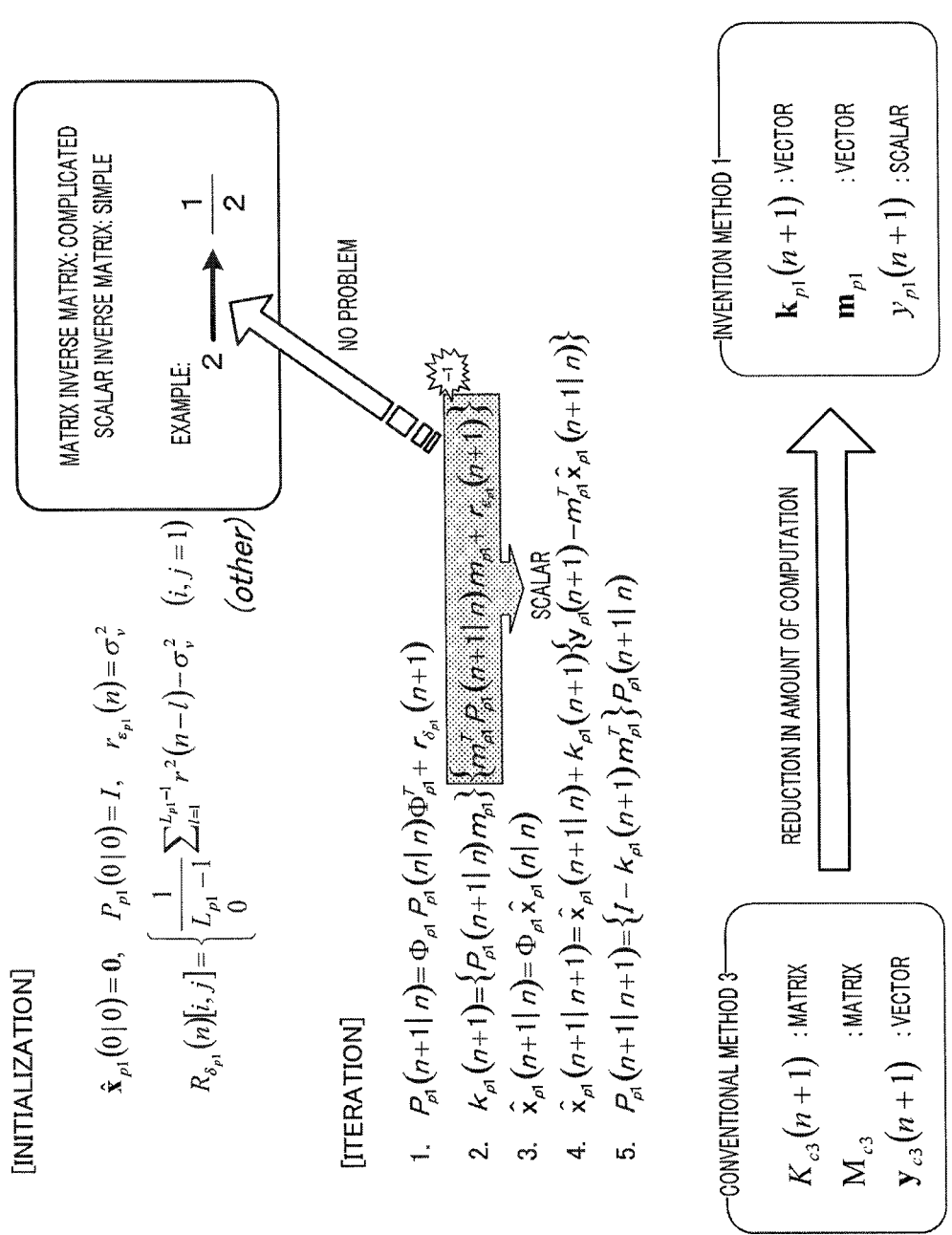
FIG. 22 is an explanatory drawing visually summarizing the advantages of an algorithm of invention method 1.

FIG. 22 is an explanatory drawing visually summarizing the advantages of an algorithm of invention method 1. With invention method 1, as shown in FIG. 22, weighting coefficient matrix $K_{c3}(n+1)$, observation transition matrix $M_{c3}$, and observed signal vector $y_{c3}(n+1)$ in a conventional method 3 algorithm are vectorized, vectorized, and scalarized, respectively, and become weighting coefficient vector $k_{p1}(n+1)$, observation transition vector $m_{p1}$, and observed signal $y_{p1}(n+1)$. By this means, with invention method 1 an inverse matrix calculation in conventional method 3 (see procedure 2 of the iteration process in FIG. 10) becomes a scalar reciprocal calculation (see procedure 2 of the iteration process in FIG. 21). Generally, an inverse matrix calculation is complicated while a scalar reciprocal calculation is simple. Therefore, with invention method 1, the amount of computation is greatly reduced as compared with conventional method 3.

Figure 23:
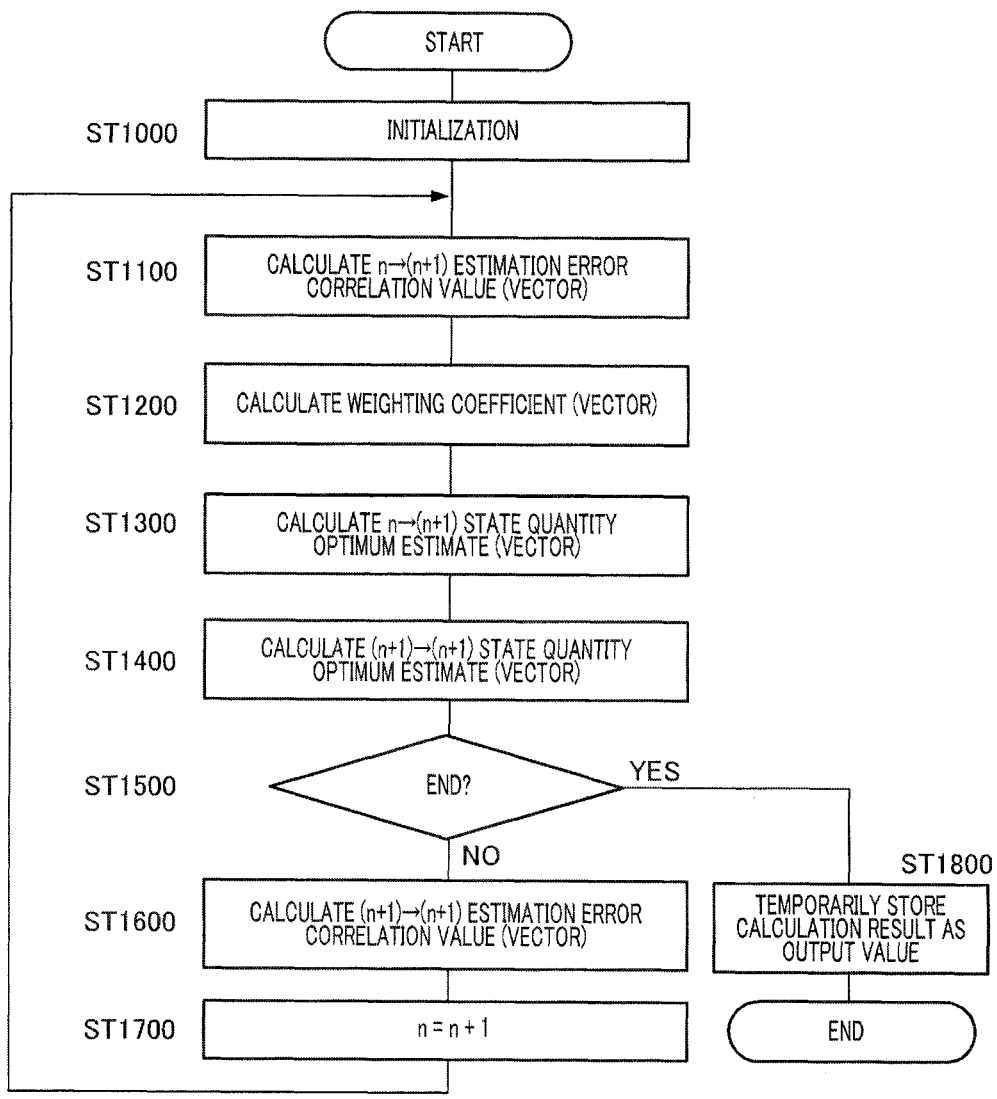
FIG. 23 is a flowchart showing a processing procedure to execute the algorithm in FIG. 21.

FIG. 23 is a flowchart showing a processing procedure to execute the algorithm in FIG. 21.

First, initialization section 152 performs initialization (ST 1000). To be more specific, in initialization section 152, initial value $x_{p1}(0|0)$ of the optimum estimate of a state vector comprising a desired signal (for example, a speech signal) (hereinafter "desired signal optimum estimate vector"), initial value $P_{p1}(0|0)$ of a correlation matrix of state vector estimation error (hereinafter "desired signal estimation error vector"), the value of noise (scalar) covariance $r_{\epsilon p1}(n+1)$, the initial values of observation transition matrix $m_{p1}$ and a counter at time n, and the values of state transition matrix $\Phi_{p1}$ and driving source vector covariance $R_{\delta p1}(n+1)[i,j]$, are set as shown in equations 32 below.

(Equation 32)

$$\hat{x}_{p1}(0|0) = 0, \ P_{p1}(0|0) = I, \ r_{\epsilon_{p1}}(n) = \sigma_v^2 \qquad [32]$$

$$R_{\delta_{p1}}(n)[i,j] = \begin{cases} \dfrac{1}{L_{p1}-1} \sum_{l=1}^{L_{p1}-1} r^2(n-l) - \sigma_v^2 & (i,j = 1) \\ 0 & \text{(other)} \end{cases}$$

$$m_{p1} = [1, 0, \ldots, 0]^T, \ n = 0$$

$$\Phi_{p1} = \begin{bmatrix} 0 & 0 & \ldots & \ldots & 0 \\ 1 & 0 & \ldots & \ldots & 0 \\ 0 & \ddots & \ddots & \ddots & \vdots \\ \vdots & & \ddots & \ddots & \vdots \\ 0 & \ldots & 0 & 1 & 0 \end{bmatrix}$$

Here, matrix I is a unitary matrix. Also, $\sigma_v^2$ is noise variance of noise $\epsilon_{p1}(n)$ (=$v(n)$), and is assumed to be known. "Known" here means found and given by another arbitrary method (algorithm). If noise $\epsilon_{p1}(n)$ is white noise and is zero-mean, $\sigma_v^2$ is given by equation 6 above.

Next, correlation computation section 154 serving as a first correlation computation section calculates an n→(n+1) estimation error correlation value (vector) (ST 1100). To be more specific, correlation computation section 154 calculates correlation 5 matrix $P_{p1}(n+1|n)$ of error (a desired signal estimation error vector) when a state vector of time n+1 is estimated based on information up to time n. This calculation is performed by means of equation 33 below using the values of state transition matrix $\Phi_{p1}$ and driving source vector covariance $R_{\delta p1}(n+1)[i,j]$ set in step ST 1000, and desired signal estimation error vector correlation matrix $P_{p1}(n|n)$ set in step ST 1000 (when n=0) or calculated in previous step ST 1600 (when n≧1). This step ST 1100 corresponds to procedure 1 of the iteration process in FIG. 21.

[33]

$$P_{p1}(n+1|n) = \Phi_{p1} P_{p1}(n|n) \Phi_{p1}^T + R_{\delta_{p1}}(n+1) \qquad \text{(Equation 33)}$$

Next, weighting coefficient calculation section 156 calculates a weighting coefficient (vector) (ST 1200). To be more specific, weighting coefficient calculation section 156 calculates weighting coefficient vector $k_{p1}(n+1)$ such that a result of multiplying estimation error (scalar) of an observed signal vector that is an observed quantity by the weighting coefficient (matrix) and adding optimum estimate vector $x_{p1}(n+1|n)$ of a desired signal at time n+1 based on information up to time n is optimum estimate vector $x_{p1}(n+1|n+1)$ of a desired signal at that time based on information up to time n+1. This calculation is performed by means of equation 34 below using the values of desired signal estimation error vector correlation matrix $P_{p1}(n+1|n)$ calculated in step ST 1100, and observation transition vector $m_{p1}$ and noise covariance $r_{\epsilon p1}(n+1)$ set in step ST 1000. This step ST 1200 corresponds to procedure 2 of the iteration process in FIG. 21.

[34]

$$k_{p1}(n+1) = \{P_{p1}(n+1|n) m_{p1}\} \{m_{p1}^T P_{p1}(n+1|n) m_{p1} + r_{\epsilon_{p1}}(n+1)\}^{-1} \qquad \text{(Equation 34)}$$

Next, optimum estimate calculation section 158 serving as a first optimum estimate calculation section calculates an optimum estimate (vector) of an n→(n+1) state quantity (desired signal) (ST 1300). To be more specific, optimum estimate calculation section 158 calculates an optimum estimate vector $x_{p1}(n+1|n)$ of a desired signal at time n+1 based on information up to time n for an observed signal of only time n. This calculation is performed by means of equation 35 below using state transition matrix $\Phi_{p1}$ set in step ST 1000, and desired signal optimum estimate vector $x_{p1}(n|n)$ calculated in previous step ST 1400. This step ST 1300 corresponds to procedure 3 of the iteration process in FIG. 21.

[35]
$$\hat{x}_{p1}(n+1|n) = \Phi_{p1}\hat{x}_{p1}(n|n) \quad \text{(Equation 35)}$$

Next, optimum estimate calculation section 158 serving as a second optimum estimate calculation section calculates an optimum estimate (vector) of an $(n+1) \to (n+1)$ state quantity (desired signal) (ST 1400). To be more specific, optimum estimate calculation section 158 calculates desired signal optimum estimate vector $x_{p1}(n+1|n+1)$ at that time based on information up to time n+1 for an observed signal of only time n. This calculation is performed by means of equation 36 below using desired signal optimum estimate vector $x_{p1}(n+1|n)$ calculated in step ST 1300, weighting coefficient vector $k_{p1}(n+1)$ calculated in step ST 1200, observation transition vector $m_{p1}$ set in step ST 1000, and observed signal $y_{p1}(n+1)$ at time n+1. This step ST 1400 corresponds to procedure 4 of the iteration process in FIG. 21.

[36]
$$\hat{x}_{p1}(n+1|n+1) = \hat{x}_{p1}(n+1|n) + k_{p1}(n+1)\{y_{p1}(n+1) - m_{p1}^T\hat{x}_{p1}(n+1|n)\} \quad \text{(Equation 36)}$$

Next, whether or not processing is to be terminated is determined (ST 1500). This determination is made, for example, by determining whether or not time n has reached predetermined number of samples N. If the result of this determination is that time n has not reached predetermined number of samples N (ST 1500: NO), the processing flow proceeds to step ST 1600, whereas, if the result of this determination is that time n has reached predetermined number of samples N (ST 1500: YES), the processing flow proceeds to step ST 1800. The criterion for this determination is not limited to the above example. For example, when processing is performed in real time, provision may be made for processing to be terminated when there are no more samples, even if time n has not reached predetermined number of samples N.

In step ST 1600, correlation computation section 154 serving as a second correlation computation section calculates an $(n+1) \to (n+1)$ estimation error correlation value (vector). To be more specific, correlation computation section 154 calculates correlation matrix $P_{p1}(n+1|n+1)$ of error (a desired signal estimation error vector) when a state vector of that time is estimated based on information up to time n+1 for an observed signal of only time n. This calculation is performed by means of equation 37 below using weighting coefficient vector $k_{p1}(n+1)$ calculated in step ST 1200, observation transition vector $m_{p1}$ set in step ST 1000, and desired signal estimation error vector correlation matrix $P_{p1}(n+1|n)$ calculated in step ST 1100. This step ST 1600 corresponds to procedure 5 of the iteration process in FIG. 21.

[37]
$$P_{p1}(n+1|n+1) = \{I - k_{p1}(n+1)m_{p1}^T\}P_{p1}(n+1|n) \quad \text{(Equation 37)}$$

Next, in step ST 1700, the counter at time n is incremented by 1 (n=n+1), and the processing flow returns to step ST 1100.

On the other hand, in step ST 1800, a calculation result of this algorithm is temporarily stored as an output value. To be more specific, desired signal optimum estimate vector $x_{p1}(n+1|n+1)$ calculated in step ST 1400 is temporarily stored in noise suppression processing section 150 as an output value of this algorithm.

Thus, with invention method 1, in the same way as with conventional method 3, a new state space model that does not require AR coefficient estimation is configured, making noise suppression possible with one-step processing.

Also, in the same way as with conventional method 3, unlike in the case of conventional method 1, the invention method 1 algorithm can be executed even if a driving source is colored. That is to say, as stated in the description of conventional method 1, in order to use the Kalman filter theory, driving source vector $\delta_{p1}(n+1)$ must be white, and state quantity $x_{p1}(n+1)$ and noise $v(n)$ comprising a speech signal (desired signal) must be uncorrelated. However, as shown in equations 31 above, driving source vector $\delta_{p1}(n+1)$ of a state equation in an invention method 1 state space model includes speech signal $d(n+1)$, which is a colored signal. Therefore, although the Kalman filter theory cannot generally be applied, the invention method 1 algorithm can be executed even if the driving source is colored.

The reason for the effectiveness of invention method 1 in which the driving source is colored—that is, the reason the invention method 1 algorithm can be executed even if the driving source is colored—is explained below. In the following notational representations, a part shaded gray in a matrix indicates a part influenced by a driving source, and an unshaded part indicates a part not influenced by a driving source. Also, in the procedures in number of updates n, in order for the influence of $Q_{p1}(n+n)$ to be estimated to the maximum for $P_{p1}(n|n)$ and $x_{p1}(n|n)$, it is assumed that the influence of $Q_{p1}(n+n)$ is included in all these elements. That is to say, all $P_{p1}(n|n)$ and $x_{p1}(n|n)$ elements are shown in gray.

Under the condition of driving source $\delta_{p1}$ being a colored signal, correlation matrix $P_{p1}(n+1|n)$ of error (a desired signal estimation error vector) when state vector $x_{p1}(n+1|n)$ of time n+1 is estimated based on information up to time n is written as equation 38 below.

(Equation 38)
$$\begin{aligned} P_{p1}(n+1|n) &= E[\tilde{x}_{p1}(n+1|n)\tilde{x}_{p1}^T(n+1|n)] \quad [38] \\ &= E[\{\Phi_{p1}\tilde{x}_{p1}(n|n) + \delta_{p1}(n+1)\} \\ &\quad \{\Phi_{p1}\tilde{x}_{p1}(n|n) + \delta_{p1}(n+1)\}^T] \\ &= \Phi_{p1}E[\tilde{x}_{p1}(n|n)\tilde{x}_{p1}^T(n|n)]\Phi_{p1}^T + E[\delta_{p1}(n+1)\delta_{p1}^T(n+1)] + \Phi_{p1}E[\tilde{x}_{p1}(n|n)\delta_{p1}^T(n+1)] + E[\delta_{p1}(n+1)\tilde{x}_{p1}^T(n|n)]\Phi_{p1}^T \\ &= \Phi_{p1}P(n|n)\Phi_{p1}^T + R_{\delta_{p1}}(n+1) + Q_{p1}(n+1) + Q_{p1}^T(n+1) \end{aligned}$$

Matrix $R_{\delta_{p1}}(n+1)$ of $L_{p1} \times L_{p1}$-th order and matrix $Q_{p1}(n+1)$ of $L_{p1} \times L_{p1}$-th order are set as shown in equations 39 below.

(Equation 39)
$$\left. \begin{aligned} R_{\delta_{p1}}(n+1) &= E[\delta_{p1}(n+1)\delta_{p1}^T(n+1)] \\ Q_{p1}(n+1) &= \Phi_{p1}E[\tilde{x}_{p1}(n|n)\delta_{p1}^T(n+1)] \end{aligned} \right\} \quad [39]$$

Parts influenced by the driving source with respect to correlation matrix $P_{p1}(n+1|n)$ are as shown in equation 40 below.

(Equation 40)

$$P_{p1}(n+1\mid n) = \Phi_{p1}P(n\mid n)\Phi_{p1}^T + R_{\delta_{p1}}(n+1) + Q_{p1}(n+1) + Q_{p1}^T(n+1)$$

$$= \begin{bmatrix} 0 & 0 & \cdots & 0 \\ \hline 0 & & & \\ \vdots & & P_{L_{p1}-1} & \\ 0 & & & \end{bmatrix} + \begin{bmatrix} E[d(n+1)d(n+1)] & & & \\ 0 & & & \\ \vdots & & O & \\ 0 & & & \end{bmatrix} +$$

$$\begin{bmatrix} 0 \\ e_2(n) \\ e_3(n) \\ \vdots \\ e_{L_{p1}}(n) \end{bmatrix} O + \begin{bmatrix} 0 & e_2(n) & e_3(n) & \cdots & e_{L_{p1}}(n) \\ \hline & & O & & \end{bmatrix}$$

$$= \begin{bmatrix} E[d(n+1)d(n+1)] & e_2(n) & e_3(n) & \cdots & e_{L_{p1}}(n) \\ \hline e_2(n) & & & & \\ e_3(n) & & P_{L_{p1}-1} & & \\ \vdots & & & & \\ e_{L_{p1}}(n) & & & & \end{bmatrix}$$

[40]

Here, $\{e_i(n)\}$ is as shown in equation 41 below.

[41]

$$e_i(n) = E[d(n-i+2)d(n+1)] - E[\hat{d}(n-i+2\mid n)\hat{d}(n+1\mid n+1)],$$
$$(2 \leq i \leq L_{p1}) \quad \text{(Equation 41)}$$

Using the $P_{p1}(n+1\mid n)$ result, parts influenced by the driving source with respect to vector $k_{p1}(n+1)$ are as shown in equation 42 below.

(Equation 42)

$$k_{p1}(n+1) = P_{p1}(n+1\mid n)m_{p1}\{m_{p1}^T P_{p1}(n+1\mid n)m_{p1} + r_{\epsilon_{p1}}(n+1)\}^{-1}$$

$$= \begin{bmatrix} E[d(n+1)d(n+1)] \\ e_2(n) \\ e_3(n) \\ \vdots \\ e_{L_{p1}}(n) \end{bmatrix} \cdot \{E[d(n+1)d(n+1)] + \sigma_v^2\}^{-1}$$

$$= \begin{bmatrix} k_{p1}(n+1)[1,1] \\ k_{p1}(n+1)[2,1] \\ \vdots \\ k_{p1}(n+1)[L_p,1] \end{bmatrix}$$

[42]

If equation 43 below is defined, parts influenced by the driving source with respect to optimum estimate vector $x_{p1}(n+1\mid n)$ are as shown in equation 44 below.

(Equation 43)

$$\hat{x}_{p1}(n\mid n) = [\hat{x}_{p1}(n\mid n)[1,1], \hat{x}_{p1}(n\mid n)[2,1], \ldots, \hat{x}_{p1}(n\mid n)[L_{p1},1]]^T \quad [43]$$

(Equation 44)

$$\hat{x}_{p1}(n+1\mid n) = \Phi_{p1}\hat{x}_{p1}(n\mid n)$$

$$= \begin{bmatrix} 0 & \cdots & \cdots & 0 \\ 1 & \ddots & & \vdots \\ 0 & \ddots & \ddots & \vdots \\ \vdots & \ddots & \ddots & \vdots \\ 0 & \cdots & 0 & 1 & 0 \end{bmatrix} \begin{bmatrix} \hat{x}_{p1}(n\mid n)[1,1] \\ \hat{x}_{p1}(n\mid n)[2,1] \\ \vdots \\ \hat{x}_{p1}(n\mid n)[L_{p1},1] \end{bmatrix}$$

$$= \begin{bmatrix} 0 \\ \hat{x}_{p1}(n\mid n)[1,1] \\ \hat{x}_{p1}(n\mid n)[2,1] \\ \vdots \\ \hat{x}_{p1}(n\mid n)[L_{p1},1] \end{bmatrix}$$

[44]

Therefore, parts influenced by the driving source with respect to optimum estimate vector $x_{p1}(n+1\mid n+1)$ are written as shown in equation 45 below.

(Equation 45)

$$\hat{x}_{p1}(n+1\mid n+1) = \hat{x}_{p1}(n+1\mid n) + k_{p1}(n+1)\{y_{p1}(n+1) - m_{p1}^T\hat{x}_{p1}(n+1\mid n)\}$$

$$= \begin{bmatrix} 0 \\ \hat{x}_{p1}(n\mid n)[1,1] \\ \hat{x}_{p1}(n\mid n)[2,1] \\ \vdots \\ \hat{x}_{p1}(n\mid n)[L_{p1},1] \end{bmatrix} + \begin{bmatrix} k_{p1}(n+1)[1,1] \\ k_{p1}(n+1)[2,1] \\ \vdots \\ k_{p1}(n+1)[L_{p1},1] \end{bmatrix} \cdot$$

$$\{y_{p1}(n+1) - 0\}$$

$$= \begin{bmatrix} \hat{x}_{p1}(n+1\mid n+1)[1,1] \\ \hat{x}_{p1}(n+1\mid n+1)[2,1] \\ \vdots \\ \hat{x}_{p1}(n+1\mid n+1)[L_{p1},1] \end{bmatrix}$$

[45]

As a restored signal is the first row, first column element of optimum estimate vector $x_{p1}(n+1\mid n+1)$—that is, optimum estimate $x_{p1}(n+1\mid n+1)[1,1]$, it can be said that with invention method 1 there is no influence with respect to a colored driving source.

Similarly, parts influenced by the driving source with respect to desired signal estimation error vector correlation matrix $P_{p1}(n+1\mid n+1)$ are written as shown in equation 46 below.

(Equation 46)
$$P_{p1}(n+1 \mid n+1) = \{I - k_{p1}(n+1)m^T\}P_{p1}(n+1 \mid n)$$ [46]

$$= \left\{ \begin{bmatrix} 1 & 0 & \cdots & \cdots & 0 \\ 0 & \ddots & & & \vdots \\ \vdots & \ddots & \ddots & & \vdots \\ \vdots & & \ddots & \ddots & \vdots \\ 0 & \cdots & \cdots & 0 & 1 \end{bmatrix} - \begin{bmatrix} k_{p1}(n+1)[1,1] \\ k_{p1}(n+1)[2,1] \\ \vdots \\ \vdots \\ k_{p1}(n+1)[L_{p1},1] \end{bmatrix} O \right\}$$

$$\cdot \left[ \begin{array}{c|c} E[d(n+1)d(n+1)] & e_2(n) \; e_3(n) \; \cdots \; e_{L_{p1}}(n) \\ \hline e_2(n) & \\ e_3(n) & P_{p1}^{L_{p1}-1, L_{p1}-1}(n \mid n) \\ \vdots & \\ e_{L_{p1}}(n) & \end{array} \right]$$

$$= [\alpha E[d(n+1)d(n+1)]] \; (\alpha = 1 - k_{p1}(n+1)[1,1])$$

From the above, it is clear that a restored signal is not influenced by a colored driving source. Also, these arguments are not limited to an n-th update but hold true regardless of how many times updating is done. Thus, the effectiveness of a newly invented state space model including a colored driving source is clear.

<Invention Method 2>

As described above, invention method 1 enables noise suppression to be implemented with an extremely small amount of computation. However, scrutiny of the algorithm of invention method 1 shows that the algorithm of invention method 1 still includes redundant computation—that is, computation for a part for which calculation is not necessary. There is a possibility that this may lead to an increase in the amount of computation, unnecessary computational error, and so forth.

Thus, invention method 2 focuses on only a part for which desired signal estimation is necessary—that is, only an extracted estimated signal—and omits part of the computation of the invention method 1 algorithm. To be more specific, invention method 2 achieves a greater reduction in the amount of computation than invention method 1 by focusing on only a restored desired signal (for example, a speech signal)—that is, desired signal optimum estimate $x_{p1}(n+1 \mid n+1)[1,1]$.

That is to say, focusing on restored desired signal $x_{p1}(n+1 \mid n+1)[1,1]$, this is written as equation 47 and equation 48 below.

(Equation 47)
$$\hat{x}_{p1}(n+1 \mid n+1) =$$ [47]
$$\hat{x}_{p1}(n+1 \mid n) + k_{p1}(n+1)\{y_{p1}(n+1) - m_{p1}^T \hat{x}_{p1}(n+1 \mid n)\}$$

$$\begin{bmatrix} \hat{x}_{p1}(n+1 \mid n+1)[1,1] \\ \hat{x}_{p1}(n+1 \mid n+1)[2,1] \\ \vdots \\ \hat{x}_{p1}(n+1 \mid n+1)[L_{p1},1] \end{bmatrix} = \begin{bmatrix} 0 \\ \hat{x}_{p1}(n \mid n)[1,1] \\ \vdots \\ \hat{x}_{p1}(n \mid n)[L_{p1},1] \end{bmatrix} +$$

$$\begin{bmatrix} k_{p1}(n+1)[1,1] \\ \vdots \\ \vdots \\ k_{p1}(n+1)[L_{p1},1] \end{bmatrix} \cdot \{\{y_{p1}(n+1) - 0\} - [1 \; 0 \; \cdots \; 0]\} \cdot$$

$$\begin{bmatrix} \hat{x}_{p1}(n \mid n)[1,1] \\ \hat{x}_{p1}(n \mid n)[2,1] \\ \vdots \\ \hat{x}_{p1}(n \mid n)[L_{p1},1] \end{bmatrix}$$

$$\begin{bmatrix} \hat{x}_{p1}(n+1 \mid n+1)[1,1] \\ \hat{x}_{p1}(n+1 \mid n+1)[2,1] \\ \vdots \\ \hat{x}_{p1}(n+1 \mid n+1)[L_{p1},1] \end{bmatrix} = \begin{bmatrix} 0 \\ \hat{x}_{p1}(n \mid n)[1,1] \\ \vdots \\ \hat{x}_{p1}(n \mid n)[L_{p1},1] \end{bmatrix} +$$

$$\begin{bmatrix} k_{p1}(n+1)[1,1] \\ \vdots \\ \vdots \\ k_{p1}(n+1)[L_{p1},1] \end{bmatrix} \cdot \{y_{p1}(n+1) - 0\}$$

(Equation 48)
$$\hat{x}_{p1}(n+1 \mid n+1)[1,1] = k_{p1}(n+1)[1,1]y_{p1}(n+1)$$ [48]

Since $y_{p1}(n+1)$ is an observed signal and is known at this time, only the first row, first column element of weighting coefficient vector $k_{p1}(n+1)$ is necessary in order to obtain restored desired signal $x_{p1}(n+1 \mid n+1)[1,1]$.

Since weighting coefficient vector $k_{p1}(n+1)$ is written as equation 49 below, it is possible to obtain the first row, first column element of weighting coefficient vector $k_{p1}(n+1)$ by means of equation 50 below.

(Equation 49)
$$k_{p1}(n+1) = P_{p1}(n+1 \mid n)m_{p1}\{m_{p1}^T P_{p1}(n+1 \mid n)m_{p1} + r_{\epsilon_{p1}}(n+1)\}^{-1}$$ [49]

$$\begin{bmatrix} k_{p1}(n+1)[1,1] \\ k_{p1}(n+1)[2,1] \\ \vdots \\ k_{p1}(n+1)[L_{p1},1] \end{bmatrix} = \left\{ \begin{bmatrix} P_{p1}(n+1 \mid n)[1,1] & P_{p1}(n+1 \mid n)[1,2] & \cdots & P_{p1}(n+1 \mid n)[1,L_{p1}] \\ P_{p1}(n+1 \mid n)[2,1] & \ddots & \ddots & \vdots \\ \vdots & \ddots & \ddots & \vdots \\ P_{p1}(n+1 \mid n)[L_{p1},1] & \cdots & \cdots & P_{p1}(n+1 \mid n)[L_{p1},L_{p1}] \end{bmatrix} \begin{bmatrix} 1 \\ 0 \\ \vdots \\ 0 \end{bmatrix} \right\}$$

$$\left\{ [1 \; 0 \; \cdots \; 0] \begin{bmatrix} P_{p1}(n+1 \mid n)[1,1] & P_{p1}(n+1 \mid n)[1,2] & \cdots & P_{p1}(n+1 \mid n)[1,L_{p1}] \\ P_{p1}(n+1 \mid n)[2,1] & \ddots & \ddots & \vdots \\ \vdots & \ddots & \ddots & \vdots \\ P_{p1}(n+1 \mid n)[L_{p1},1] & \cdots & \cdots & P_{p1}(n+1 \mid n)[L_{p1},L_{p1}] \end{bmatrix} \begin{bmatrix} 1 \\ 0 \\ \vdots \\ 0 \end{bmatrix} + r_{\epsilon_{p1}}(n+1) \right\}^{-1}$$

(Equation 50)
$$k_{p1}(n+1)[1,1] = P_{p1}(n+1 \mid n)[1,1]\{P_{p1}(n+1 \mid n)[1,1] + r_{\epsilon_{p1}}(n+1)\}^{-1}$$ [50]

Similarly, only the first row, first column element of desired signal estimation error vector correlation matrix $P_{p1}(n+1|n)$ is necessary in order to obtain weighting coefficient $k_{p1}(n+1)$ [1,1]. Therefore, since this matrix $P_{p1}(n+1|n)$ is written as equation 51 below, the first row, first column element of this matrix $P_{p1}(n+1|n)$ is obtained by means of equation 52 below.

(Equation 51)

$$P_{p1}(n+1|n) = \Phi_{p1} P_{p1}(n|n) \Phi_{p1}^T + R_{\delta_{p1}}(n+1) \quad [51]$$

$$\begin{bmatrix} P_{p1}(n+1|n)[1,1] & P_{p1}(n+1|n)[1,2] & \cdots & \cdots & P_{p1}(n+1|n)[1,L_{p1}] \\ P_{p1}(n+1|n)[2,1] & \ddots & & & \vdots \\ \vdots & \ddots & \ddots & \ddots & \vdots \\ \vdots & & \ddots & \ddots & \vdots \\ P_{p1}(n+1|n)[L_{p1},1] & \cdots & & \cdots & P_{p1}(n+1|n)[L_{p1},L_{p1}] \end{bmatrix} =$$

$$\begin{bmatrix} 0 & 0 & \cdots & \cdots & 0 \\ 1 & 0 & \cdots & \cdots & 0 \\ 0 & \ddots & \ddots & & \vdots \\ \vdots & \ddots & \ddots & \ddots & \vdots \\ 0 & \cdots & 0 & 1 & 0 \end{bmatrix} \begin{bmatrix} P_{p1}(n|n)[1,1] & P_{p1}(n|n)[1,2] & \cdots & \cdots & P_{p1}(n|n)[1,L_{p1}] \\ P_{p1}(n|n)[2,1] & \ddots & \ddots & & \vdots \\ \vdots & & \ddots & \ddots & \vdots \\ \vdots & & & \ddots & \vdots \\ P_{p1}(n|n)[L_{p1},1] & \cdots & & \cdots & P_{p1}(n|n)[L_{p1},L_{p1}] \end{bmatrix}$$

$$\begin{bmatrix} 0 & 1 & 0 & \cdots & 0 \\ 0 & 0 & \ddots & \ddots & \vdots \\ \vdots & \ddots & \ddots & \ddots & 0 \\ \vdots & & \ddots & \ddots & 1 \\ 0 & 0 & \cdots & \cdots & 0 \end{bmatrix} + \begin{bmatrix} R_{\delta_{p1}}(n+1)[1,1] & 0 & \cdots & \cdots & 0 \\ 0 & & \ddots & \ddots & \vdots \\ \vdots & & \ddots & \ddots & \vdots \\ \vdots & & \ddots & \ddots & 0 \\ 0 & & \cdots & \cdots & 0 & 0 \end{bmatrix}$$

(Equation 52)

$$P_{p1}(n+1|n)[1,1] = R_{\delta_{p1}}(n+1)[1,1] \quad [52]$$

Figure 24:
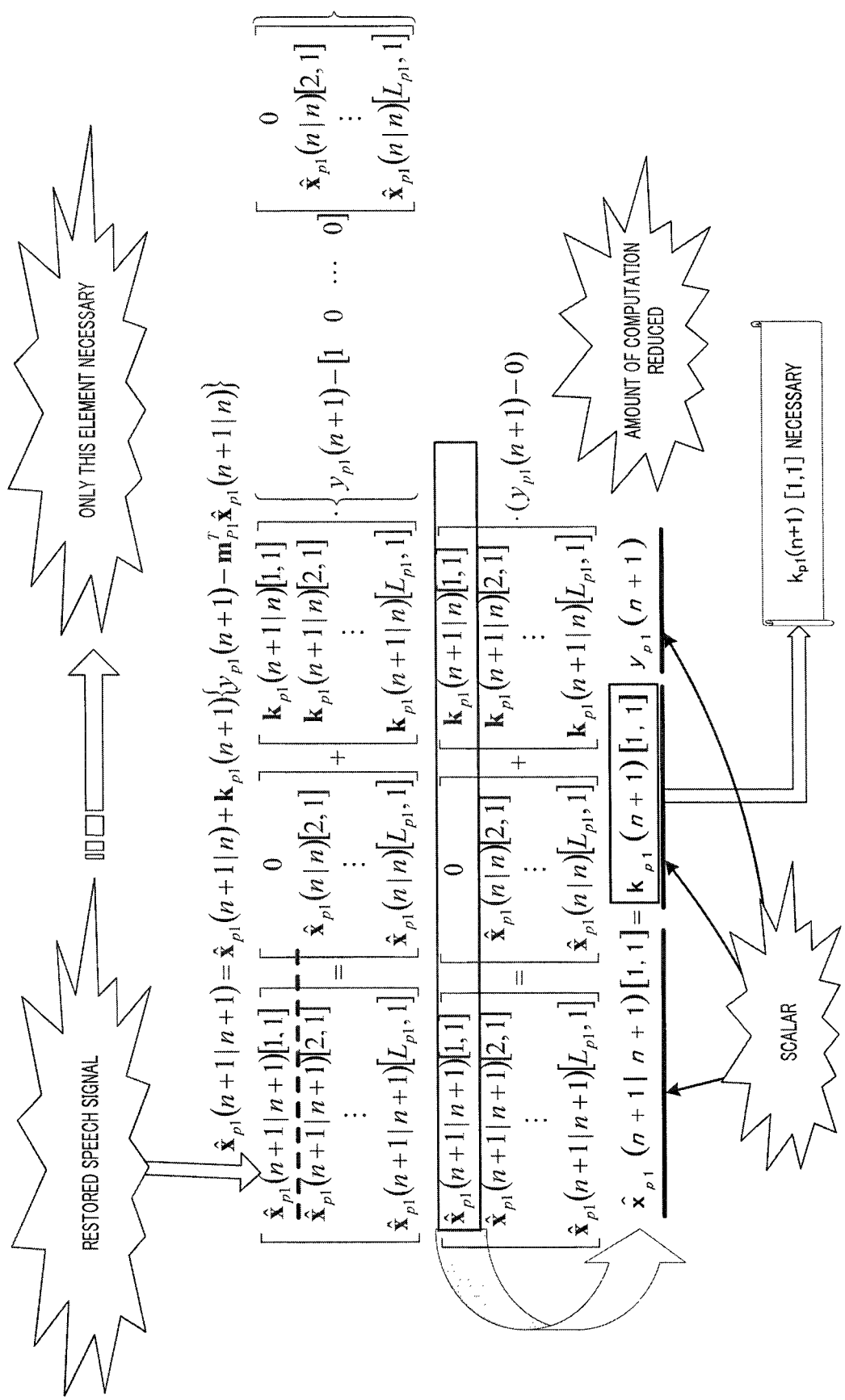
FIG. 24 is a step-by-step explanatory drawing visually showing a derivation method of invention method 2 of this embodiment.
Figure 25:
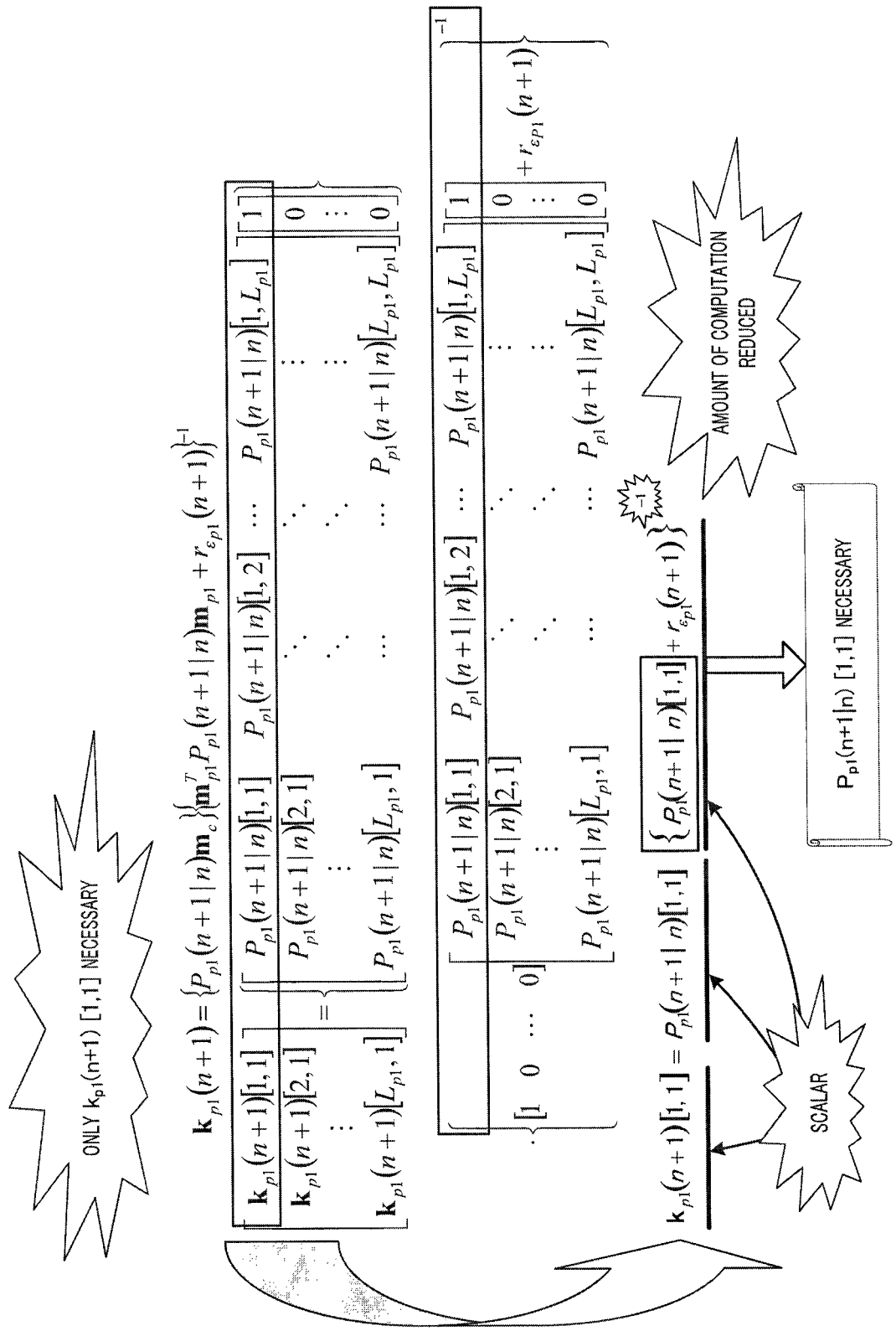
FIG. 25 is a step-by-step explanatory drawing following on from FIG. 24.

FIG. 24 through FIG. 26 are step-by-step explanatory drawings visually showing a derivation method of invention method 2. If the derivation method of above-described invention method 2 is explained visually, it is as shown in FIG. 24 through FIG. 26.

From the above, an algorithm of invention method 2 in which redundant computation has been eliminated from invention method 1 is given in FIG. 27. Subscript "p2" indicates that this item relates to invention method 2. FIG. 28 is an explanatory drawing visually summarizing the advantages of an algorithm of invention method 2.

As shown in FIG. 27, an algorithm of invention method 2 is broadly divided into an initialization process and an iteration process, and the iteration process comprises processing procedures such that an AR coefficient is not used, as in the case of conventional method 3 and conventional method 1 (see FIG. 10 and FIG. 21), and the amount of computation is reduced to a greater extent than in the case of conventional method 3 and conventional method 1 (see FIG. 10 and FIG. 21). In the iteration process, procedures 1 through 3 are repeated sequentially. That is to say, the number of procedures of the iteration process of invention method 2 has been reduced from 5 steps to 3 steps as compared with conventional method 3 and invention method 1. Invention method 2 omits part of the computation of invention method 1, and its state space model (comprising a state equation and observation equation) is similar to that of invention method 1.

Figure 29:
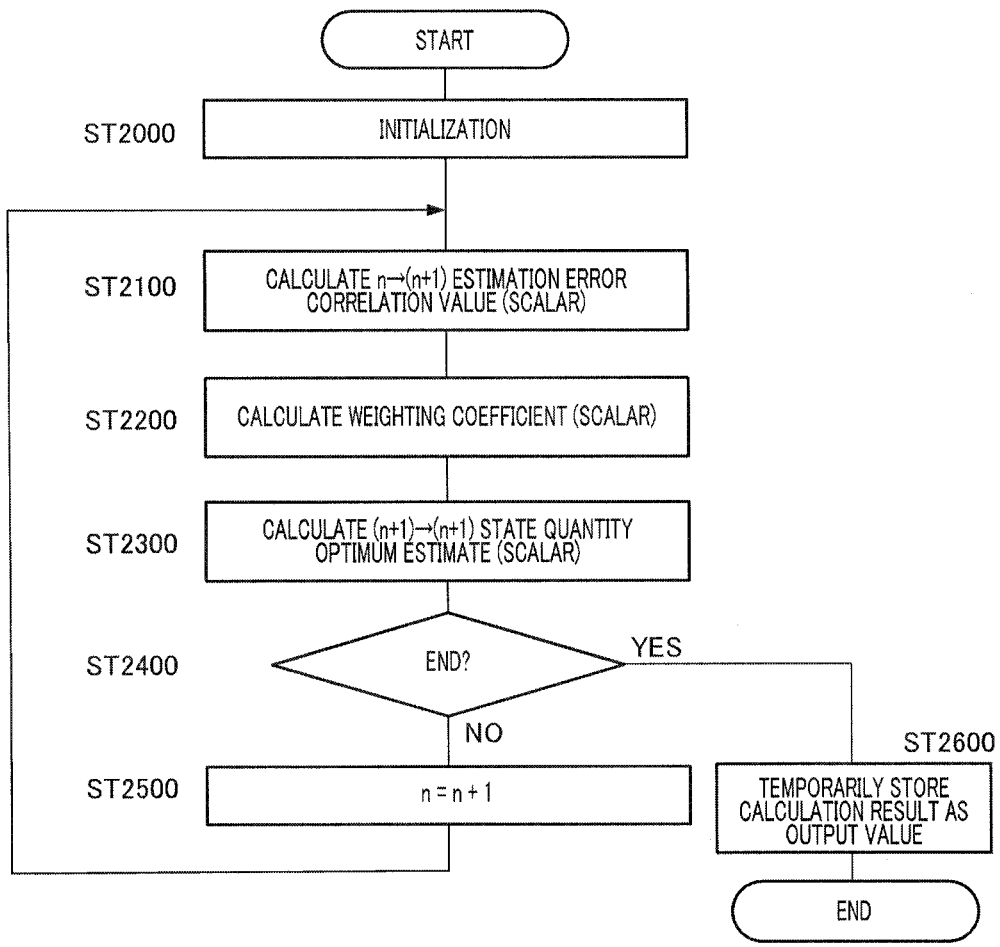
FIG. 29 is a flowchart showing a processing procedure to execute the algorithm in FIG. 27.

FIG. 29 is a flowchart showing a processing procedure to execute the algorithm in FIG. 27.

First, initialization section 152 performs initialization (ST 2000). To be more specific, in initialization section 152, the value of noise (scalar) covariance $r_{\epsilon_{p2}}(n+1)$, the initial value of a counter at time n, and the value of driving source (scalar) covariance $R_{\delta_{p2}}(n+1)$, are set as shown in equations 53 below.

(Equation 53)

$$r_{\epsilon_{p2}}(n) = \sigma_v^2 \quad [53]$$

$$r_{\delta_{p2}}(n) = \frac{1}{L_{p2}-1} \sum_{l=1}^{L_{p2}-1} r^2(n-l) - \sigma_v^2$$

Here, $\sigma_v^2$ is noise variance of noise $\epsilon_{p2}(n)$ (=v(n)), and is assumed to be known. "Known" here means found and given by another arbitrary method (algorithm). If noise $\epsilon_{p2}(n)$ is white noise and is zero-mean, $\sigma_v^2$ is given by equation 6 above.

Next, correlation computation section 154 calculates an n→(n+1) estimation error correlation value (scalar) (ST 2100). To be more specific, correlation computation section 154 calculates the first row, first column element of correlation matrix $P_{p2}(n+1|n)$ of error (a desired signal estimation error vector) when a state vector of time n+1 is estimated based on information up to time n for an observed signal of only time n—that is, scalar $P_{p2}(n+1|n)[1,1]$. This calculation is performed by means of equation 54 below using the value of driving source (scalar) covariance $r_{\delta_{p2}}(n+1)$ set in step ST 2000. This step ST 2100 corresponds to procedure 1 of the iteration process in FIG. 27.

[54]

$$P_{p2}(n+1|n)[1,1] = r_{\delta_{p2}}(n+1) \quad \text{(Equation 54)}$$

Next, weighting coefficient calculation section 156 performs weighting coefficient (scalar) calculation (ST 2200).

To be more specific, weighting coefficient calculation section 156 calculates the first row, first column element of weighting coefficient vector $k_{p2}(n+1)$ such that a result of multiplying estimation error (scalar) of an observed signal that is an observed quantity by the weighting coefficient (scalar) for an observed signal of only time n and adding optimum estimate vector $x_{p2}(n+1|n)$ of a desired signal at time n+1 based on information up to time n is optimum estimate vector $x_{p2}(n+1|n+1)$ of a desired signal at that time based on information up to time n+1—that is, scalar $k_{p2}(n+1)[1,1]$. This calculation is performed by means of equation 55 below using the values of scalar $P_{p2}(n+1|n)[1,1]$ that is the first row, first column element of desired signal estimation error vector correlation matrix $P_{p2}(n+1|n)$ calculated in step ST 2100, and noise covariance $r_{\epsilon p2}(n+1)$ set in step ST 2000. This step ST 2200 corresponds to procedure 2 of the iteration process in FIG. 27.

[55]

$$k_{p2}(n+1)[1,1]=P_{p2}(n+1|n)[1,1]\{P_{p2}(n+1|n)[1,1]+r_{\epsilon p2}(n+1)\}^{-1} \qquad \text{(Equation 55)}$$

Next, optimum estimate calculation section 158 calculates an optimum estimate (scalar) of an n→(n+1) state quantity (desired signal) (ST 2300). To be more specific, optimum estimate calculation section 158 calculates the first row, first column element of desired signal optimum estimate vector $x_{p2}(n+1|n+1)$ at that time based on information up to time n+1 for an observed signal of only time n—that is, desired signal optimum estimate $x_{p2}(n+1|n+1)[1,1]$. This calculation is performed by means of equation 56 below using weighting coefficient $k_{p2}(n+1)[1,1]$ calculated in step S2200, and observed signal $y_{p2}(n+1)$ at time n. This step ST 2300 corresponds to procedure 3 of the iteration process in FIG. 27.

[56]

$$\hat{x}_{p2}(n+1|n+1)=k_{p2}(n+1)[1,1]y_{p2}(n+1) \qquad \text{(Equation 56)}$$

Next, whether or not processing is to be terminated is determined (ST 2400). This determination is made, for example, by determining whether or not time n has reached predetermined number of samples N. If the result of this determination is that time n has not reached predetermined number of samples N (ST 2400: NO), the processing flow proceeds to step ST 2500, whereas, if the result of this determination is that time n has reached predetermined number of samples N (ST 2400: YES), the processing flow proceeds to step ST 2600. The criterion for this determination is not limited to the above example. For example, when processing is performed in real time, provision may be made for processing to be terminated when there are no more samples, even if time n has not reached predetermined number of samples N.

In step ST 2500, the counter at time n is incremented by 1 (n=n+1), and the processing flow returns to step ST 2100.

On the other hand, in step ST 2600, a calculation result of this algorithm is temporarily stored as an output value. To be more specific, desired signal optimum estimate $x_{p2}(n+1|n+1)[1,1]$ calculated in step ST 2300 is temporarily stored in noise suppression processing section 150 as an output value of this algorithm.

Thus, with invention method 2, in the same way as with conventional method 3 and invention method 1, a new state space model that does not require AR coefficient estimation is configured, making noise suppression possible with one-step processing.

Also, with invention method 2, scalarization is further performed as compared with invention method 1, and the number of procedures of the iteration process is reduced from 5 steps to 3 steps, enabling a greater reduction in the amount of computation to be achieved (see FIG. 28).

Furthermore, in contrast to invention method 1, invention method 2 does not require setting of observation transition vector m or state transition matrix Φ (see "Initialization" in FIG. 27 and equations 53), enabling a significant reduction in memory capacity to be achieved together with a reduction in the amount of computation associated with the reduction in the number of iteration process procedures.

Next, the effects of invention method 1 and invention method 2 in reducing the amount of computation will be described.

Figure 31:
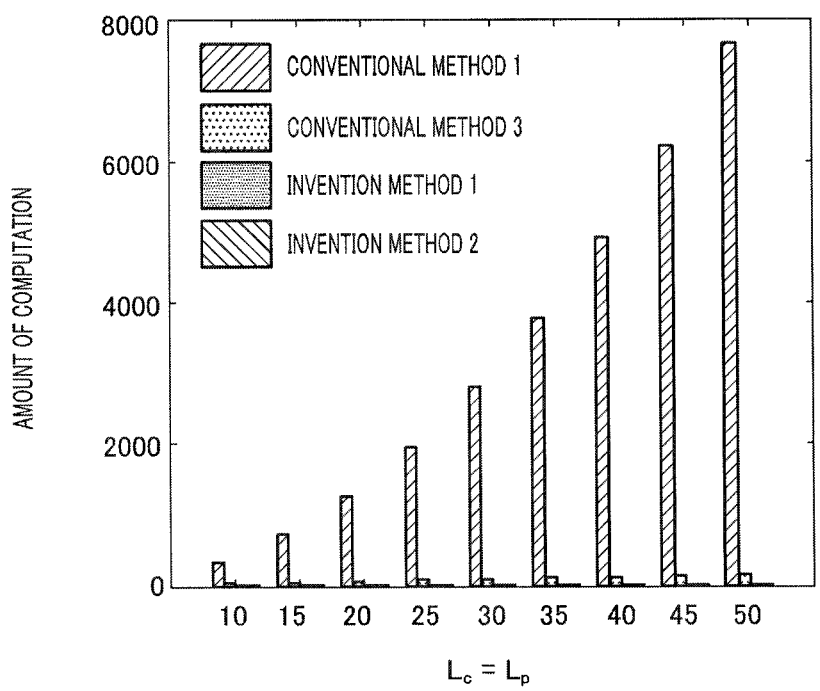
FIG. 31 is a graph chiefly showing a comparison of conventional method 1 with conventional method 3 and invention methods 1 and 2.
Figure 32:
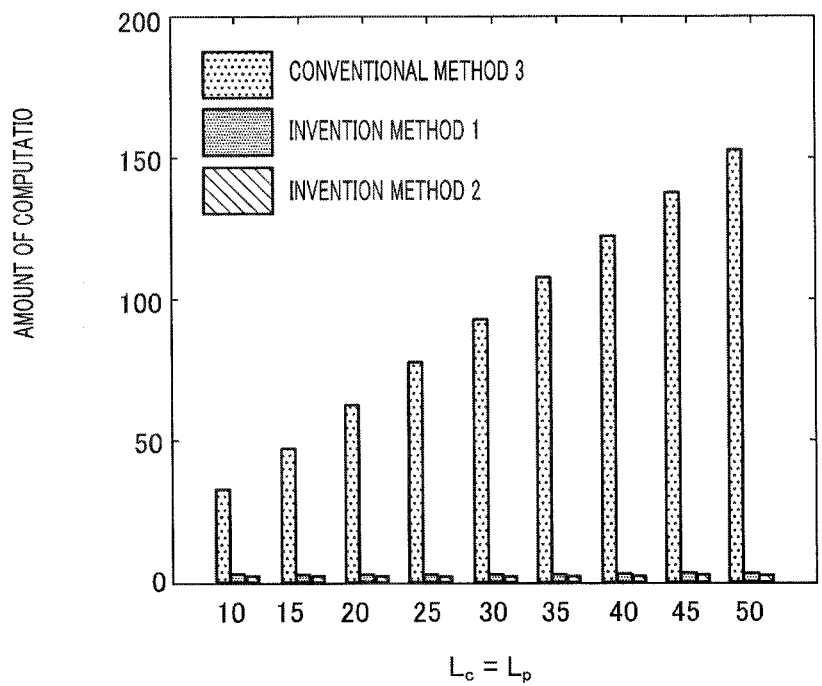
FIG. 32 is a graph showing a comparison between conventional method 3 and invention methods 1 and 2.

FIG. 30 comprises a set of drawings for explaining the amount of computation of the above methods, with FIG. 30A relating to conventional method 1, FIG. 30B to conventional method 3, FIG. 30C to invention method 1, and FIG. 30D to invention method 2. FIG. 31 and FIG. 32 are graphs showing the relationship between degree and amount of computation, FIG. 31 being a graph chiefly showing a comparison of conventional method 1 with conventional method 3 and invention methods 1 and 2, and FIG. 32 being a graph showing a comparison between conventional method 3 and invention methods 1 and 2.

In FIG. 30 through FIG. 32, an amount of computation is represented by a number of times computation is performed (a number of computations). In these figures, "$L_{c1}$" is an order of an AR coefficient and "$L_{c3}$" and "$L_p$" are state transition matrix sizes. Here, for convenience, $L_{c1}$ and $L_{c3}$ are together represented as "$L_c$". Also, "$L_p$" is a combined representation of state transition matrix sizes $L_{p1}$ and $L_{p2}$ of invention method 1 and invention method 2. For example, in the case of conventional method 1, as shown in FIG. 30A, the amounts of computation of procedures 1 through 5 of the iteration process of the algorithm are, in order, $2L_{c1}^2$, $L_{c1}$, $L_{c1}$, $L_{c1}$, $L_{c1}^2$, giving a total of $3L_{c1}^2+3L_{c1}$. On the other hand, in the case of conventional method 3, as shown in FIG. 30B, the amounts of computation of procedures 1 through 5 of the iteration process of the algorithm are, in order, 0, $L_{c3}-1$, 0, $L_{c3}-1$, $L_{c3}-1$, giving a total of $3L_{c3}-3$. In the case of invention method 1, as shown in FIG. 30C, the amounts of computation of procedures 1 through 5 of the iteration process of the algorithm are, in order, 0, 1, 0, 1, 1, giving a total of 3. And in the case of invention method 2, as shown in FIG. 30D, the amounts of computation of procedures 1 through 3 of the iteration process of the algorithm are, in order, 0, 1, 1, giving a total of 2.

Therefore, whereas with conventional method 1 the amount of computation increases markedly in proportion to the square of AR coefficient degree $L_{c1}$ (see FIG. 31), and with conventional method 3 the amount of computation increases markedly in proportion to state transition matrix size $L_{c3}$ (see FIG. 32), with invention method 1 and invention method 2 it can be seen that the respective amounts of computation are fixed irrespective of state transition matrix size $L_p$ (see FIG. 32). That is to say, with regard to the size of the amount of computation, the following relationship applies: conventional method 1>conventional method 3>invention method 1>invention method 2. In particular, when conventional method 1 is compared with conventional method 3 and invention methods 1 and 2, as shown in FIG. 31, conventional method 3 and invention methods 1 and 2 show a great reduction in the amount of computation compared with conventional method 1. Furthermore, when conventional method 3 is compared with invention methods 1 and 2, as shown in FIG. 32, invention method 1 and invention method 2 show a still greater reduction in the amount of computation compared with conventional method 3. Also, although not shown in the drawings, memory capacity is also greatly reduced by this kind of reduction in the amount of computation, as mentioned above.

The present inventors conducted experiments to demonstrate the effects of the present invention (the effectiveness of invention methods 1 and 2). To be more specific, objective evaluations and subjective evaluations were performed using a speech signal in order to evaluate the noise suppression capability of invention methods 1 and 2. The objective evaluations were (1) waveform-based evaluation (speech waveform simulation) and (2) numerical evaluation. The former is a visual evaluation, so to speak, while the latter is a capability (noise suppression capability) evaluation. The subjective evaluation was (3) a listening test, this being a sound quality evaluation, so to speak. In these experiments, conventional methods 1 through 3 were compared with invention methods 1 and 2 in order to demonstrate that the present invention has a particular operational effect with respect to not only a conventional noise suppression method based on a Kalman filter but also a conventional noise suppression method based on a theory other than the Kalman filter theory. The evaluations are described in order below.

(1) Objective Evaluation (Waveform-Based Evaluation)

FIG. 33 comprises a set of drawings for explaining a first example of speech waveform simulations of each method, FIG. 34 comprises a set of drawings for explaining a second example of speech waveform simulations of each method, FIG. 35 comprises a set of drawings for explaining a third example of speech waveform simulations of each method, and FIG. 36 comprises a set of drawings for explaining a fourth example of speech waveform simulations of each method.

The simulation parameters are as follows.

In these simulations, two speech signals and two kinds of noise are used. One speech signal is speech of an adult male recorded in a silent room as a clear signal (speech signal), and is referred to as "speech (A-1)." The other speech signal is speech of an adult female recorded in a silent room as a clear signal (speech signal), and is referred to as "speech (A-2)." One kind of noise is Gaussian white noise (that is, white Gaussian noise), referred to as "noise (B-1)." The other kind of noise is bubble noise (colored noise), referred to as "noise (B-2)." Variance $\sigma_v^2$ is assumed to be known—that is, found and given by another arbitrary method (algorithm)—for both kinds of noise.

Signal-to-noise ratio $SNR_{in}$ is defined by equation 57 below.

(Equation 57)

$$SNR_{in} = 10\log_{10}\left[\frac{\frac{1}{N}\sum_{n=1}^{N}d^2(n)}{\sigma_v^2}\right] \quad [57]$$

FIG. 33 comprises a set of drawings showing speech waveform simulation results for a combination of speech (A-1) and noise (B-1), and shows various waveforms under conditions of $SNR_{in}$=10 dB and $L_c=L_p$=50 (where L is a state transition matrix or vector size), for example. To be more specific, FIG. 33A shows a speech (A-1) waveform, FIG. 33B shows a noise (B-1) waveform, and FIG. 33C shows a combined waveform of speech (A-1) and noise (B-1) (an observed signal). Also, FIG. 33D shows the waveform of an estimated speech signal when noise suppression according to conventional method 1 is performed on a combined waveform of speech (A-1) and noise (B-1), FIG. 33E shows the waveform of an estimated speech signal when noise suppression according to conventional method 2 is performed on a combined waveform of speech (A-1) and noise (B-1), FIG. 33F shows the waveform of an estimated speech signal when noise suppression according to conventional method 3 is performed on a combined waveform of speech (A-1) and noise (B-1), FIG. 33G shows the waveform of an estimated speech signal when noise suppression according to invention method 1 is performed on a combined waveform of speech (A-1) and noise (B-1), and FIG. 33H shows the waveform of an estimated speech signal when noise suppression according to invention method 2 is performed on a combined waveform of speech (A-1) and noise (B-1).

FIG. 34 comprises a set of drawings showing speech waveform simulation results for a combination of speech (A-2) and noise (B-1), and shows various waveforms under conditions of $SNR_{in}$=10 dB and $L_c=L_p$=50, for example, in the same way as described above. To be more specific, FIG. 34A shows a speech (A-2) waveform, FIG. 34B shows a noise (B-1) waveform, and FIG. 34C shows a combined waveform of speech (A-2) and noise (B-1) (an observed signal). Also, FIG. 34D shows the waveform of an estimated speech signal when noise suppression according to conventional method 1 is performed on a combined waveform of speech (A-2) and noise (B-1), FIG. 34E shows the waveform of an estimated speech signal when noise suppression according to conventional method 2 is performed on a combined waveform of speech (A-2) and noise (B-1), FIG. 34F shows the waveform of an estimated speech signal when noise suppression according to conventional method 3 is performed on a combined waveform of speech (A-2) and noise (B-1), FIG. 34G shows the waveform of an estimated speech signal when noise suppression according to invention method 1 is performed on a combined waveform of speech (A-2) and noise (B-1), and FIG. 34H shows the waveform of an estimated speech signal when noise suppression according to invention method 2 is performed on a combined waveform of speech (A-2) and noise (B-1).

FIG. 35 comprises a set of drawings showing speech waveform simulation results for a combination of speech (A-1) and noise (B-2), and shows various waveforms under conditions of $SNR_{in}$=10 dB and $L_c=L_p$=50, for example, in the same way as described above. To be more specific, FIG. 35A shows a speech (A-1) waveform, FIG. 35B shows a noise (B-2) waveform, and FIG. 35C shows a combined waveform of speech (A-1) and noise (B-2) (an observed signal). Also, FIG. 35D shows the waveform of an estimated speech signal when noise suppression according to conventional method 1 is performed on a combined waveform of speech (A-1) and noise (B-2), FIG. 35E shows the waveform of an estimated speech signal when noise suppression according to conventional method 2 is performed on a combined waveform of speech (A-1) and noise (B-2), FIG. 35F shows the waveform of an estimated speech signal when noise suppression according to conventional method 3 is performed on a combined waveform of speech (A-1) and noise (B-2), FIG. 35G shows the waveform of an estimated speech signal when noise suppression according to invention method 1 is performed on a combined waveform of speech (A-1) and noise (B-2), and FIG. 35H shows the waveform of an estimated speech signal when noise suppression according to invention method 2 is performed on a combined waveform of speech (A-1) and noise (B-2).

FIG. 36 comprises a set of drawings showing speech waveform simulation results for a combination of speech (A-2) and noise (B-2), and shows various waveforms under conditions of $SNR_{in}$=10 dB and $L_c=L_p$=50, for example, in the same way as described above. To be more specific, FIG. 36A shows a speech (A-2) waveform, FIG. 36B shows a noise (B-2) waveform, and FIG. 36C shows a combined waveform of speech (A-2) and noise (B-2) (an observed signal). Also, FIG. 36D shows the waveform of an estimated speech signal when noise suppression according to conventional method 1 is performed on a combined waveform of speech (A-2) and noise (B-2), FIG. 36E shows the waveform of an estimated speech signal when noise suppression according to conventional method 2 is performed on a combined waveform of speech (A-2) and noise (B-2), FIG. 36F shows the waveform of an estimated speech signal when noise suppression according to conventional method 3 is performed on a combined waveform of speech (A-2) and noise (B-2), FIG. 36G shows the waveform of an estimated speech signal when noise suppression according to invention method 1 is performed on a combined waveform of speech (A-2) and noise (B-2), and FIG. 36H shows the waveform of an estimated speech signal when noise suppression according to invention method 2 is performed on a combined waveform of speech (A-2) and noise (B-2).

Figure 33A:
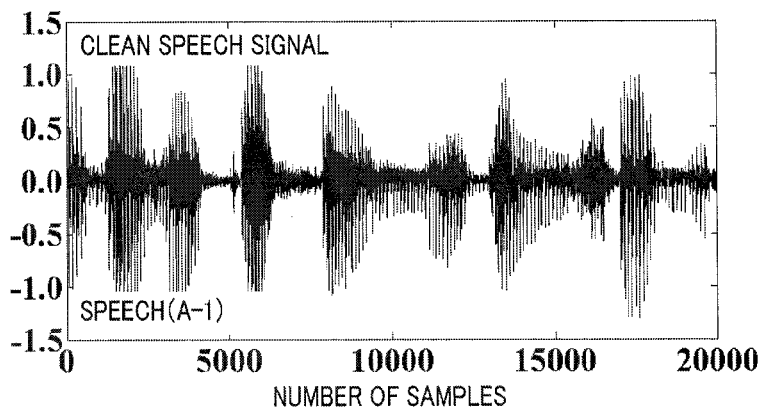
FIG. 33A through FIG. 33D are drawings for explaining a first example of speech waveform simulations of each method.
Figure 33B:
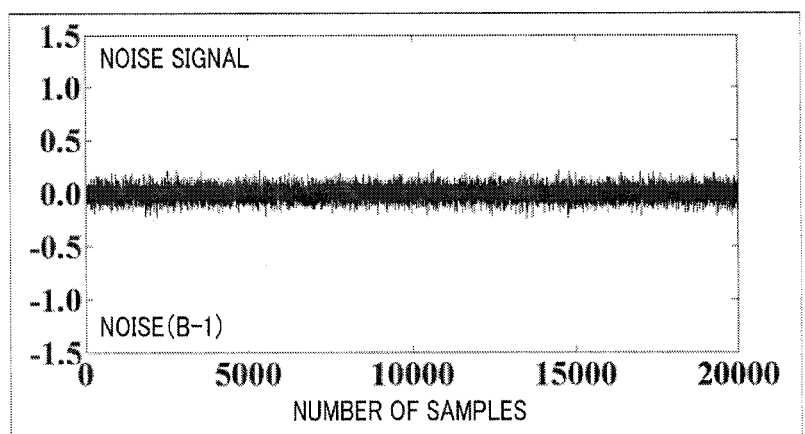
Figure 33C:
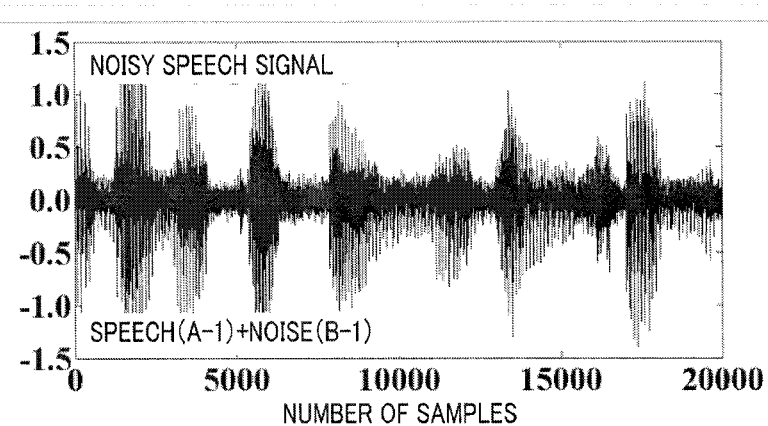
Figure 33D:
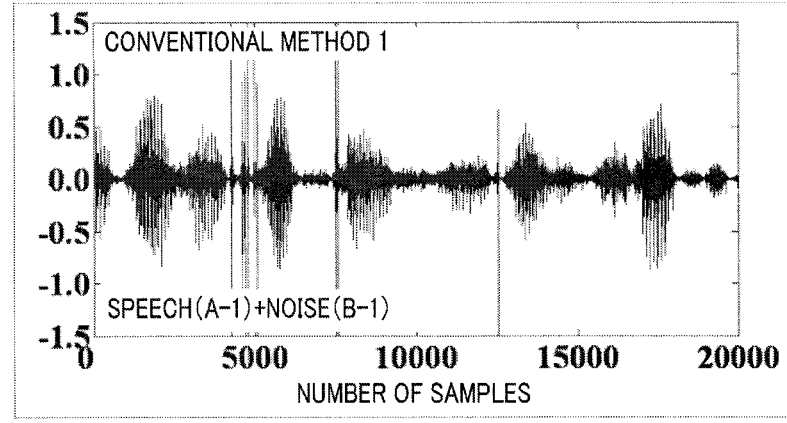
Figure 33E:
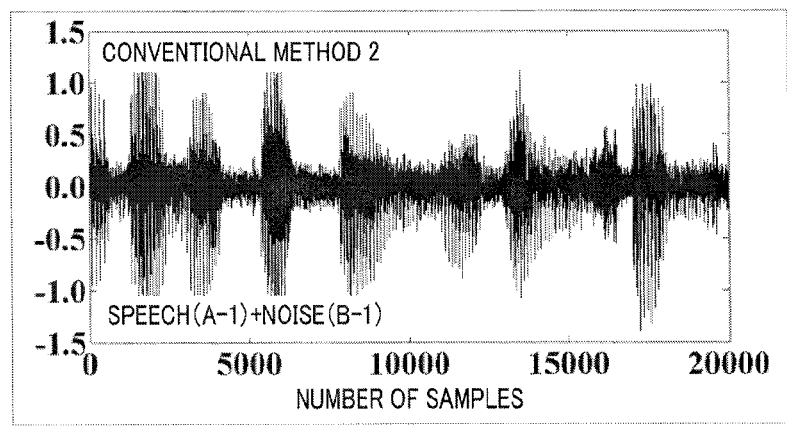
FIG. 33E through FIG. 33H are drawings for explaining a first example of speech waveform simulations of each method.
Figure 33F:
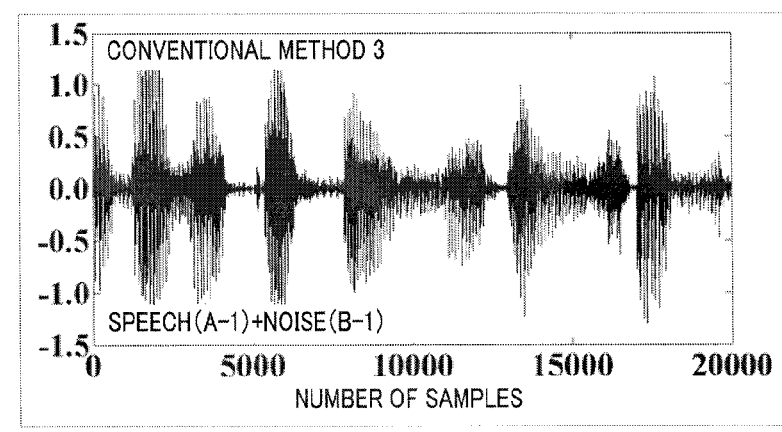
Figure 33G:
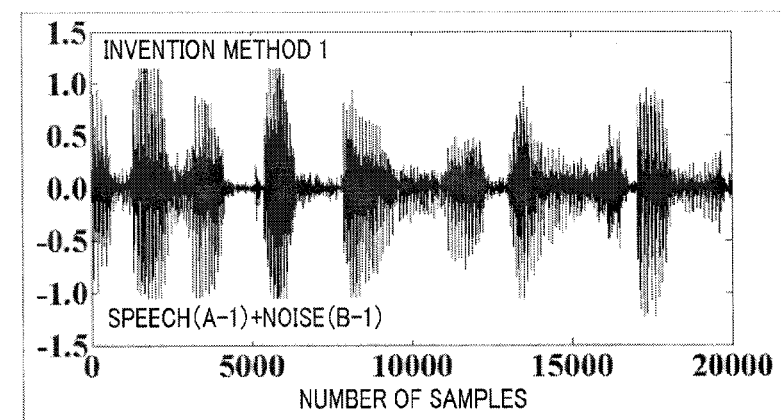
Figure 33H:
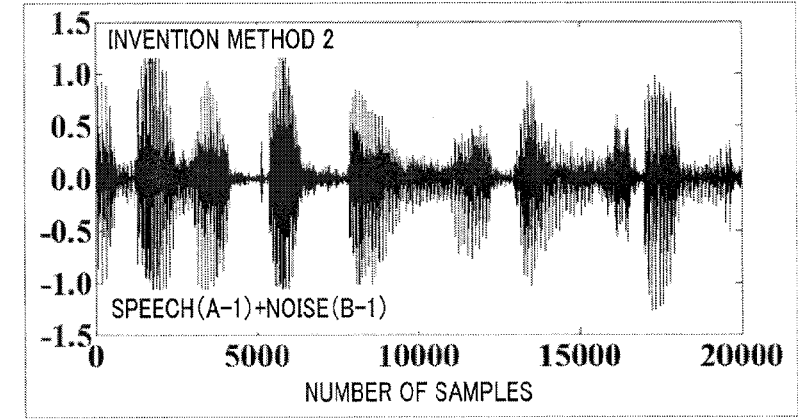
Figure 34A:
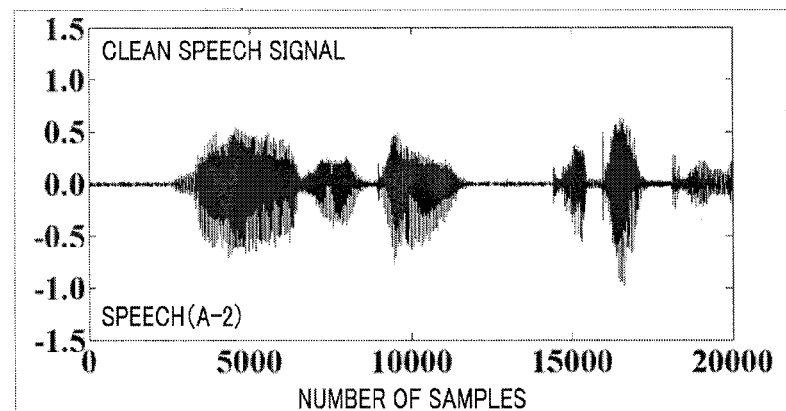
FIG. 34A through FIG. 34D are drawings for explaining a second example of speech waveform simulations of each method.
Figure 34B:
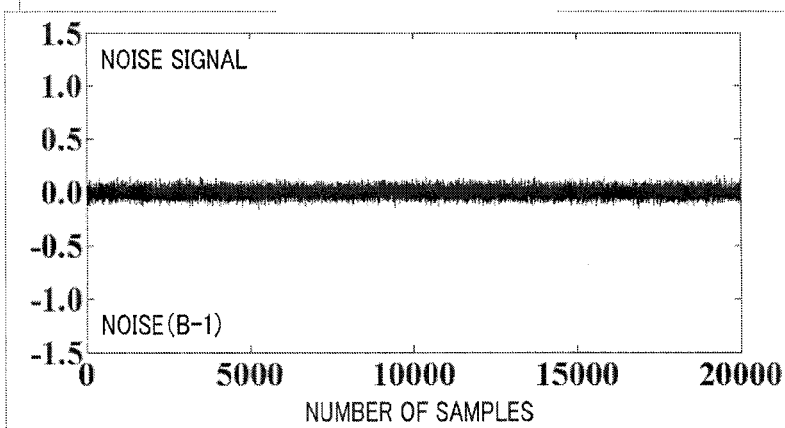
Figure 34C:
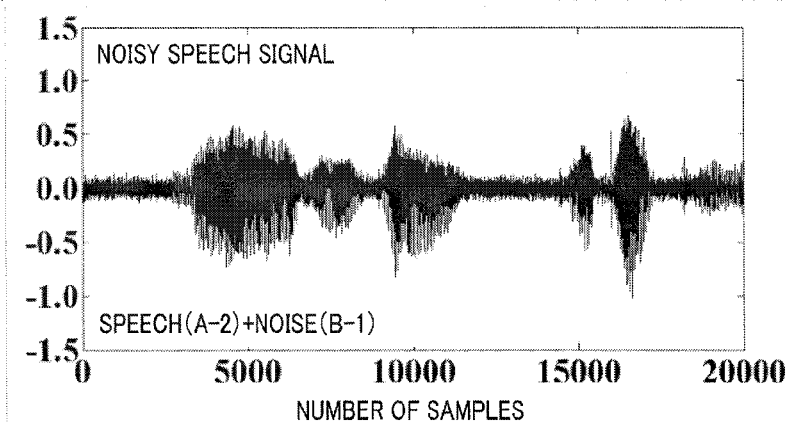
Figure 34D:
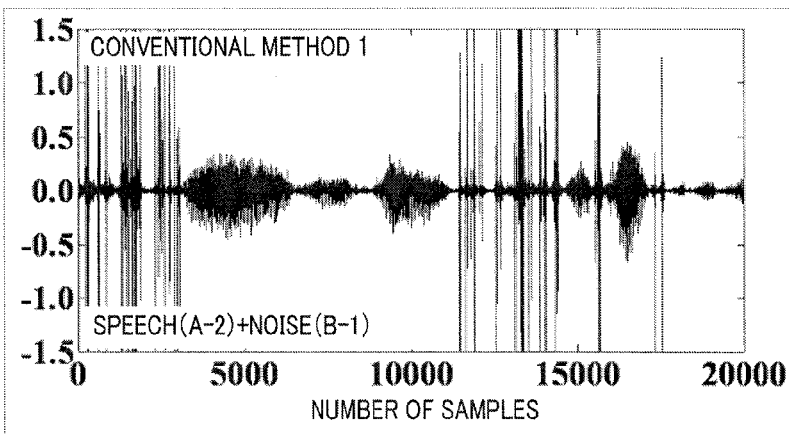
Figure 34E:
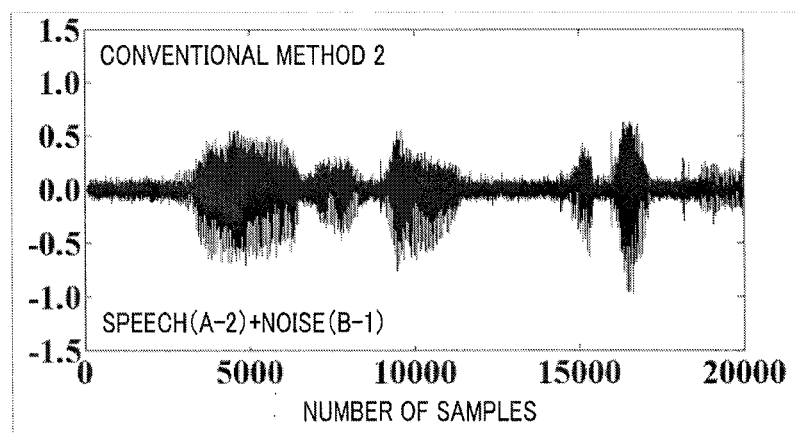
FIG. 34E through FIG. 34H are drawings for explaining a second example of speech waveform simulations of each method.
Figure 34F:
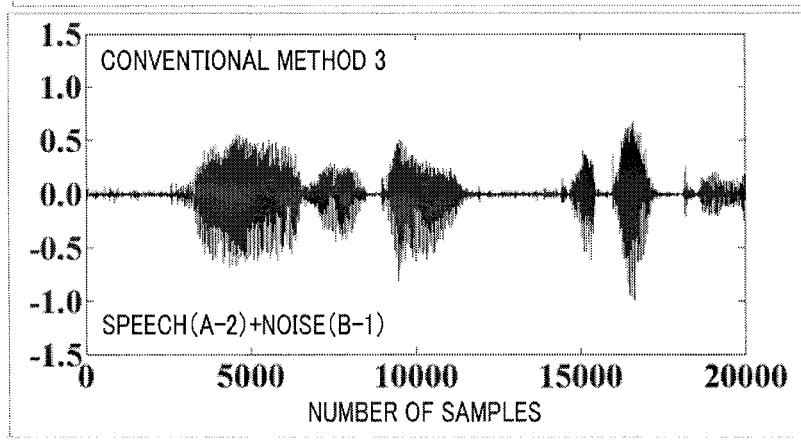
Figure 34G:
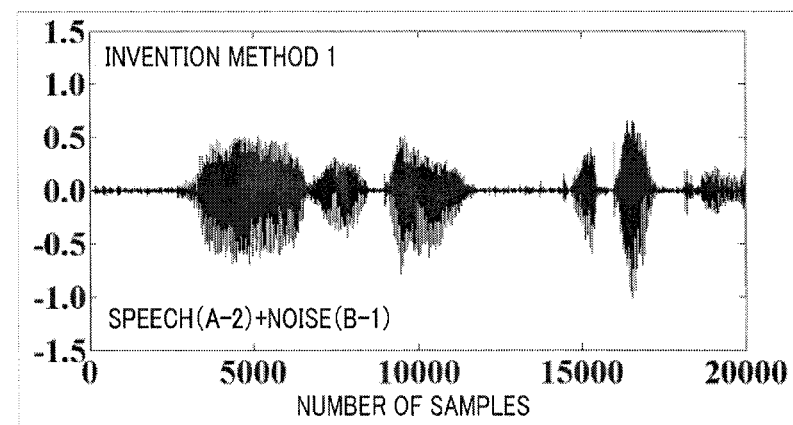
Figure 34H:
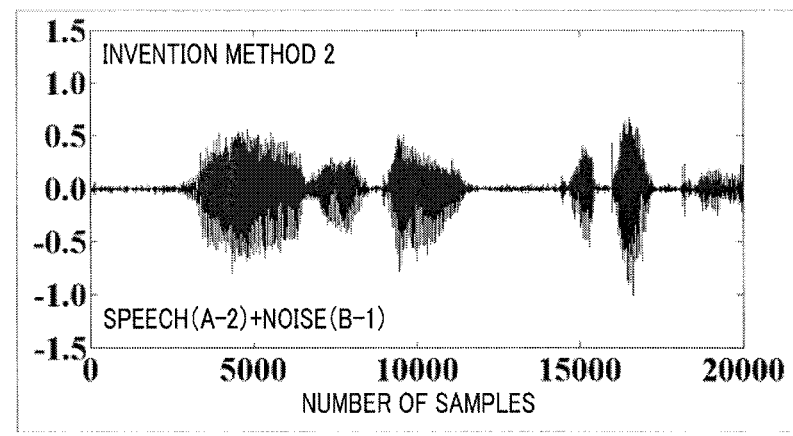

First, by comparing FIG. 33A with FIG. 33D, and FIG. 34A with FIG. 34D, it can be seen that, with noise suppression according to conventional method 1, after noise suppression, the amplitude of an estimated speech signal has decreased, and a clear signal (speech signal) has been suppressed. Also, it can be seen that, with noise suppression according to conventional method 1, the waveform of an estimated speech signal after noise suppression is deformed relative to the waveform of a clear signal (speech signal) as the number of samples increases.

Also, a comparison of FIG. 33A and FIG. 33D, in particular, shows that with noise suppression according to conventional method 1, not only is an estimated speech signal suppressed for speech (A-2) having an unvoiced section, but also noise different from the original noise is observed in an unvoiced section. The reason for this is assumed to be that, with conventional method 1, even though speech signal d(n) is 0 in an unvoiced section, AR coefficient values diverge because of the attempt to find an AR coefficient by means of equation 2 above, and an unstable state is produced.

Also, it can readily be assumed from this that application of conventional method 1 is difficult when noise is colored.

On the other hand, with noise suppression according to invention methods 1 and 2, in contrast to conventional method 1, the waveform of an estimated speech signal after noise suppression closely resembles the waveform of a clear signal (speech signal) in all cases.

Figure 35A:
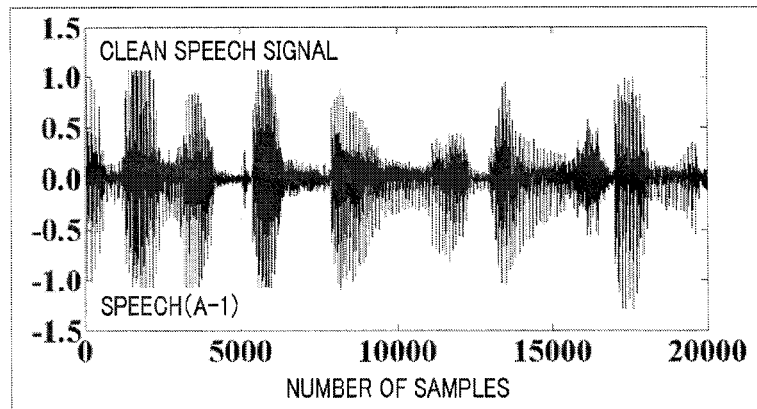
FIG. 35A through FIG. 35D are drawings for explaining a third example of speech waveform simulations of each method.
Figure 35B:
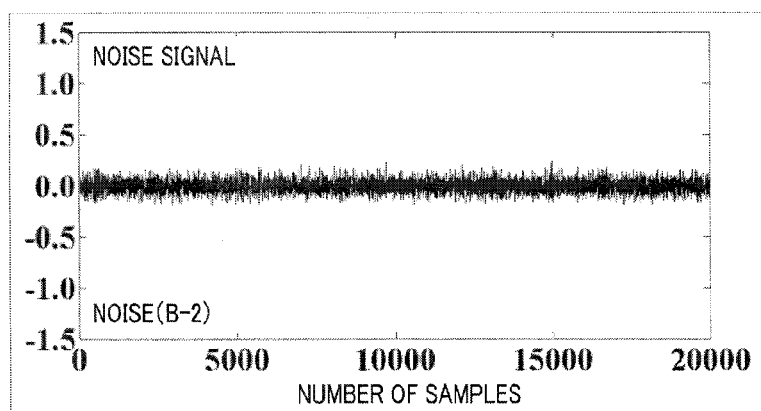
Figure 35C:
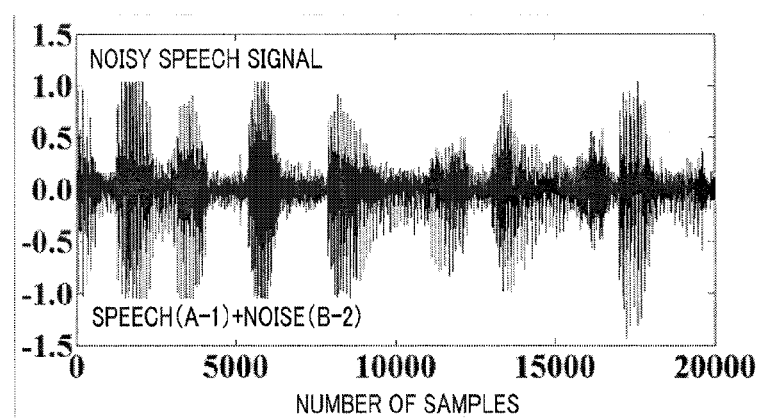
Figure 35D:
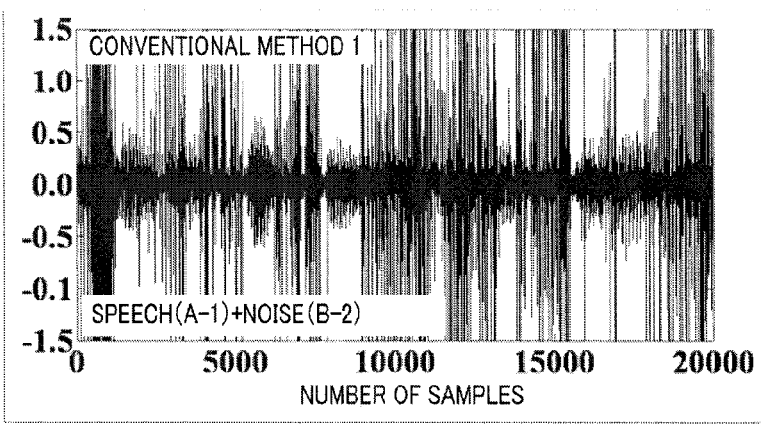
Figure 35E:
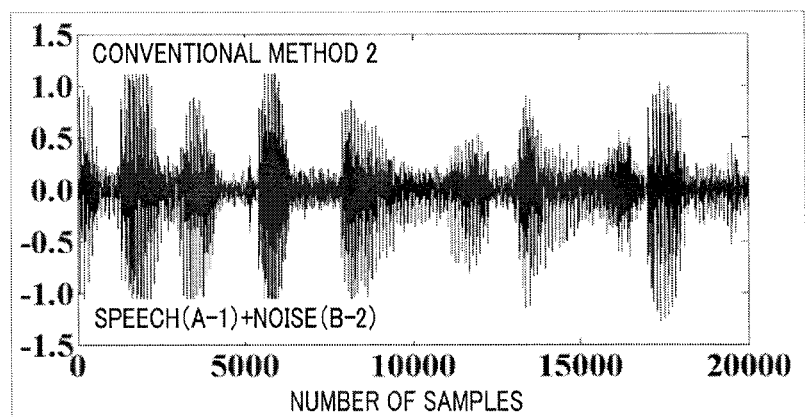
FIG. 35E through FIG. 35H are drawings for explaining a third example of speech waveform simulations of each method.
Figure 35F:
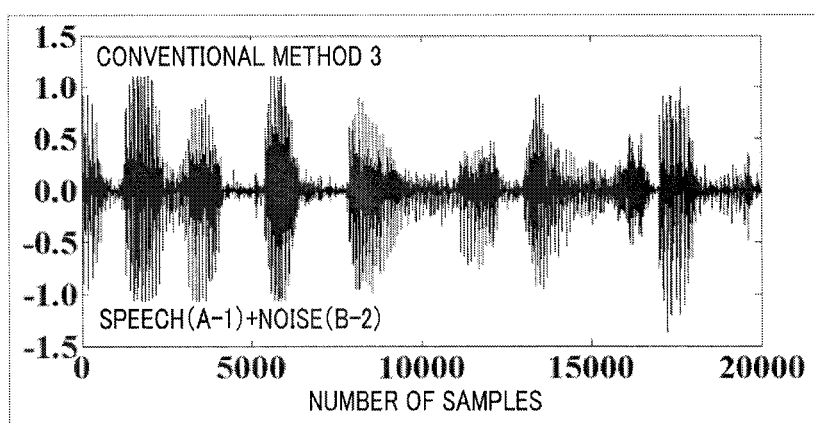
Figure 35G:
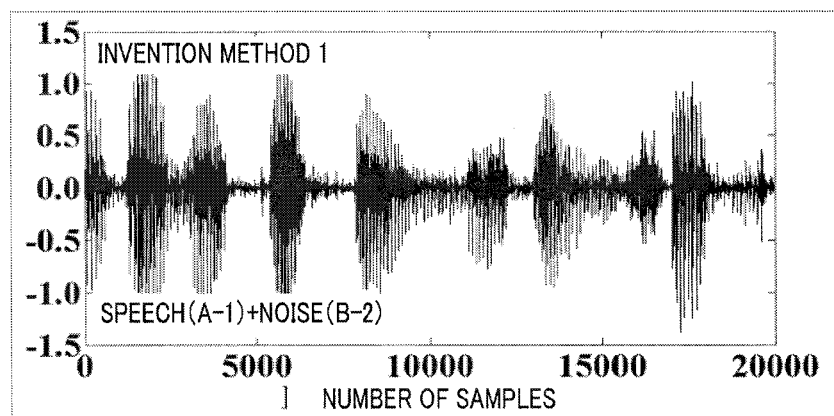
Figure 35H:
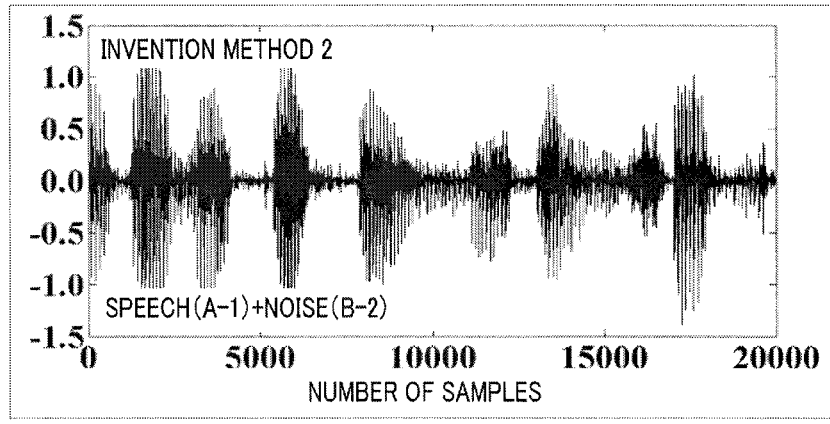
Figure 36A:
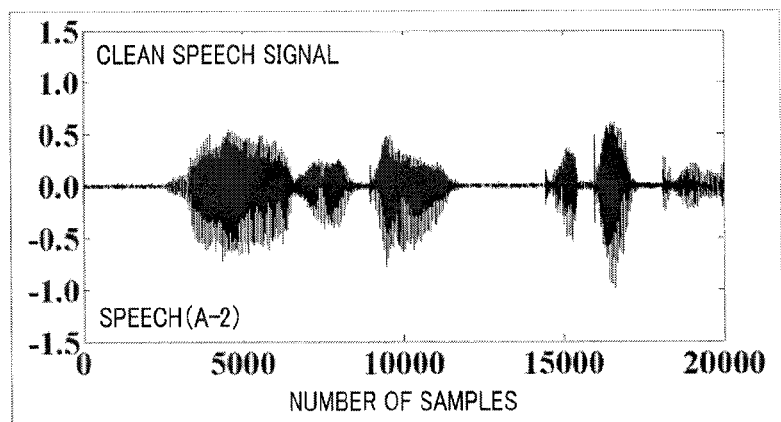
FIG. 36A through FIG. 36D are drawings for explaining a fourth example of speech waveform simulations of each method.
Figure 36B:
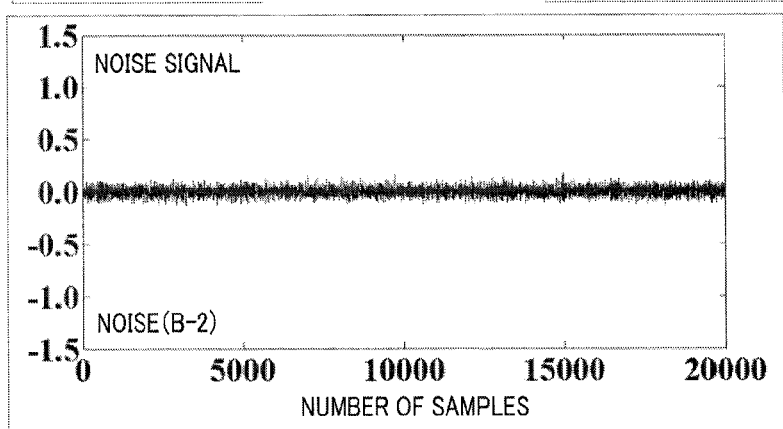
Figure 36C:
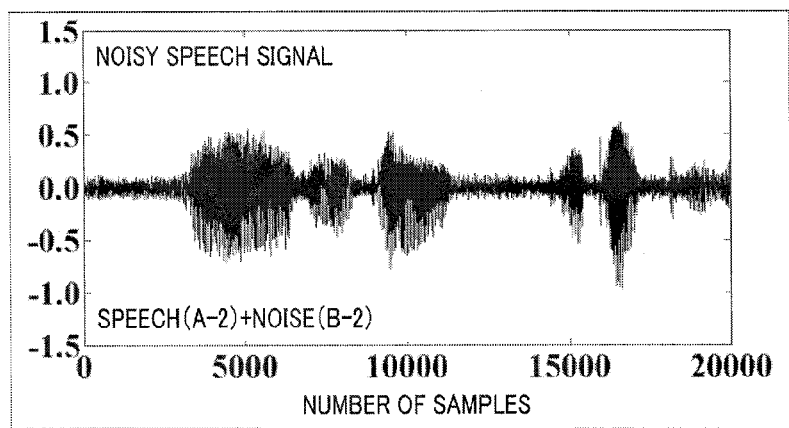
Figure 36D:
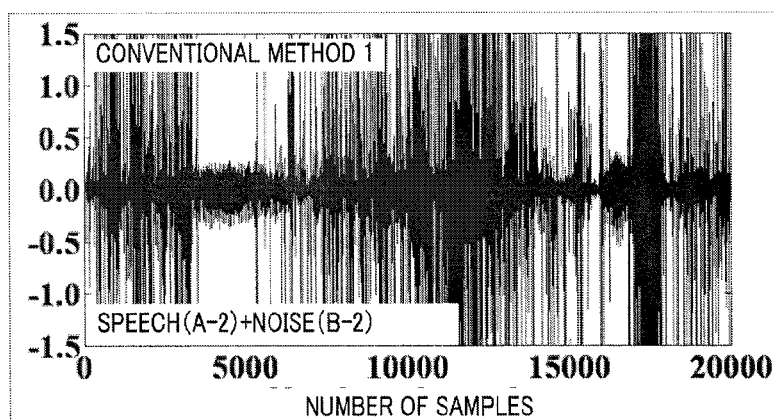
Figure 36E:
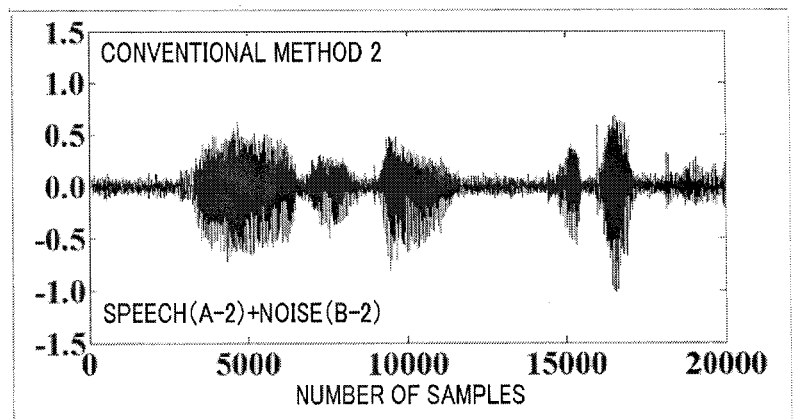
FIG. 36E through FIG. 36H are drawings for explaining a fourth example of speech waveform simulations of each method.
Figure 36F:
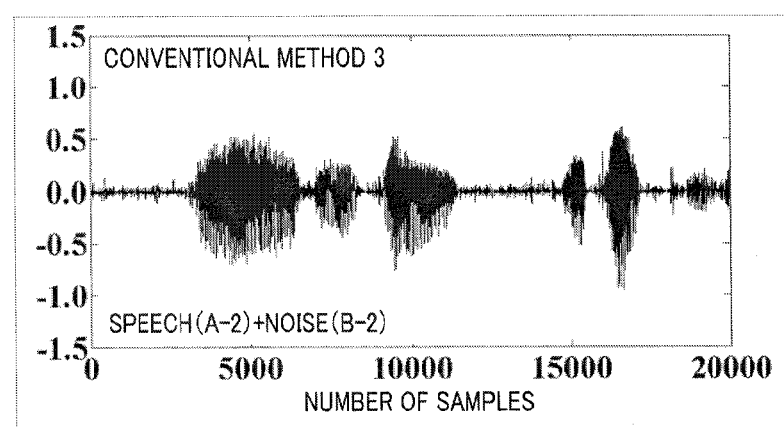
Figure 36G:
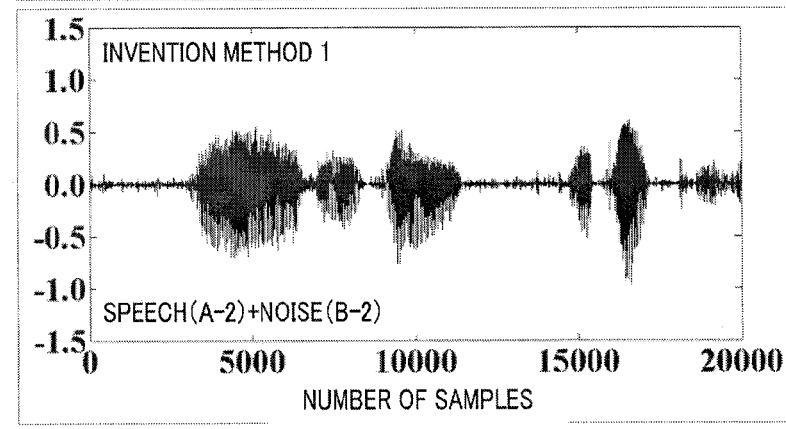
Figure 36H:
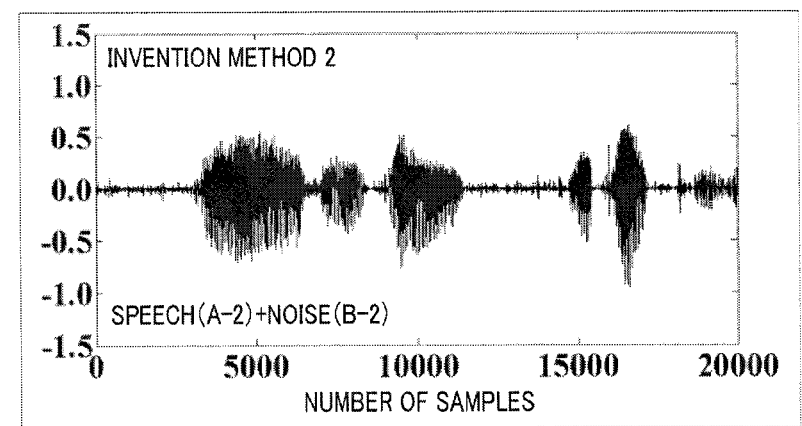

Next, by comparing FIG. 35A with FIG. 35D, and FIG. 36A with FIG. 36D, it can be seen that, with noise suppression according to conventional method 1, markedly inferior results are given for an observed speech signal including noise (B-2). This is because, with conventional method 1, it is difficult to correctly estimate an AR coefficient for an observed speech signal that includes noise (B-2), which is colored noise.

On the other hand, with noise suppression according to invention methods 1 and 2, in contrast to conventional method 1, noise suppression of the same level as for noise (B-1) can also be achieved in the case of noise (B-2).

Thus, noise suppression methods of the present invention (invention methods 1 and 2) are effective irrespective of whether noise is white noise or colored noise, and irrespective of whether or not there is an unvoiced section. This is one major characteristic of noise suppression methods of the present invention.

(2) Objective Evaluation (Numerical Evaluation)

FIG. 37 is a drawing showing the results of a first example of numerical simulation of the noise suppression capability of each method, FIG. 38 is a drawing showing the results of a second example of numerical simulation of the noise suppression capability of each method, FIG. 39 is a drawing showing the results of a third example of numerical simulation of the noise suppression capability of each method, and FIG. 40 is a drawing showing the results of a fourth example of numerical simulation of the noise suppression capability of each method.

In these simulations, in order to evaluate noise suppression capability numerically, noise suppression capability was evaluated using $SNR_{out}$ [dB] represented by equation 58 below. SNR is a signal-to-noise ratio, with a larger numeric value indicating less noise and better speech. In FIG. 37 through FIG. 40, "L" represents both "$L_c$" and "$L_p$" above.

(Equation 58)

$$SNR_{out} = 10\log_{10}\frac{\sum_{n=1}^{N}d^2(n)^{15}}{\sum_{n=1}^{N}\{d(n)-\hat{d}(n)\}^2} \quad [58]$$

That is to say, FIG. 37 is a drawing showing the results of numerical simulation of noise suppression capability for a combination of speech (A-1) and noise (B-1), and shows noise suppression amount $SNR_{out}$ under conditions of adult male speech and white noise. FIG. 38 is a drawing showing the results of numerical simulation of noise suppression capability for a combination of speech (A-2) and noise (B-1), and shows noise suppression amount $SNR_{out}$ under conditions of adult female speech and white noise. FIG. 39 is a drawing showing the results of numerical simulation of noise suppression capability for a combination of speech (A-1) and noise (B-2), and shows noise suppression amount $SNR_{out}$ under conditions, of adult male speech and colored noise. FIG. 40 is a drawing showing the results of numerical simulation of noise suppression capability for a combination of speech (A-2) and noise (B-2), and shows noise suppression amount $SNR_{out}$ under conditions of adult female speech and colored noise. In all four cases, $SNR_{out}$ values according to conventional methods 1 through 3 and invention methods 1 and 2 are compared and shown for combinations of a number of values of $SNR_{in}$ and state transition matrix or vector size L. Since the results for invention method 1 and invention method 2 are almost identical, for convenience a single result is shown for both here, denoted by "Invention Methods 1 & 2".

Referring to FIG. 37 through FIG. 40, it can be seen that invention methods 1 and 2 improve noise suppression capability compared with conventional methods 1 through 3 for all values of $SNR_{in}$ and $L_p$.

In particular, in the case of colored noise shown in FIG. 39 and FIG. 40, while conventional method 1 gives markedly inferior results, invention methods 1 and 2 show results of the same level as in the case of white noise shown in FIG. 37 and FIG. 38. That is to say, invention methods 1 and 2 can be said to be noise suppression methods that are effective for both white noise and colored noise, and are robust with respect to noise properties.

Also, as shown in FIG. 37 through FIG. 40, with invention methods 1 and 2, noise suppression capability $SNR_{out}$ is stable with respect to the value of $L_p$, and tends to increase as the value of $L_p$ increases. In contrast to this, with conventional method 1, as shown in FIG. 37 through FIG. 40, noise suppression capability $SNR_{out}$ is unstable with respect to the value of $L_c$. This means that, with conventional method 1, it is difficult to decide an optimum $L_c$ value—that is, the degree of an AR coefficient.

The greatest problem with conventional method 1, which requires AR coefficient estimation, is that deciding the degree of an AR coefficient is generally extremely difficult. The reason for this is that correct estimation of the degree of an AR coefficient, in the case of noise suppression, for example, depends on a clear signal (speech signal).

This means that a clear signal (speech signal) must be known, making real-time processing difficult. It can readily be imagined that the performance of a Kalman filter algorithm degrades if the degree of an AR coefficient is not appropriate. Also, even if it were possible to perform estimation in real time by some means or other, it would still be impossible to avoid problems such as the amount of computation due to an increase in processing.

Furthermore, as shown in FIG. 37 through FIG. 40, when conventional method 3 is compared with invention methods 1 and 2, invention method 1 and invention method 2 can be said to have higher noise suppression capability than conventional method 3 in all four cases. In particular, it can be seen that the smaller the values of $SNR_{in}$ and $L_p$, the more pronounced is the superiority of the noise suppression capability of invention method 1 and invention method 2 compared with that of conventional method 3. This kind of difference in noise suppression capability can be considered to be caused by the difference in the amount of computation. That is to say, a smaller amount of computation can be considered to result in a proportional decrease in error occurrence and improvement in noise suppression capability.

Also, as shown in FIG. 37 through FIG. 40, when conventional method 2 is compared with invention methods 1 and 2, invention method 1 and invention method 2 can be said to have higher noise suppression capability than conventional method 2 in all four cases, to an even greater extent than in the case of a comparison with conventional method 3. Invention method 2 requires the setting of a parameter specialized for speech, and the results of these experiments show that setting this parameter is extremely difficult in an actual environment.

(3) Subjective Evaluation (Listening Test)

Figure 41:
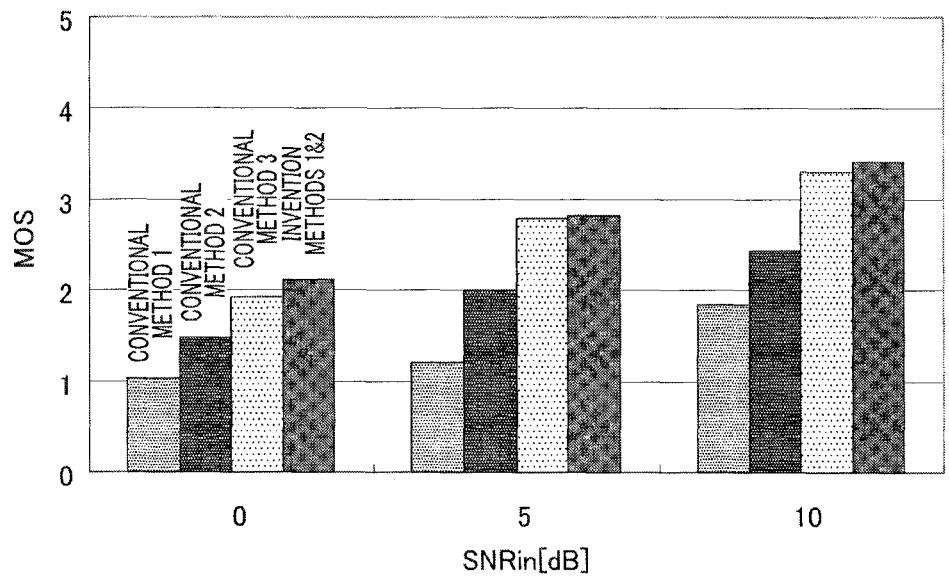
FIG. 41 is a drawing showing the results of a first example of subjective evaluation of each method.
Figure 42:
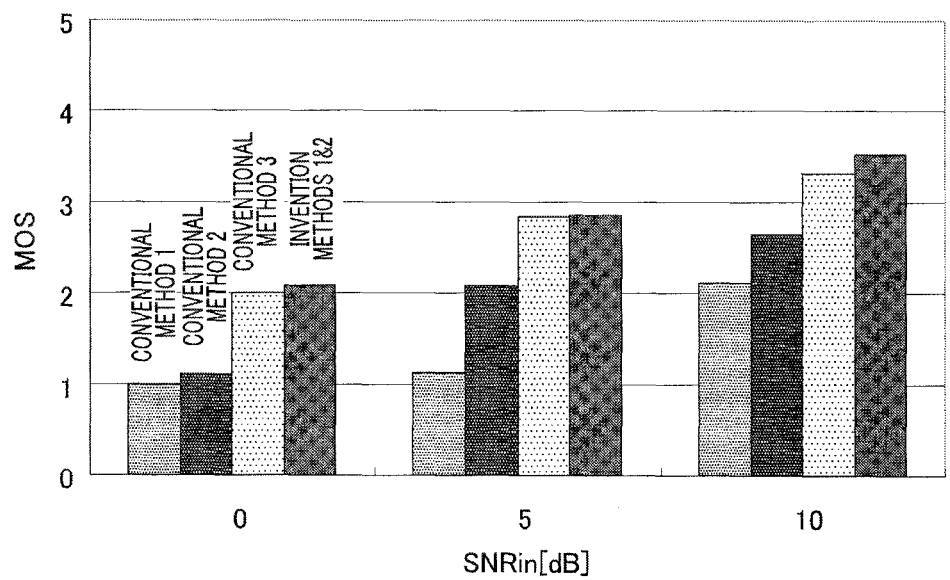
FIG. 42 is a drawing showing the results of a second example of subjective evaluation of each method.
Figure 43:
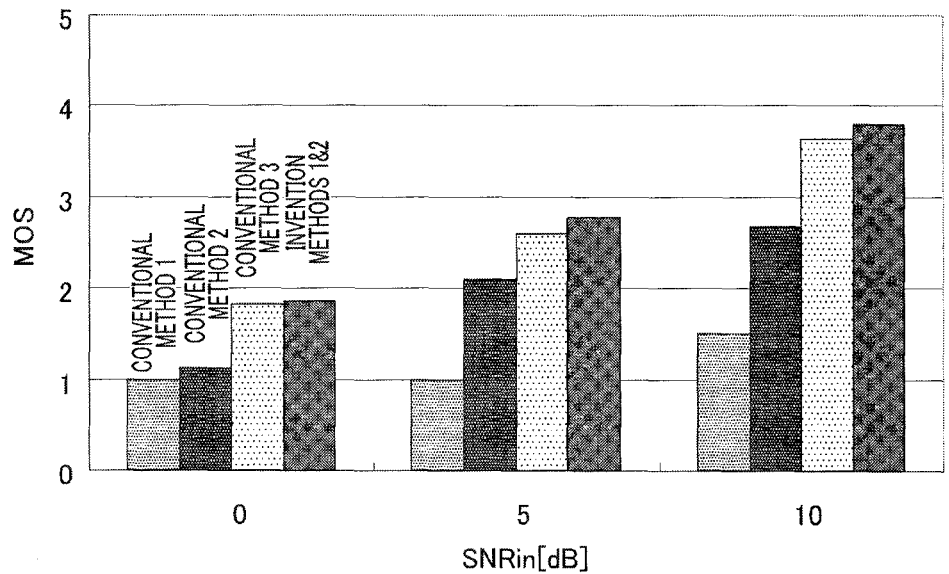
FIG. 43 is a drawing showing the results of a third example of subjective evaluation of each method.
Figure 44:
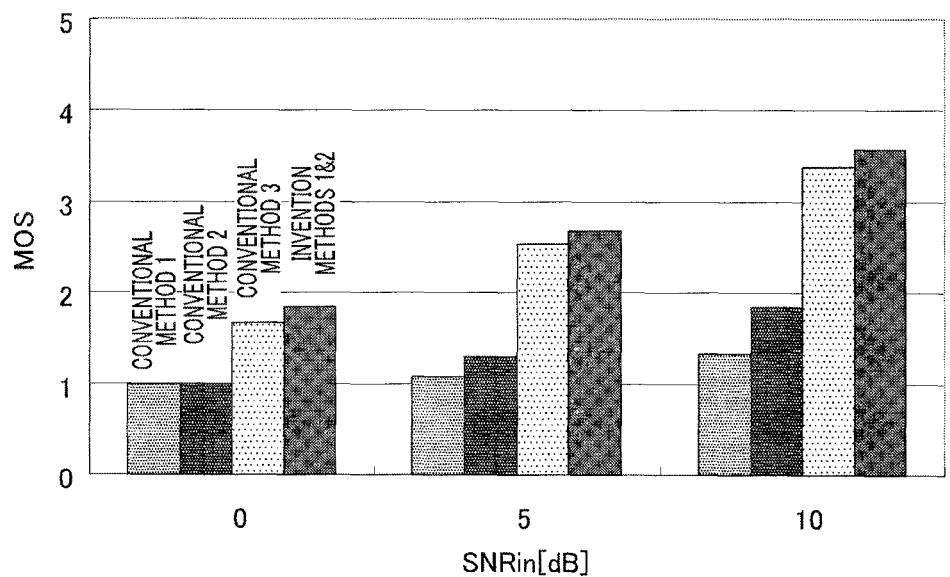
FIG. 44 is a drawing showing the results of a fourth example of subjective evaluation of each method.

FIG. 41 is a drawing showing the results of a first example of subjective evaluation of each method, FIG. 42 is a drawing showing the results of a second example of subjective evaluation of each method, FIG. 43 is a drawing showing the results of a third example of subjective evaluation of each method, and FIG. 44 is a drawing showing the results of a fourth example of subjective evaluation of each method.

Here, subjective evaluation by means of a listening test was performed in order to evaluate the speech quality of an estimated speech signal. The speech signals and noise used for speech quality evaluation are identical to those used in the above-described simulations (objective evaluation). Noise was added to a speech signal with different $SNR_{in}$ values (=0 and 5 [dB]). Speech quality evaluation was performed by means of a listening test using a 5-level MOS (Mean Opinion Score) based on ACR (Absolute Category Rating). Fifty listeners evaluated a number of signals among estimated speech signals obtained by means of noise suppression. Each listener gave a score of from 1 to 5 points, 5 points being the highest evaluation.

FIG. 41 is a drawing showing an example of the results of subjective evaluation of speech quality after noise suppression for a combination of speech (A-1) and noise (B-1), and shows listening test results for each method under the condition $L_c=L_p=50$, for example. FIG. 42 is a drawing showing an example of the results of subjective evaluation of speech quality after noise suppression for a combination of speech (A-2) and noise (B-1), and shows listening test results for each method under the condition $L_c=L_p=50$, for example. FIG. 43 is a drawing showing an example of the results of subjective evaluation of speech quality after noise suppression for a combination of speech (A-1) and noise (B-2), and shows listening test results for each method under the condition $L_c=L_p=50$, for example. FIG. 44 is a drawing showing an example of the results of subjective evaluation of speech quality after noise suppression for a combination of speech (A-2) and noise (B-2), and shows listening test results for each method under the condition $L_c=L_p=50$, for example. Since the evaluation results for invention method 1 and invention method 2 are almost identical not only in objective evaluation but also in subjective evaluation, for convenience a single result is shown for both here, denoted by "Invention Methods 1 & 2".

From FIG. 41 through FIG. 44, it can be seen that the scores for speech signals estimated by means of invention methods 1 and 2 are higher than the scores for conventional methods 1 through 3 for all values of $SNR_{in}$. In particular, in a comparison with conventional methods 1 and 2, the difference between invention methods 1 and 2 and conventional methods 1 and 2 is large for a combination of speech (A-2) and noise (B-1), a combination of speech (A-1) and noise (B-2), and a combination of speech (A-2) and noise (B-2). That is to say, with invention methods 1 and 2, sound quality is greatly improved in comparison with conventional methods 1 and 2.

In a comparison with conventional method 3, also, invention method 1 and invention method 2 can be said to have higher subjective evaluations than conventional method 3 in all four cases.

According to the above experimental results, noise suppression methods of the present invention (invention methods 1 and 2) can be said to be excellent noise suppression methods that do not sacrifice speech quality of a speech signal and are effective for white noise and colored noise. In a comparison with conventional method 3, in particular, invention method 1 and invention method 2 can be said to have higher numerical objective evaluations and achieve higher noise suppression capability than conventional method 3.

To summarize the above, noise suppression methods according to the present invention (invention methods 1 and 2) make it possible to greatly reduce the amount of computation as compared with conventional methods 1 through 3 by configuring a new state space model (in particular, an observation equation). To be more specific, invention methods 1 and 2, firstly, do not require AR coefficient estimation, enabling the step of AR coefficient estimation necessary in conventional method 1 to be eliminated, and the amount of computation to be greatly reduced compared with conventional method 1 (see FIG. 30 and FIG. 31). Also, as described above, invention methods 1 and 2, unlike conventional method 1, are effective irrespective of whether noise is white noise or colored noise and irrespective of whether or not there is an unvoiced section, and achieve higher noise suppression capability, both subjectively and objectively, than conventional method 1. Moreover, as invention methods 1 and 2 do not require the step of AR coefficient estimation necessary in conventional method 1, they can be implemented by means of a simpler configuration than conventional method 1, whether implemented by means of hardware or software. Therefore, according to invention methods 1 and 2, high noise suppression capability can be achieved with a simpler configuration and a smaller amount of computation, without degrading the quality of desired information. Furthermore, the great reduction in the amount of computation also enables memory capacity to be greatly decreased. In addition, in the case of speech, sound quality can also be greatly improved.

In particular, in a comparison with conventional method 3, also, as described above, invention method 1 and invention method 2 enable a greater reduction in the amount of computation (see FIG. 30 and FIG. 32) and improvement in noise suppression capability (see FIG. 37 through FIG. 40 in particular) to be achieved than with conventional method 3, and also have a pronounced advantageous effect as compared with conventional method 3. Furthermore, the reduction in the amount of computation also enables memory capacity to be decreased, and in the case of speech, sound quality can also be improved.

As described above, with invention method 2, as compared with invention method 1, further scalarization is implemented and the number of iteration process procedures is reduced from 5 steps to 3 steps, enabling the amount of computation to be further reduced, in addition to which setting of state transition matrix $\Phi$ and observation transition vector m and storage of many calculation results are unnecessary, enabling a still greater reduction in memory capacity to be achieved.

Also, whether invention methods 1 and 2 are implemented by means of hardware such as semiconductor integrated circuitry or semiconductor solid-state circuitry, or are implemented by means of software executable by a personal computer or the like, for example, their configurations are simpler than in the case of a conventional method. Therefore, it is clear that the use of invention methods 1 and 2 enables circuit scale and program size to be greatly reduced.

A noise suppression apparatus and noise suppression method according to the present invention can be applied to a variety of technical fields.

For example, it is possible for a noise suppression apparatus of the present invention to acquire a speech signal as a clear signal (desired signal) from a speech signal including noise (an observed signal). Examples of applications in this field include speech information processing in mobile phones, car navigation systems, interactive robots, and the like. One specific example in the case of car navigation, for example, is application to a preprocessing noise suppression apparatus of a speech recognition apparatus that is essential to a car navigation system.

In the field of image processing, according to the present invention, it is possible to acquire as a clear signal (desired signal) an original image in which blurring and noise have been removed from a degraded image (observed signal) containing blurring and noise for some reason, and use as an image processing apparatus is possible.

Furthermore, it goes without saying that the present invention is suitable for use in communication and signal processing fields in general in which a conventional method has been applied.

In the medical field, expensive equipment that cannot be purchased by an individual and specialist knowledge have hitherto been necessary to examine the condition of a fetus. However, according to the present invention, it is possible to suppress unwanted sound (noise) from an observed signal obtained from the mother's body (including the mother's heartbeat and other noise), and acquire the heartbeat of the fetus (the desired signal), and the state of health of a fetus can easily be confirmed from its heartbeat at home without the need to visit a hospital. The present invention could also be useful in the care of a baby after delivery as well as for a prenatal fetus (perinatal care). "Heartbeat" here is used in the broad sense of movement of the heart, and also includes heart sound, an electrocardiogram, and so forth, for example.

The functional elements used in the description of this embodiment are implemented as integrated circuits, for example. These may be implemented individually as single chips, or a single chip may incorporate some or all of them. An FPGA (Field Programmable Gate Array) for which programming is possible after integrated circuit fabrication, or a reconfigurable processor allowing circuit configuration, may also be used.

This embodiment is not limited to hardware, and may also be implemented by means of software. The opposite is also true. A combination of these may also be used.

As described above, a noise suppression apparatus and noise suppression method according to the present invention can be applied to a variety of technical fields, and actual examples of application of a noise suppression apparatus and noise suppression method according to the present invention in various fields are described below. Here, descriptions are given of actual cases of application of a noise suppression apparatus and noise suppression method according to the present invention to fields relating, for example, to acoustic equipment (such as a fetal heartbeat detection apparatus or mobile phone), a speech recognition apparatus (such as a car navigation system), a detection apparatus (such as an abnormal sound detection apparatus), and an image processing apparatus (such as an image restoration apparatus). In each application example, a noise suppression processing section can arbitrarily execute either of above-described invention methods 1 and 2.

(Embodiment 2)

Embodiment 2 is a case in which a noise suppression apparatus according to embodiment 1 is applied to a fetal heartbeat detection apparatus. "Heartbeat" here is used in the broad sense of movement of the heart, and also includes heart sound, an electrocardiogram, and so forth, for example.

Figure 45:
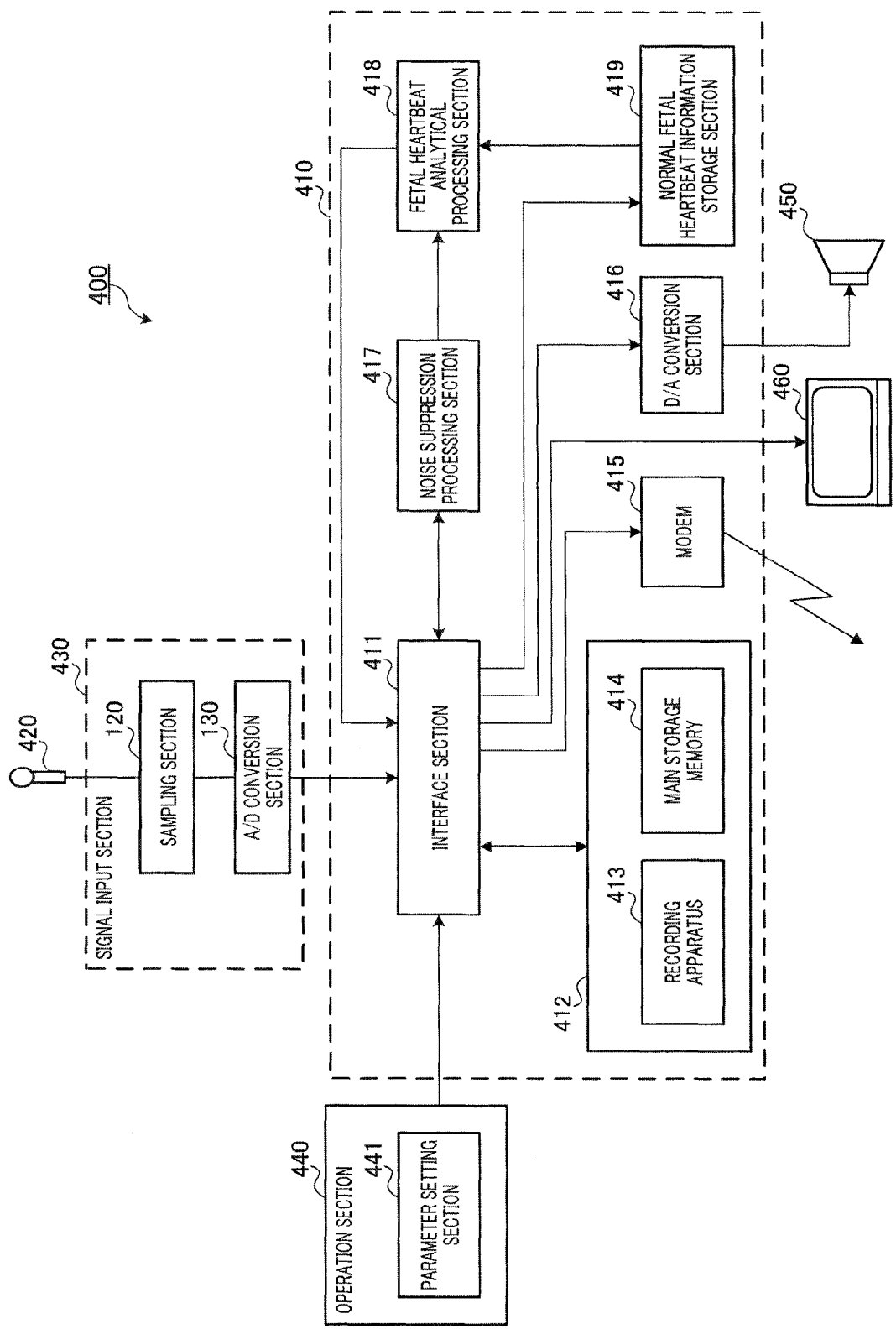
FIG. 45 is a block diagram showing a configuration of a fetal heartbeat detection apparatus according to embodiment 2 of the present invention.

FIG. 45 is a block diagram showing a configuration of a fetal heartbeat detection apparatus according to embodiment 2 of the present invention.

Fetal heartbeat detection apparatus 400 shown in FIG. 45 has a computer main unit 410 capable of executing noise suppression processing (invention methods 1 and 2) of embodiment 1, microphone 420, signal input section 430, operation section 440, speaker 450, and display 460.

Computer main unit 410 has interface section 411, storage section 412 (comprising recording apparatus 413 and main storage memory 414), modem 415, D/A converter 416, noise suppression processing section 417, fetal heartbeat analytical processing section 418, and normal fetal heartbeat information storage section 419. Noise suppression processing section 417 and fetal heartbeat analytical processing section 418 are configured by means of a Central Processing Unit (CPU). Computer main unit 410 is connected to an external communication network (such as a telephone line, a LAN, or the Internet, for example) via modem 415. Computer main unit 410 is also connected to speaker 450 via D/A converter 416. Speaker 450 may be a stethoscope speaker, for example. Although not shown in the drawing, it is also possible to connect a printer to computer main unit 410.

In computer main unit 410, a program (noise suppression algorithm) that executes noise suppression processing of embodiment 1 may be stored in recording apparatus 413, or may be downloaded from an external source via modem 415 and interface section 411. Recording apparatus 413 is typically a hard disk apparatus; but may also be a portable device such as a CD-ROM apparatus, DVD apparatus, flash memory, or the like, or a combination of these. By executing this program (noise suppression algorithm), noise suppression processing section 417 executes noise suppression processing of embodiment 1 on a fetal heartbeat (including noise) detected by microphone 420, and acquires a fetal heartbeat.

Signal input section 430 has sampling section 120 and A/D conversion section 130 shown in FIG. 1. Signal input section 430 may be an internal card (board) housed in computer main unit 410 or may be an externally installed type of device connected via interface section 411.

Operation section 440 is typically a keyboard, mouse, touch panel, or the like, but a speech recognition apparatus or the like may also be used. Using operation section 440, a user can operate the computer while viewing display 460 for confirmation. Operation section 440 has parameter setting section 441. Parameter setting section 441 sets the values of various parameters necessary for noise suppression processing of embodiment 1 by means of user input operations, and outputs these values to computer main unit 410.

Fetal heartbeat analytical processing section 418 analyzes a fetal heartbeat acquired by noise suppression processing section 417. For example, fetal heartbeat analytical processing section 418 compares provided normal fetal heartbeat information (a normal fetal heartbeat) with a fetal heartbeat acquired by noise suppression processing section 417, and identifies an abnormal heartbeat and performs diagnosis of symptoms. In this case noise suppression processing section 417 has a function of preprocessing for fetal heartbeat analytical processing section 418. Here, normal fetal heartbeat information is stored in normal fetal heartbeat information storage section 419. Normal fetal heartbeat information storage section 419 collects and accumulates normal fetal heartbeat information for each month of development of a fetus by means of input from operation section 440 of the month of development of a fetus subject to examination, for example. Normal fetal heartbeat information is read from normal fetal heartbeat information storage section 419 and provided to fetal heartbeat analytical processing section 418.

An observed speech signal from microphone 420 is input to sampling section 120 of signal input section 430. Sampling section 120 performs sampling processing on the input analog observed speech signal at a predetermined sampling frequency (for example, 16 kHz), and outputs the result to A/D conversion section 130. A/D conversion section 130 performs A/D conversion processing on an amplitude value of the sampled observed speech signal at a predetermined resolution (for example 8 bits), and temporarily stores the result. A/D conversion section 130 outputs a digitized observed speech signal to interface section 411 of computer main unit 410 in sound frame units of predetermined number of samples N.

Computer main unit 410 temporarily stores the observed speech signal output to interface section 411 in main storage memory 414 of storage section 412, and then executes noise suppression processing on a predetermined sound frame (number-of-samples) unit basis, and stores the result in main storage memory 414. Noise suppression processing is performed by calling software stored in main storage memory 414 or recording apparatus 413 into noise suppression processing section 417 via interface section 411, and executing that software.

Computer main unit 410 executes, interrupts, and terminates processing in accordance with user operations. Also, in accordance with user operations, computer main unit 410 may output an estimated speech signal (fetal heartbeat) acquired by noise suppression processing section 417 to fetal heartbeat analytical processing section 418, or output this signal externally via modem 415, speaker 450, display 460, or the like.

Fetal heartbeat detection apparatus 400 configured in this way can, for example, output a detected fetal heartbeat to the speaker of a stethoscope, or transmit results of analysis through comparison with a normal heartbeat to a specific medical center via modem 415. A medical center receiving such a transmission can perform a comprehensive evaluation based on the received analysis results. Analysis results can be displayed on display 460 as stand-alone information, or can be displayed on display 460 together with heartbeat data from the previous examination, read from storage section 412, for comparison of the two. It is also possible for analysis results to be output to a printer (not shown) for confirmation.

Thus, according to this embodiment, it is possible to suppress unwanted sound (noise) from an observed speech signal obtained from the mother's body (including the mother's heartbeat and other noise), and acquire the heartbeat of the fetus (the desired signal), enabling the state of health of a fetus to be easily and accurately confirmed from its heartbeat. The present invention could also be useful in the care of a baby after delivery as well as for a prenatal fetus (perinatal care/biomonitoring).

In this embodiment, fetal heartbeat detection apparatus 400 has a speaker, display, communication means, storage apparatus, and printer (not shown) as output means, but output means are not limited to these. Output means can be selected as appropriate for a particular use or function. Also, if it is sufficient simply to be able to detect a fetal heartbeat, fetal heartbeat analytical processing section 418 and normal fetal heartbeat information storage section 419 may be omitted.

Also, in this embodiment, fetal heartbeat analytical processing section 418 is provided in computer main unit 410 (that is, as an internal type), but this embodiment is not, of course, limited to this arrangement. It is also possible for fetal heartbeat analytical processing section 418 to be configured as an apparatus (fetal heartbeat analysis apparatus) external to computer main unit 410 (that is, as an external type). Whether fetal heartbeat analytical processing section 418 is incorporated in computer main unit 410 or is configured as an external apparatus (fetal heartbeat analysis apparatus) can be freely decided according to the particular use, the amount of data processing, and so forth. This point also applies to normal fetal heartbeat information storage section 419.

(Embodiment 3)

Embodiment 3 is a case in which a noise suppression apparatus according to embodiment 1 is applied to a portable terminal apparatus such as a mobile phone.

Figure 46:
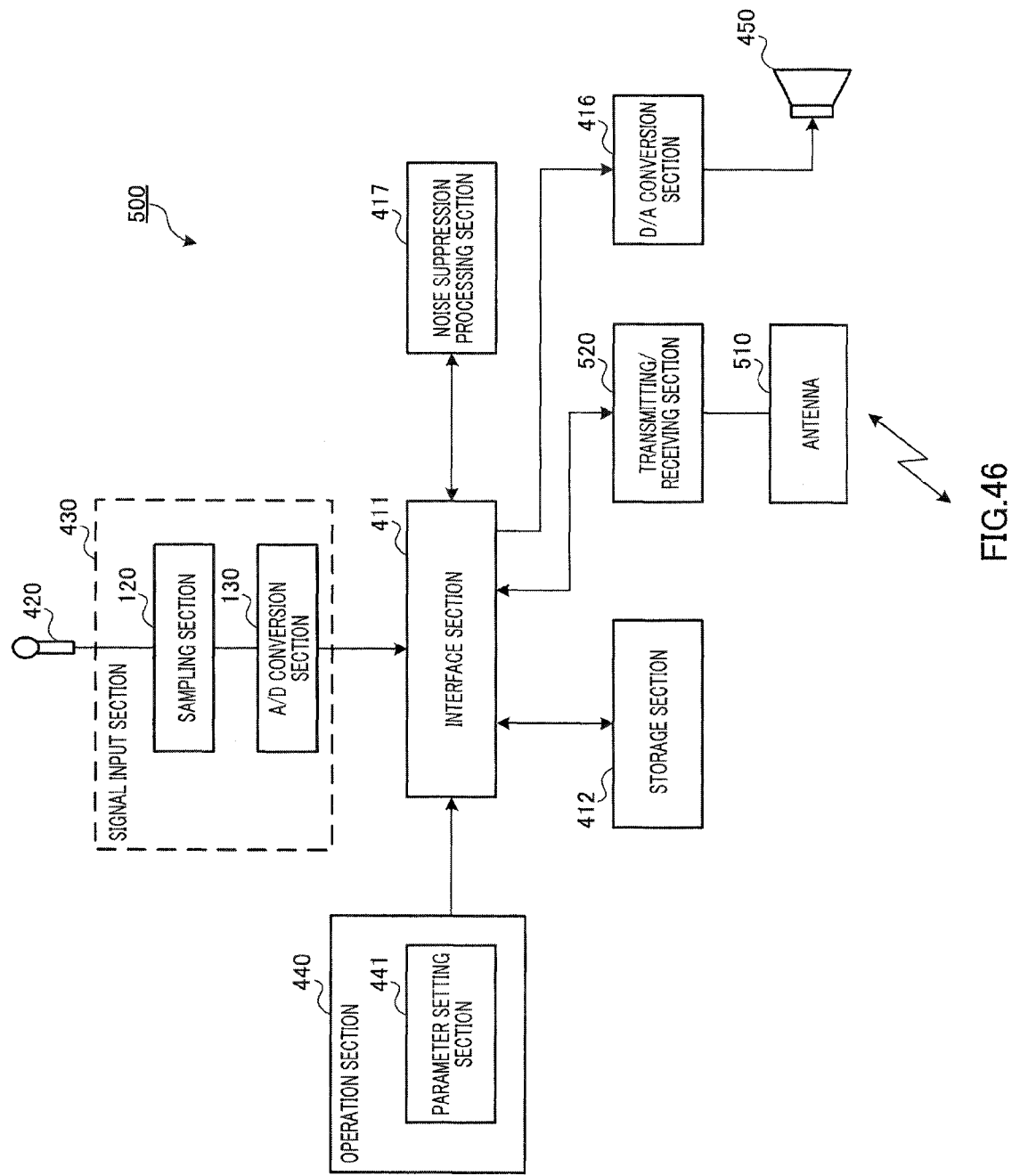
FIG. 46 is a block diagram showing a configuration of a portable terminal apparatus according to embodiment 3 of the present invention.

FIG. 46 is a block diagram showing a configuration of a portable terminal apparatus according to embodiment 3 of the present invention. This portable terminal apparatus 500 has a similar basic configuration to that of fetal heartbeat detection apparatus 400 shown in FIG. 45, and therefore identical components are assigned the same reference codes, and descriptions thereof, including options, are omitted here.

Portable terminal apparatus 500 shown in FIG. 46 has transmission/reception antenna 510 and transmitting/receiving section 520. Transmitting/receiving section 520 performs baseband processing of a speech signal transmitted/received by antenna 510.

In this portable terminal apparatus 500, an observed speech signal (user speech signal) from microphone 420 is input to signal input section 430, where it is digitized by sampling section 120 and A/D conversion section 130, and then output to interface section 411. The observed speech signal output to interface section 411 is temporarily stored in storage section 412, and then undergoes noise suppression processing on a predetermined speech frame (number-of-samples) unit basis, and is stored in storage section 412 again. Noise suppression processing is performed by calling a program (noise suppression algorithm) stored in storage section 412 into noise suppression processing section 417 via interface section 411, and executing that program. A clear signal (speech signal) after noise suppression processing undergoes transmission baseband processing by transmitting/receiving section 520, and is transmitted as a radio signal from antenna 510.

On the other hand, an observed speech signal (communicating party's speech signal) received by antenna 510 undergoes reception baseband processing by transmitting/receiving section 520, and then output to interface section 411 as a digital signal. The observed speech signal output to interface section 411 is temporarily stored in storage section 412, and then undergoes noise suppression processing on a predetermined speech frame (number-of-samples) unit basis, and is stored in storage section 412 again. A clear signal (speech signal) after noise suppression processing is output to speaker 450 via D/A converter 416.

Thus, according to this embodiment, it is possible to suppress unwanted sound (noise) from an observed speech signal (including noise) from microphone 420 and an observed speech signal (including noise) received by antenna 510, and acquire a speech signal as a clear signal (desired signal), enabling high sound quality to be achieved with a simple configuration.

(Embodiment 4)

Embodiment 4 is a case in which a noise suppression apparatus according to embodiment 1 is applied to a car navigation apparatus. There are car navigation apparatuses that incorporate a speech recognition function to enable a driver to input information while concentrating on driving—that is, to operate the apparatus by means of voice. This embodiment is an example of application to a noise suppression apparatus functioning as a preprocessing apparatus of a speech recognition apparatus essential for car navigation in a car navigation apparatus having such a speech recognition function.

Figure 47:
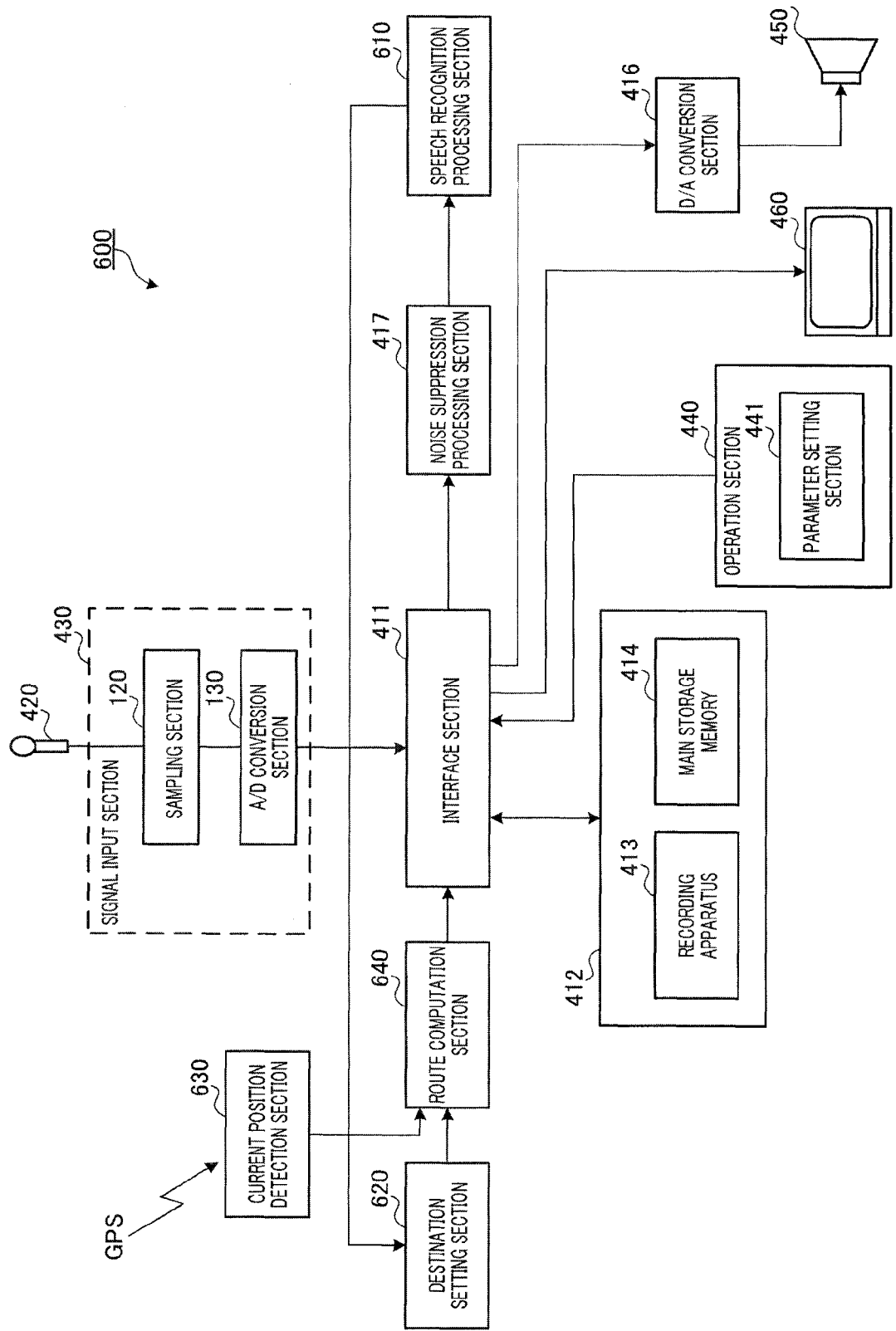
FIG. 47 is a block diagram showing a configuration of a car navigation apparatus according to embodiment 4 of the present invention.

FIG. 47 is a block diagram showing a configuration of a car navigation apparatus according to embodiment 4 of the present invention. This car navigation apparatus 600 has a similar basic configuration to that of fetal heartbeat detection apparatus 400 shown in FIG. 45, and therefore identical components are assigned the same reference codes, and descriptions thereof, including options, are omitted here.

Car navigation apparatus 600 shown in FIG. 47 has speech recognition processing section 610, destination setting section 620, current position detection section 630, and route computation section 640. By means of this configuration, car navigation apparatus 600 recognizes speech (a user command) detected by speech recognition processing section 610, sets a destination based on that recognized command by means of destination setting section 620, ascertains the current position by receiving a signal from a GPS (Global Positioning System) by means of current position detection section 630, computes an optimum route by means of route computation section 640 based on the destination given as a spoken command, and displays the computed route, a map, or the like on display 460. This car navigation processing is just one example, and application is possible to any car navigation processing as long as it is processing that can be operated by means of voice.

At this time, in this car navigation apparatus 600, an observed speech signal (user command) from microphone 420 is input to signal input section 430, where it is digitized by sampling section 120 and A/D conversion section 130, and then output to interface section 411. The observed speech signal output to interface section 411 is temporarily stored in main storage memory 414 of storage section 412, and then undergoes noise suppression processing on a predetermined speech frame (number-of-samples) unit basis, and is stored in main storage memory 414 again. Noise suppression processing is performed by calling a program (noise suppression algorithm) stored in storage section 412 (recording apparatus 413 or main storage memory 414) into noise suppression processing section 417 via interface section 411, and executing that program. A clear signal (speech signal) after noise suppression processing is output to speech recognition processing section 610.

Thus, according to this embodiment, it is possible to suppress unwanted sound (noise) from an observed speech signal (including noise) from microphone 420 and acquire a speech signal as a clear signal (desired signal) as preprocessing for speech recognition processing section 610, enabling the speech recognition capability of speech recognition processing section 610 to be fully exploited, and car navigation to be operated dependably by means of speech recognition. The effectiveness of this is particularly pronounced since there is great deal of loud noise in addition to spoken commands during driving.

(Embodiment 5)

Embodiment 5 is a case in which a noise suppression apparatus according to embodiment 1 is applied to a speech recognition apparatus.

Figure 48:
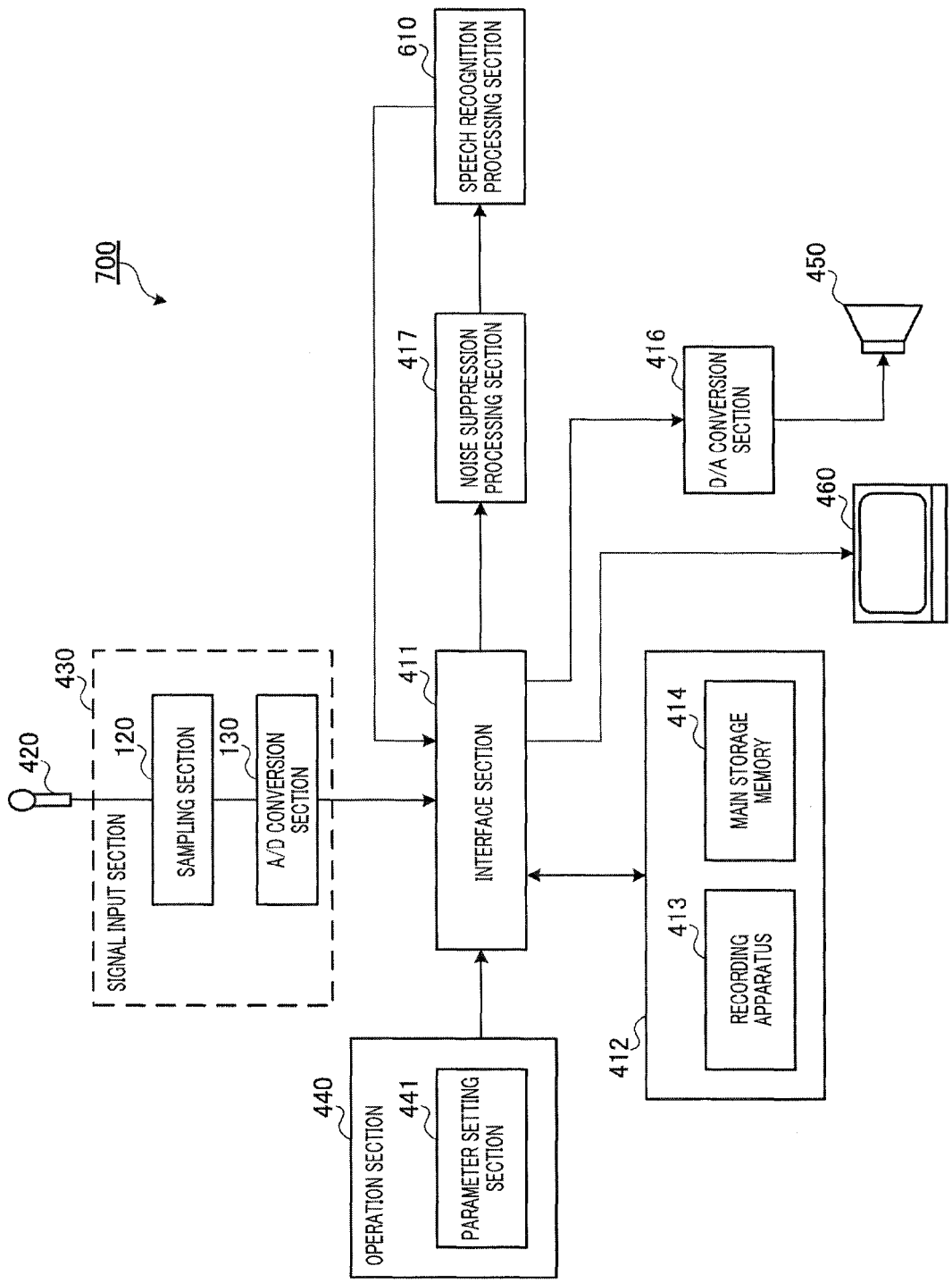
FIG. 48 is a block diagram showing a configuration of a speech recognition apparatus according to embodiment 5 of the present invention.

FIG. 48 is a block diagram showing a configuration of a speech recognition apparatus according to embodiment 5 of the present invention. This speech recognition apparatus 700 has a similar basic configuration to that of car navigation apparatus 600 shown in FIG. 47, and therefore identical components are assigned the same reference codes, and descriptions thereof, including options, are omitted here.

Speech recognition apparatus 700 shown in FIG. 48 has a configuration in which components specific to car navigation—namely, destination setting section 620, current position detection section 630, and route computation section 640—have been eliminated from the configuration of car navigation apparatus 600 shown in FIG. 47. In this speech recognition apparatus 700, as in the case of car navigation apparatus 600 shown in FIG. 47, noise suppression processing section 417 has a function of preprocessing for speech recognition processing section 610.

That is to say, in this speech recognition apparatus 700, an observed speech signal from microphone 420 is input to signal input section 430, where it is digitized by sampling section 120 and A/D conversion section 130, and then output to interface section 411. The observed speech signal output to interface section 411 is temporarily stored in main storage memory 414 of storage section 412, and then undergoes noise suppression processing on a predetermined speech frame (number-of-samples) unit basis, and is stored in main storage memory 414 again. Noise suppression processing is performed by calling a program (noise suppression algorithm) stored in storage section 412 (recording apparatus 413 or main storage memory 414) into noise suppression processing section 417 via interface section 411, and executing that program. A clear signal (speech signal) after noise suppression processing is output to speech recognition processing section 610.

Thus, according to this embodiment, it is possible to suppress unwanted sound (noise) from an observed speech signal (including noise) from microphone 420 and acquire a speech signal as a clear signal (desired signal) as preprocessing for speech recognition processing section 610, enabling the speech recognition capability of speech recognition processing section 610 to be fully exploited, and extremely high-precision speech recognition to be implemented.

(Embodiment 6)

Embodiment 6 is a case in which a noise suppression apparatus according to embodiment 1 is applied to an abnormality detection apparatus.

Figure 49:
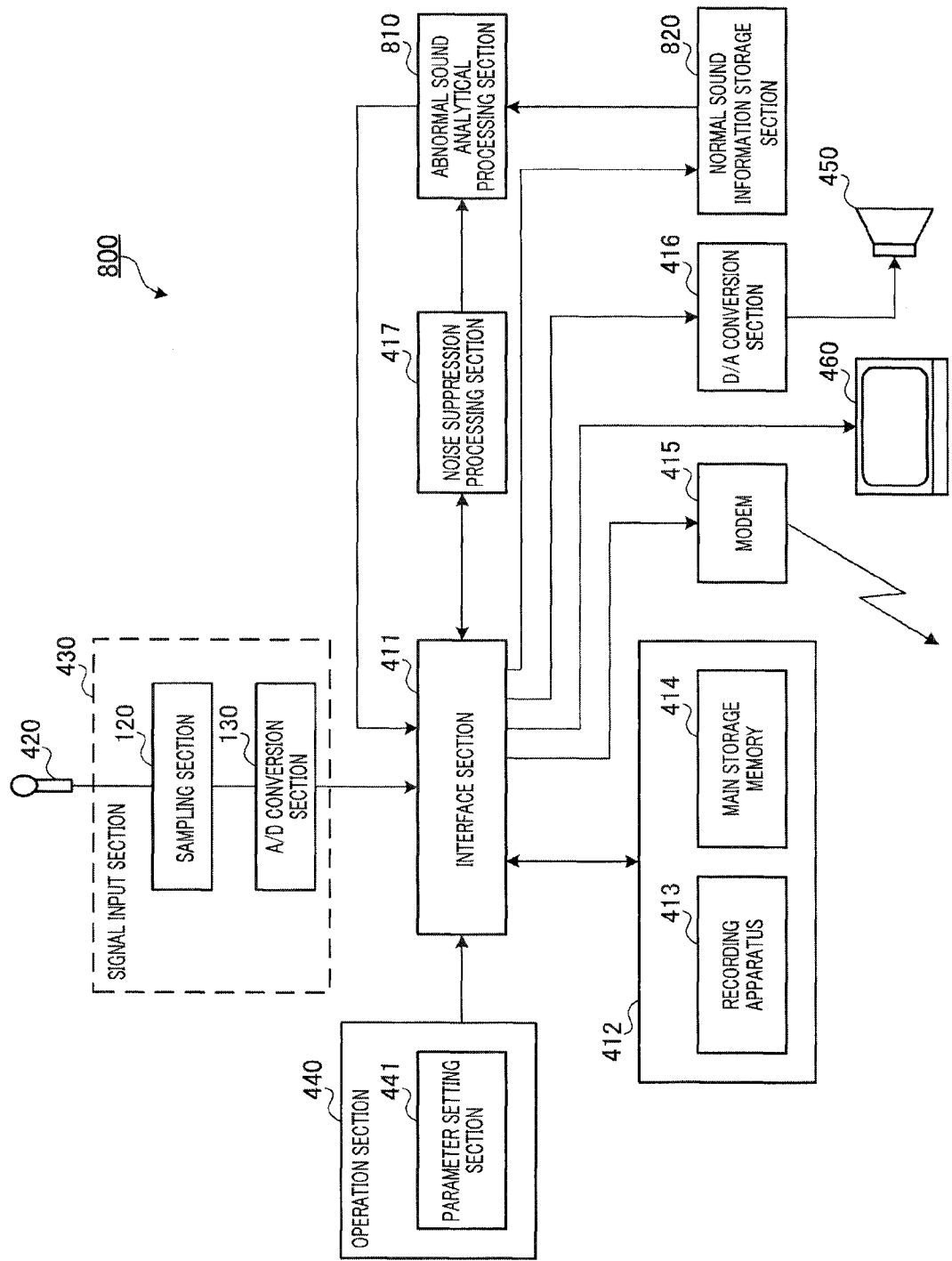
FIG. 49 is a block diagram showing a configuration of an abnormality detection apparatus according to embodiment 6 of the present invention.

FIG. 49 is a block diagram showing a configuration of an abnormality detection apparatus according to embodiment 6 of the present invention. This abnormality detection apparatus 800 has a similar basic configuration to that of fetal heartbeat detection apparatus 400 shown in FIG. 45, and therefore identical components are assigned the same reference codes, and descriptions thereof, including options, are omitted here.

Abnormality detection apparatus 800 shown in FIG. 49 is an apparatus that detects abnormal sound emitted by a test object, and has abnormal sound analytical processing section 810 and normal sound information storage section 820. Abnormal sound analytical processing section 810 analyzes abnormal sound acquired by means of noise suppression processing section 417. For example, abnormal sound analytical processing section 810 detects abnormal sound of a test object by comparing provided normal sound information with sound acquired by means of noise suppression processing section 417. In this case, noise suppression processing section 417 has a function of preprocessing for abnormal sound analytical processing section 810. Here, normal sound information is stored in normal sound information storage section 820. In this embodiment, a configuration is used, for example, whereby sound generated by a test object is collected from a plurality of predetermined places, and normal sound information storage section 820 collects and stores normal operation sounds at a plurality of predetermined places on the test object. Normal sound information is read from normal sound information storage section 820 and provided to abnormal sound analytical processing section 810 for each predetermined place on the test object. Provision may also be made for normal operation sound detected directly before also to be stored in normal sound information storage section 820. In this case, normal sound information storage section 820 can output normal sound information as most recent normal operation sound.

In this abnormality detection apparatus 800, an observed speech signal from microphone 420 is input to signal input section 430, where it is digitized by sampling section 120 and A/D conversion section 130, and then output to interface section 411. The observed speech signal output to interface section 411 is temporarily stored in main storage memory 414 of storage section 412, and then undergoes noise suppression processing on a predetermined speech frame (number-of-samples) unit basis, and is stored in main storage memory 414 again. Noise suppression processing is performed by calling a program (noise suppression algorithm) stored in storage section 412 (recording apparatus 413 or main storage memory 414) into noise suppression processing section 417 via interface section 411, and executing that program. A clear signal (speech signal) after noise suppression processing is output to abnormal sound analytical processing section 810.

This abnormality detection apparatus 800 can display results of analysis through comparison of sound detected from a test object with normal sound on display 460, or issue an alarm from speaker 450 when abnormal sound is detected. Analysis results can also be transmitted to a specific monitoring center or the like via modem 415. In this case, the abnormal sound detection conditions and so forth can be reported to a monitoring center or the like remotely. The kind of timing for abnormal noise detection will depend on the particular apparatus in question.

Thus, according to this embodiment, it is possible to suppress unwanted sound (noise) from an observed speech signal (including noise) from microphone 420 and acquire a speech signal as a clear signal (desired signal) as preprocessing for abnormal sound analytical processing section 810, enabling the abnormal sound analysis capability of abnormal sound analytical processing section 810 to be fully exploited, and extremely high-precision abnormal sound detection to be implemented.

(Embodiment 7)

Embodiment 7 is a case in which a noise suppression apparatus according to embodiment 1 is applied to an image processing apparatus, and more particularly an image restoration apparatus.

Figure 50:
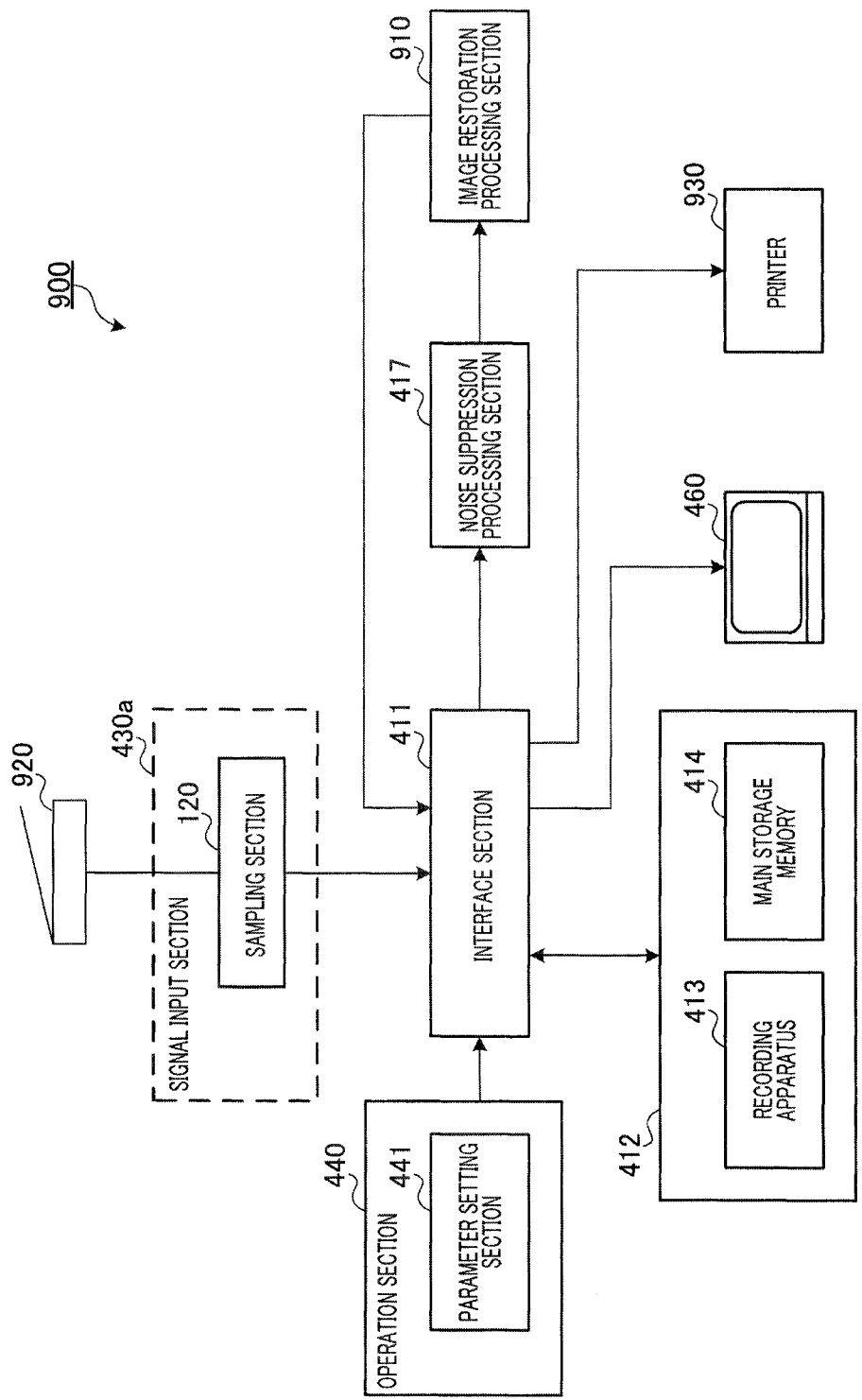
FIG. 50 is a block diagram showing a configuration of an image restoration apparatus according to embodiment 7 of the present invention.

FIG. 50 is a block diagram showing a configuration of an image restoration apparatus according to embodiment 7 of the present invention. This image restoration apparatus 900 has a similar basic configuration to that of fetal heartbeat detection apparatus 400 shown in FIG. 45, and therefore identical components are assigned the same reference codes, and descriptions thereof, including options, are omitted here.

Image restoration apparatus 900 shown in FIG. 50 is an apparatus that restores an image degraded by blurring and noise, for example, and has image restoration processing section 910. Here, as an example, a case will be described in which an image read by scanner 920 is restored. That is to say, this image restoration apparatus 900 has a configuration whereby blurring and noise included in an image read by digital scanner (hereinafter referred to simply as "scanner") 920 is suppressed, and a clean image is output. In this case, noise suppression processing section 417 has a function of preprocessing for image restoration processing section 910.

In this image restoration apparatus 900, an observed image signal from scanner 920 is input to signal input section 430a, where it undergoes sampling processing by sampling section 120, and then output to interface section 411. The observed image signal output to interface section 411 is temporarily stored in main storage memory 414 of storage section 412, and then undergoes noise suppression processing on a predetermined image frame (number-of-samples) unit basis, and is stored in main storage memory 414 again. Noise suppression processing is performed by calling a program (noise suppression algorithm) stored in storage section 412 (recording apparatus 413 or main storage memory 414) into noise suppression processing section 417 via interface section 411, and executing that program. A clean image signal after noise suppression processing is output to image restoration processing section 910. The image restored by image restoration processing section 910 is output to printer 930 or display 460.

In noise suppression processing for an observed image signal at this time, blurring and noise can be suppressed for only a specified image area by specifying a specific area of an image read by scanner 920. A specific area of an image is specified via operation section 440. This enables suppression of blurring and noise to be performed for only part of an image read by scanner 920, and only that part of the image to be restored.

Thus, according to this embodiment, it is possible to suppress blurring and noise from an observed image signal (including blurring and noise) from scanner 920 and acquire a clean image (desired signal) as preprocessing for image restoration processing section 910, enabling the image restoration capability of image restoration processing section 910 to be fully exploited, and extremely high-precision image restoration to be implemented.

In this embodiment, a case in which an image read by scanner 920 is restored has been described as an example, but the present invention is not, of course, limited to this. For example, application is also possible to a case in which an image captured by a digital camera, digital video camera, or the like, instead of scanner 920, is restored. Furthermore, application is also possible to a case in which existing image information is fetched and restored.

Also, in this embodiment, a case in which an image is restored has been described as an example, but the present invention is not, of course, limited to this. The present invention can be widely applied to cases in which an original image in which blurring and noise have been removed from a degraded image (observed signal) containing blurring and noise for some reason is acquired as a clear signal (desired signal), and the obtained original image undergoes image processing, in an image processing apparatus.

The disclosures of Japanese Patent Application No. 2008-074691, filed on Mar. 21, 2008, and Japanese Patent Application No. 2008-168835, filed on Jun. 27, 2008, including the specifications, drawings and abstracts, are incorporated herein by reference in their entirety.

Industrial Applicability

A noise suppression apparatus and noise suppression method according to the present invention are suitable for use as a noise suppression apparatus and noise suppression method that enable higher noise suppression capability to be achieved by means of a simpler configuration and with a smaller amount of computation, without degrading the quality of desired information.

The invention claimed is:

1. A noise suppression apparatus that estimates desired information from only observed information in which noise is mixed with the desired information, the noise suppression apparatus comprising:
a correlation computation section configured to calculate a correlation matrix ($P_{p1}(n+1|n)$), resp. a correlation value ($P_{p2}(n+1|n)[1,1]$) of an estimation error at time n+1, when a system state vector ($x_{p1}(n+1), x_{p2}(n+1)$) at time n+1, including the desired information ($d(n+1)$), is estimated based on observed information up to time n;
a weighting coefficient calculation section configured to use the correlation matrix, resp. the correlation value, to calculate a weighting vector ($k_{p1}(n+1)$), resp. a weighting coefficient ($k_{p2}(n+1)[1]$), for specifying a relationship between an optimum estimate of the state vector at time n+1 based on observed information up to time n+1($\hat{x}_{p1}(n+1|n+1)$), an optimum estimate of the state vector at time n+1 based on observed information up to time n($\hat{x}_{p1}(n+1|n)$), and an estimation error of an observed information at time n+1 only, resp. a relationship between an optimum estimate of the state vector at time n+1 based on observed information up to time n+1 ($\hat{x}_{p2}(n+1|n+1)$) and observed information at time n+1 only ($y_{p2}(n+1)$); and
an optimum estimate calculation section configured to use the relationship, to calculate an optimum estimate of the state vector at time n+1 based on observed information up to time n+1 ($\hat{x}_{p1}(n+1|n+1), \hat{x}_{p2}(n+1|n+1)$), wherein
the noise suppression apparatus uses a Kalman filter based on a system state model having the desired information ($d(n+1)$) as driving source.

2. The noise suppression apparatus according to claim 1, wherein:
the correlation computation section calculates as a scalar quantity a correlation value of estimation error when a system state quantity of time n+1 that includes the desired information is estimated based on information up to time n for observed information of only time n;
the weighting coefficient calculation section uses the scalar quantity of the correlation value of estimation error calculated by the correlation computation section for observed information of only time n to calculate as a scalar quantity a weighting coefficient for specifying relationships of an optimum estimate of the state quantity at that time based on information up to time n+1, an optimum estimate of the state quantity at time n+1 based on information up to time n, and estimation error of an observed quantity including the observed information; and
the optimum estimate calculation section uses the scalar quantity of the weighting coefficient calculated by the weighting coefficient calculation section for observed information of only time n to calculate as a scalar quantity an optimum estimate of the state quantity at that time based on information up to time n+1.

3. The noise suppression apparatus according to claim 2, wherein:
the correlation computation section uses a provided driving source covariance scalar quantity to calculate a scalar quantity of a correlation value of the estimation error;
the weighting coefficient calculation section uses a provided covariance scalar quantity of noise and the scalar quantity of the correlation value of estimation error calculated by the correlation computation section to calculate a scalar quantity of the weighting coefficient; and
the optimum estimate calculation section uses the scalar quantity of the weighting coefficient calculated by the weighting coefficient calculation section and an observed quantity at only time n+1 to calculate a scalar quantity of an optimum estimate of the state quantity.

4. The noise suppression apparatus according to claim 1, wherein:
the correlation computation section has a first correlation computation section and a second correlation computation section;
the optimum estimate calculation section has a first optimum estimate calculation section and a second optimum estimate calculation section;
the first correlation computation section calculates as a matrix a correlation value of estimation error when a system state quantity of time n+1 that includes the desired information is estimated based on information up to time n for observed information of only time n;
the weighting coefficient calculation section uses the matrix of the correlation value of estimation error calculated by the first correlation computation section for observed information of only time n to calculate as a vector quantity a weighting coefficient for specifying relationships of an optimum estimate of the state quantity at that time based on information up to time n+1, an optimum estimate of the state quantity at time n+1 based on information up to time n, and estimation error of an observed quantity including the observed information;
the first optimum estimate calculation section calculates as a vector quantity an optimum estimate of the state quantity at time n+1 based on information up to time n for observed information of only time n;
the second optimum estimate calculation section uses the vector quantity of the weighting coefficient calculated by the weighting coefficient calculation section for observed information of only time n to calculate as a vector quantity an optimum estimate of the state quantity at that time based on information up to time n+1; and
the second correlation computation section calculates as a matrix a correlation value of estimation error when a state quantity of that time is estimated based on information up to time n+1 for observed information of only time n.

5. The noise suppression apparatus according to claim 4, wherein:
the first correlation computation section uses a predetermined state transition matrix, a provided covariance element of a driving source vector, and the matrix of the correlation value of estimation error that has been provided or that was calculated last time by the second correlation computation section to calculate the matrix of the correlation value of estimation error;
the weighting coefficient calculation section uses the matrix of the correlation value of estimation error calculated by the first correlation computation section, a provided observation transition vector, and a provided covariance scalar quantity of noise to calculate a vector quantity of the weighting coefficient;
the first optimum estimate calculation section uses the state transition matrix and the vector quantity of the optimum estimate of the state quantity that has been provided or was calculated last time by the second optimum estimate calculation section to calculate the vector quantity of the optimum estimate of the state quantity;
the second optimum estimate calculation section uses the vector quantity of the optimum estimate of the state quantity calculated by the first optimum estimate calculation section, the vector quantity of the weighting coefficient calculated by the weighting coefficient calculation section, the observation transition vector, and an observed quantity at only time n+1 to calculate the vector quantity of the optimum estimate of the state quantity; and
the second correlation computation section uses the vector quantity of the weighting coefficient calculated by the weighting coefficient calculation section, the observation transition vector, and the matrix of the correlation value of estimation error calculated by the first correlation computation section to calculate the matrix of the correlation value of estimation error.

6. A noise suppression method that estimates desired information from only observed information in which noise is mixed with the desired information, the noise suppression method comprising:
a correlation computation step, performed by a correlation computation section configured for calculating a correlation matrix ($P_{p1}(n+1|n)$), resp. a correlation value ($P_{p2}(n+1|n)[1,1]$) of an estimation error at time n+1, when a system state vector ($x_{p1}(n+1),x_{p2}(n+1)$) at time n+1, including the desired information ($d(n+1)$), is estimated based on observed information up to time n;
a weighting coefficient calculation step, performed by a weighting coefficient calculation section configured for using the correlation matrix, resp. the correlation value to calculate a weighting vector ($k_{p1}(n+1)$), resp. a weighting coefficient ($k_{p2}(n+1)[1]$), for specifying a relationship between an optimum estimate of the state vector at time n+1 based on observed information up to time n+1 ($\hat{x}_{p1}(n+1|n+1)$), an optimum estimate of the state vector at time n+1 based on observed information up to time n ($\hat{x}_{p1}(n+1|n)$), and an estimation error of an observed information at time n+1 only, resp. a relationship between an optimum estimate of the state vector at time n+1 based on observed information up to time n+1 ($\hat{x}_{p2}(n+1|n+1)$) and observed information at time n+1 only ($y_{p2}(n+1)$); and an optimum estimate calculation step, performed by an optimum estimate calculation section configured for using the relationship, to calculate an optimum estimate of the state vector at time n+1 based on observed information up to time n+1 ($\hat{x}_{p1}(n+1|n+1),\hat{x}_{p2}(n+1|n+1)$), wherein
the noise suppression method uses a Kalman filter based on a system state model having the desired information ($d(n+1)$) as driving source.

7. The noise suppression method according to claim 6, wherein:
the correlation computation step calculates as a scalar quantity a correlation value of estimation error when a system state quantity of time n+1 that includes the desired information is estimated based on information up to time n for observed information of only time n;
the weighting coefficient calculation step uses the scalar quantity of the correlation value of estimation error calculated by the correlation computation step for observed information of only time n to calculate as a scalar quantity a weighting coefficient for specifying relationships of an optimum estimate of the state quantity at that time based on information up to time n+1, an optimum estimate of the state quantity at time n+1 based on information up to time n, and estimation error of an observed quantity including the observed information; and
the optimum estimate calculation step uses the scalar quantity of the weighting coefficient calculated by the weighting coefficient calculation step for observed information of only time n to calculate as a scalar quantity an optimum estimate of the state quantity at that time based on information up to time n+1.

8. The noise suppression method according to claim 6, wherein:
the correlation computation step has a first correlation computation step and a second correlation computation step;
the optimum estimate calculation step has a first optimum estimate calculation step and a second optimum estimate calculation step;
the first correlation computation step calculates as a matrix a correlation value of estimation error when a system state quantity of time n+1 that includes the desired information is estimated based on information up to time n for observed information of only time n;
the weighting coefficient calculation step uses the matrix of the correlation value of estimation error calculated by the first correlation computation step for observed information of only time n to calculate as a vector quantity a weighting coefficient for specifying relationships of an optimum estimate of the state quantity at that time based on information up to time n+1, an optimum estimate of the state quantity at time n+1 based on information up to time n, and estimation error of an observed quantity including the observed information;
the first optimum estimate calculation step calculates as a vector quantity an optimum estimate of the state quantity at time n+1 based on information up to time n for observed information of only time n;
the second optimum estimate calculation step uses the vector quantity of the weighting coefficient calculated by the weighting coefficient calculation step for observed information of only time n to calculate as a vector quantity an optimum estimate of the state quantity at that time based on information up to time n+1; and
the second correlation computation step calculates as a matrix a correlation value of estimation error when a state quantity of that time is estimated based on information up to time n+1 for observed information of only time n.

9. A non-transitory computer-readable storage medium having stored thereon a noise suppression program for estimating desired information from only observed information in which noise is mixed with the desired information, the noise suppression program causing a computer to execute:

a correlation computation step, performed by a correlation computation section configured for calculating a correlation matrix $P_{p1}(n+1|n)$, resp. a correlation value ($P_{p2}(n+1|n)[1,1]$) of an estimation error at time n+1, when a system state vector ($x_{p1}(n+1), x_{p2}(n+1)$) at time n+1, including the desired information ($d(n+1)$), is estimated based on observed information up to time n;

a weighting coefficient calculation step, performed by a weighting coefficient calculation section configured for using the correlation matrix, resp. the correlation value to calculate a weighting vector ($k_{p1}(n+1)$), resp. a weighting coefficient ($k_{p2}(n+1)[1]$), for specifying a relationship between an optimum estimate of the state vector at time n+1 based on observed information up to time n+1 ($\hat{x}_{p1}(n+1|n+1)$), an optimum estimate of the state vector at time n+1 based on observed information up to time n ($\hat{x}_{p1}(n+1|n)$), and an estimation error of an observed information at time n+1 only, resp. a relationship between an optimum estimate of the state vector at time n+1 based on observed information up to time n+1 ($\hat{x}_{p2}(n+1|n+1)$) and observed information at time n+1 only ($y_{p2}(n+1)$); and an optimum estimate calculation step, performed by an optimum estimate calculation sections configured for using the relationship, to calculate an optimum estimate of the state vector at time n+1 based on observed information up to time n+1 ($\hat{x}_{p1}(n+1|n+1), \hat{x}_{p2}(n+1|n+1)$), wherein the noise suppression program causes the computer to execute a noise suppression method using a Kalman filter based on a system state model having the desired information ($d(n+1)$) as driving source.

10. The noise suppression program according to claim 9, wherein:

the correlation computation step calculates as a scalar quantity a correlation value of estimation error when a system state quantity of time n+1 that includes the desired information is estimated based on information up to time n for observed information of only time n;

the weighting coefficient calculation step uses the scalar quantity of the correlation value of estimation error calculated by the correlation computation step for observed information of only time n to calculate as a scalar quantity a weighting coefficient for specifying relationships of an optimum estimate of the state quantity at that time based on information up to time n+1, an optimum estimate of the state quantity at time n+1 based on information up to time n, and estimation error of an observed quantity including the observed information; and the optimum estimate calculation step uses the scalar quantity of the weighting coefficient calculated by the weighting coefficient calculation step for observed information of only time n to calculate as a scalar quantity an optimum estimate of the state quantity at that time based on information up to time n+1.

11. The noise suppression program according to claim 9, wherein:

the correlation computation step has a first correlation computation step and a second correlation computation step;

the optimum estimate calculation step has a first optimum estimate calculation step and a second optimum estimate calculation step;

the first correlation computation step calculates as a matrix a correlation value of estimation error when a system state quantity of time n+1 that includes the desired information is estimated based on information up to time n for observed information of only time n;

the weighting coefficient calculation step uses the matrix of the correlation value of estimation error calculated by the first correlation computation step for observed information of only time n to calculate as a vector quantity a weighting coefficient for specifying relationships of an optimum estimate of the state quantity at that time based on information up to time n+1, an optimum estimate of the state quantity at time n+1 based on information up to time n, and estimation error of an observed quantity including the observed information;

the first optimum estimate calculation step calculates as a vector quantity an optimum estimate of the state quantity at time n+1 based on information up to time n for observed information of only time n;

the second optimum estimate calculation step uses the vector quantity of the weighting coefficient calculated by the weighting coefficient calculation step for observed information of only time n to calculate as a vector quantity an optimum estimate of the state quantity at that time based on information up to time n+1; and the second correlation computation step calculates as a matrix a correlation value of estimation error when a state quantity of that time is estimated based on information up to time n+1 for observed information of only time n.

12. A fetal heart sound detection apparatus comprising:
the noise suppression apparatus according to claim 1 that takes a signal obtained by detecting a fetal heartbeat as observed information, and estimates a fetal heartbeat as desired information; and
an output section that outputs a fetal heartbeat estimated by the noise suppression apparatus.

13. A portable terminal apparatus comprising:
a microphone that detects voice of a user as an electrical speech signal;
a receiving section that receives a speech signal of a communicating party transmitted as a radio signal;
the noise suppression apparatus according to claim 1 that takes the speech signal detected by the microphone or the speech signal received by the receiving section as observed information, and estimates the speech signal of the user or the communicating party as desired information;
a transmitting section that transmits as a radio signal the speech signal of the user estimated by the noise suppression apparatus; and
a speaker that outputs the speech signal of the communicating party estimated by the noise suppression apparatus.

14. A car navigation apparatus comprising:
a microphone that detects voice of a user as an electrical speech signal;

the noise suppression apparatus according to claim 1 that takes the speech signal detected by the microphone as observed information, and estimates the speech signal of the user as desired information;

a speech recognition section that has the speech signal of the user estimated by the noise suppression apparatus as input, and performs speech recognition processing; and a car navigation processing section that takes a recognition result of the speech recognition section as an operation command, and executes car navigation processing.

15. A speech recognition apparatus comprising:

the noise suppression apparatus according to claim 1 that takes a speech signal obtained by detecting voice of a user as observed information, and estimates the speech signal of the user as desired information;

a speech recognition section that has the speech signal of the user estimated by the noise suppression apparatus as input, and performs speech recognition processing; and an output section that outputs a recognition result of the speech recognition section.

16. An abnormality detection apparatus comprising:

the noise suppression apparatus according to claim 1 that takes a signal obtained by detecting sound emitted by a test object as observed information, and estimates test object information as desired information;

an abnormal sound analysis section that detects abnormal sound by comparing desired information estimated by the noise suppression apparatus with normal sound; and an output section that outputs an analysis result of the abnormal sound analysis section.

17. An image processing apparatus comprising:

an image input section that has an image signal as input;

the noise suppression apparatus according to claim 1 that takes an image signal input by means of the image input section as observed information, and estimates an original image as desired information; and an output section that outputs an original image estimated by the noise suppression apparatus.

* * * * *